(12) United States Patent
Prakash

(10) Patent No.: US 9,501,746 B2
(45) Date of Patent: Nov. 22, 2016

(54) SYSTEMS AND METHODS FOR ELECTRONIC MESSAGE ANALYSIS

(71) Applicant: ASTRA IDENTITY, INC., Action, MA (US)

(72) Inventor: Gagan Prakash, Acton, MA (US)

(73) Assignee: ASTRA IDENTITY, INC., Acton, MA (US)

( * ) Notice: Subject to any disclaimer, the term of this patent is extended or adjusted under 35 U.S.C. 154(b) by 0 days.

(21) Appl. No.: 14/864,656

(22) Filed: Sep. 24, 2015

(65) Prior Publication Data

US 2016/0014151 A1 Jan. 14, 2016

Related U.S. Application Data

(63) Continuation-in-part of application No. 14/176,133, filed on Feb. 9, 2014, now Pat. No. 9,319,314, which is a continuation-in-part of application No. 14/045,244, filed on Oct. 3, 2013, now Pat. No. 9,154,514, which is a continuation-in-part of application No. 13/668,349, filed on Nov. 5, 2012, now Pat. No. 8,566,938.

(60) Provisional application No. 62/054,918, filed on Sep. 24, 2014.

(51) Int. Cl.
| | |
|---|---|
| *H04L 29/14* | (2006.01) |
| *G06N 7/00* | (2006.01) |
| *H04L 29/06* | (2006.01) |
| *H04L 12/741* | (2013.01) |
| *H04L 12/863* | (2013.01) |

(52) U.S. Cl.
CPC .............. *G06N 7/005* (2013.01); *H04L 45/74* (2013.01); *H04L 47/62* (2013.01); *H04L 63/1483* (2013.01)

(58) Field of Classification Search
None
See application file for complete search history.

(56) References Cited

U.S. PATENT DOCUMENTS

| | | | |
|---|---|---|---|
| 6,073,106 A | 6/2000 | Rozen | |
| 7,451,487 B2 * | 11/2008 | Oliver | G06F 21/51 |
| | | | 709/206 |
| 7,590,698 B1 * | 9/2009 | Cooley | G06F 21/56 |
| | | | 709/206 |

(Continued)

OTHER PUBLICATIONS

Tutorial—Spoof Emails, eBay, 2010.*
(Continued)

*Primary Examiner* — Minh Dinh
(74) *Attorney, Agent, or Firm* — John Brooks Law LLC; John J. Brooks, III

(57) ABSTRACT

Systems and methods for analyzing electronic messages are disclosed. In some embodiments, the method comprises receiving a new received message from an indicated sender, the new received message having a first message characteristic of the indicated sender and a second message characteristic, identifying an actual sender message characteristic pattern of an actual sender using the first message characteristic, probabilistically comparing the second message characteristic to the actual sender message characteristic pattern, determining a degree of similarity of the second message characteristic to the actual sender message characteristic pattern, and influencing a probability that the indicated sender is the actual sender based upon the degree of similarity. There may be multiple message characteristics and patterns. In some embodiments, the methods may utilize pattern matching techniques, recipient background information, quality measures, threat intelligence data or URL information to help determine whether the new received message is from the actual sender.

26 Claims, 21 Drawing Sheets

(56) References Cited

U.S. PATENT DOCUMENTS

| | | |
|---|---|---|
| 8,135,780 B2 | 3/2012 | Gillum |
| 8,775,157 B2 | 7/2014 | Abdel-Kader |
| 9,143,476 B2* | 9/2015 | Dreller ................ G06Q 10/04 |
| 2005/0015455 A1 | 1/2005 | Liu |
| 2006/0031510 A1 | 2/2006 | Beck et al. |
| 2006/0123464 A1 | 6/2006 | Goodman et al. |
| 2006/0168066 A1 | 7/2006 | Helsper et al. |
| 2007/0101423 A1 | 5/2007 | Oliver et al. |
| 2008/0133672 A1* | 6/2008 | Gillum ................ G06Q 10/107 709/206 |
| 2011/0093709 A1 | 4/2011 | Lunt et al. |
| 2012/0254333 A1 | 10/2012 | Chandramouli et al. |
| 2012/0271619 A1 | 10/2012 | Abdel-Kader |
| 2012/0303726 A1 | 11/2012 | Hwang |

OTHER PUBLICATIONS

Spoof Email Tutorial, ebay 2006, 4 pages, as identified and included in Office Action to parent U.S. Appl. No. 13/668,349 mailed on Mar. 5, 2013.

Dinh, Minh, Non-Final Office Action for parent U.S. Appl. No. 13/668,349, mailed Mar. 5, 2013, 10 pages, USPTO, USA.

Dinh, Minh, Notice of Allowance for parent U.S. Appl. No. 13/668,349, mailed Jun. 24, 2013, 8 pages, USPTO, USA.

Dinh, Minh, Non-Final Office Action for parent U.S. Appl. No. 14/045,244, mailed Jan. 15, 2014, 31 pages, USPTO, USA.

Bergholz et al., Improved Phishing Detecting using Model-Based Features, 7 pages, 2008.

Chandrasekaran et al., Phishing E-mail Detection Based on Structural Properties, 5 pages, 2006.

Zhan, et al., Phishing Detection Using Stochastic Learning-Based Weak Estimators, 10 pages, IEEE, 2011.

Popham, Jeffrey D, Advisory Action for co-pending U.S. Appl. No. 14/176,113, mailed Feb. 10, 2015, 3 pages, USPTO, USA.

Popham, Jeffrey D, Final Office Action for co-pending U.S. Appl. No. 14/176,113, mailed Nov. 25, 2014, 38 pages, USPTO, USA.

Popham, Jeffrey D, Non-Final Office Action for co-pending U.S. Appl. No. 14/176,113, mailed Jun. 4, 2014, 20 pages, USPTO, USA.

Dinh, Minh, Final Office Action for parent U.S. Appl. No. 14/045,244, mailed Jul. 30, 2014, 6 pages, USPTO, USA.

Dinh, Minh, Non-Final Office Action for parent U.S. Appl. No. 14/045,244, mailed Jan. 14, 2015, 5 pages, USPTO, USA.

Dinh, Minh, Notice of Allowance and Interview Summary for parent U.S. Appl. No. 14/045,244, mailed May 26, 2015, 12 pages, USPTO, USA.

Popham, Jeffrey D, Non-Final Office Action for co-pending U.S. Appl. No. 14/176,113, mailed Sep. 17, 2015, 35 pages, USPTO, USA.

Popham, Jeffrey D, Final Office Action for co-pending U.S. Appl. No. 14/176,113, mailed Mar. 31, 2016, 79 pages, USPTO, USA.

\* cited by examiner

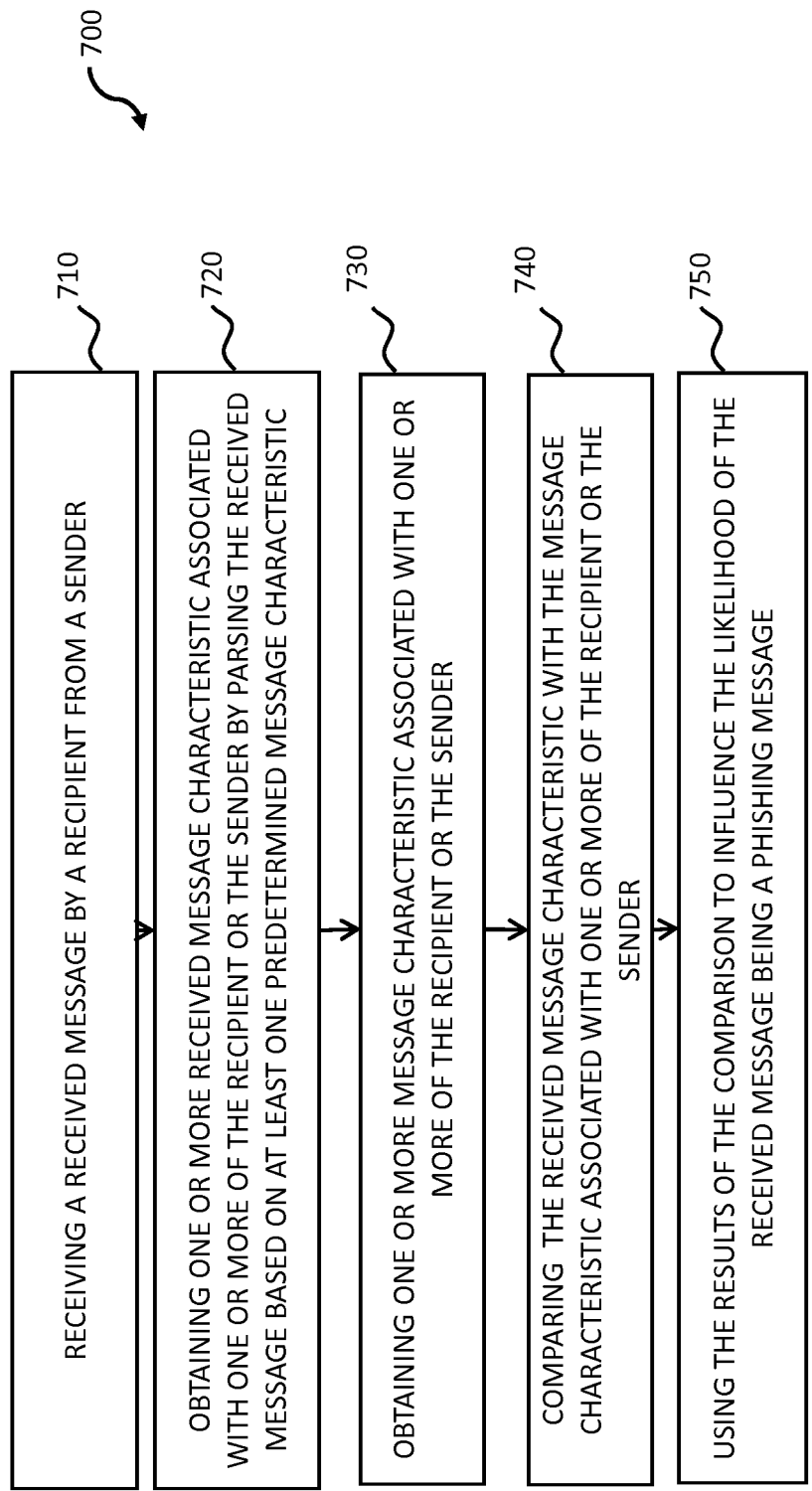

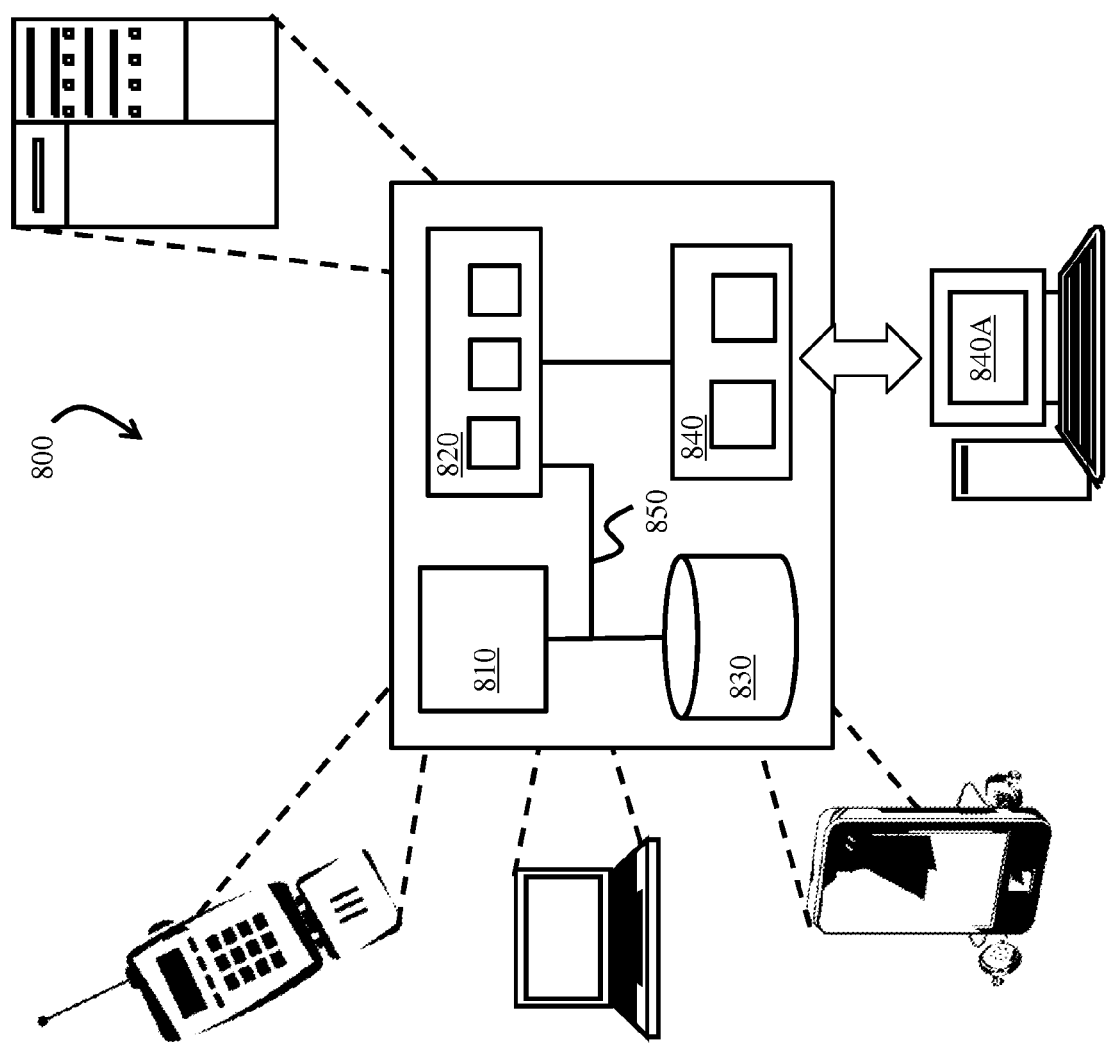

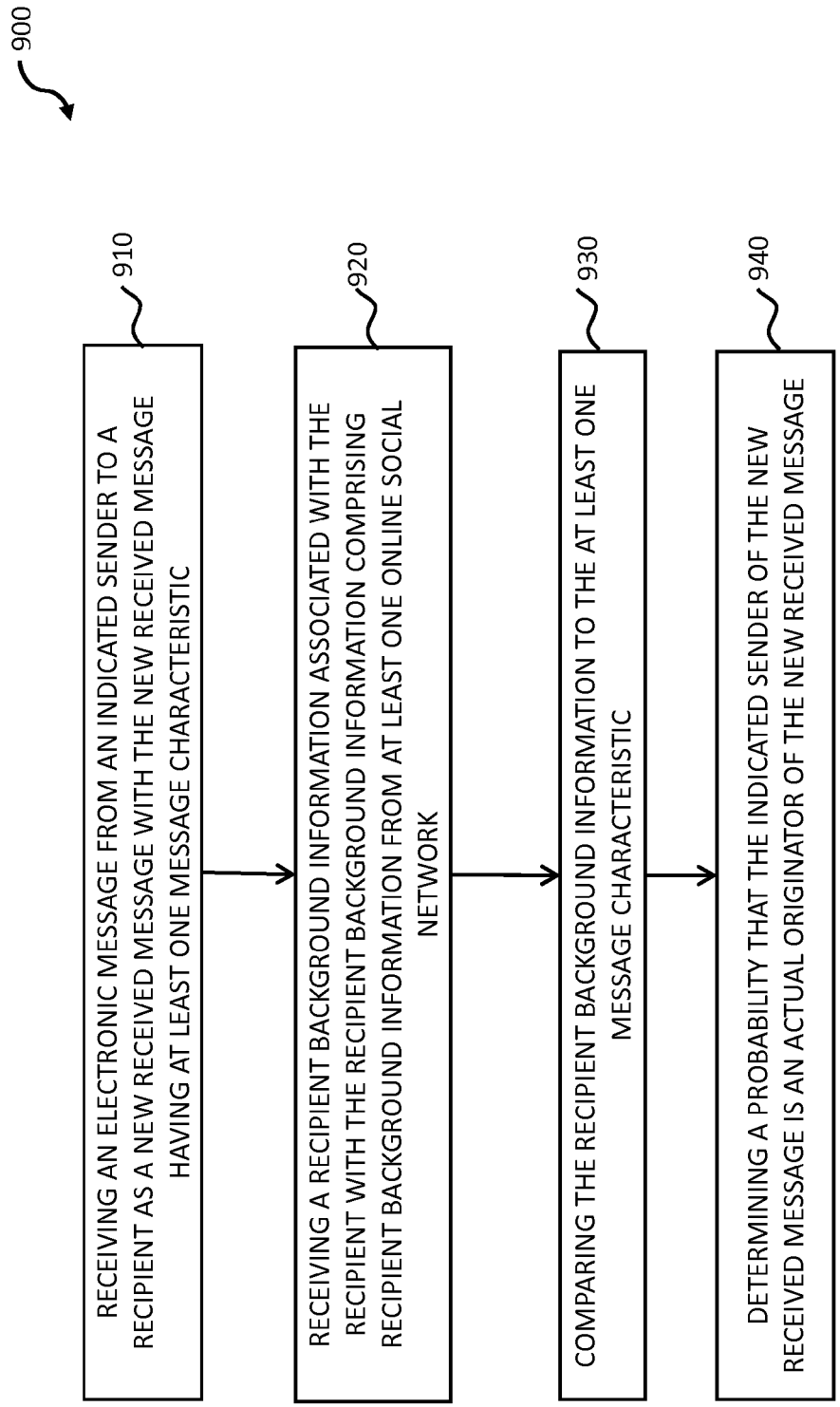

SYSTEMS AND METHODS FOR ELECTRONIC MESSAGE ANALYSIS

CROSS-REFERENCE TO RELATED APPLICATIONS

This application claims benefit of U.S. Patent Application 62/054,918 filed Sep. 24, 2014 entitled "SYSTEMS AND METHODS FOR ELECTRONIC MESSAGE ANALYSIS"; this application is also a continuation in part application of U.S. patent application Ser. No. 14/176,113 filed on Feb. 9, 2014 entitled "SYSTEMS AND METHODS FOR ELECTRONIC MESSAGE ANALYSIS"; U.S. patent application Ser. No. 14/176,113 is a continuation in part application of U.S. patent application Ser. No. 14/045,244 filed on Oct. 3, 2013 entitled "SYSTEMS AND METHODS FOR ELECTRONIC MESSAGE ANALYSIS"; U.S. patent application Ser. No. 14/045,244 is a continuation in part application of U.S. patent application Ser. No. 13/668,349 filed on Nov. 5, 2012 entitled "SYSTEM AND METHOD FOR ELECTRONIC MESSAGE ANALYSIS FOR PHISHING DETECTION", now U.S. Pat. No. 8,566,938; and the entire contents of all above referenced applications are incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

1. Field of the Invention

This invention relates to the analysis of electronic messages, in some embodiments systems and methods for determining whether an indicated characteristic of the electronic message is an actual characteristic of the electronic message.

2. Description of the Prior Art

Existing email protocols on the Internet do not validate the identity of the sender of an email. As a result, bad actors impersonate other people's identity in order to increase the likelihood of recipients opening their messages and attachments. This activity is generally referred to as "phishing" and specifically "spear phishing" when the recipient is targeted by the fake sender who is referred to as a "phisher". By getting recipients to open these fake emails, the phishers can increase their likelihood of successfully gaining unauthorized access to confidential data, including trade secrets, state secrets, military information, and other information for a variety of motivations, especially for financial gain through fraud, identity theft and/or data theft. The senders typically target and attack multiple users at a specific organization with impersonated emails in order to gain unauthorized access to their confidential data. Once a recipient opens the fake email and sometimes the attachments, the user's computer may be infected and will be used to send out phishing emails on behalf of the phisher. Some fake emails contain links that when followed takes the user to a website, which may install malware on the recipient's computer or pose as a familiar website and ask for confidential information, such as login credentials and/or account numbers. Perpetrators may also use a compromised computer as the launch point to further penetrate the organization's computer network to access data stored on other computers, servers, and devices. Phishers may also delete and change information or even damage physical systems controlled by computers.

Existing solutions are based on checking IP address associated with the phishing email or checking the text of an email for an URL to detect whether the email is a phishing email. Further, existing solutions are not integrated into email servers and clients and therefore, are restricted to some minimal checks to detect phishing activities. These techniques seem to work only when phishers use IP addresses or URLs that are suspected to be malevolent and therefore, they are typically, not robust enough to prevent sophisticated phishing attacks.

SUMMARY

The following summary is included only to introduce some concepts discussed in the Detailed Description below. This summary is not comprehensive and is not intended to delineate the scope of protectable subject matter, which is set forth by the claims presented at the end.

Systems and methods for analyzing electronic messages are disclosed.

In one example embodiment, a computer implemented method is provided for analyzing an electronic message, the method comprising receiving a message from an indicated sender, the message having a first message characteristic of the indicated sender and a second message characteristic, identifying an actual sender message characteristic pattern of an actual sender using the first message characteristic, probabilistically comparing the second message characteristic to the actual sender message characteristic pattern, determining a degree of similarity of the second message characteristic to the actual sender message characteristic pattern, and influencing a probability that the indicated sender is the actual sender based upon the degree of similarity.

In some embodiments, message characteristic patterns may comprise message characteristic labels for comparison with message characteristics.

In some embodiments, message characteristic patterns may comprise multiple message characteristic labels for multiple comparisons with message characteristics.

In some embodiments, a probability of similarity between message characteristics and the probability may be more granular than a binary yes or no. For example, the probability of similarity is a probability value between but not including 0% and 100%.

In some embodiments, messages may be withheld from being relayed to the recipient if the probability that the indicated sender is the actual sender does not meet a threshold In some embodiments, message characteristics are selected from the message prior to the message being received by the recipient.

In some embodiments, a classification engine may be trained on historical messages from the actual sender to create a new actual sender message characteristic pattern having a positive actual sender message characteristic label whereby a positive comparison of message characteristics to the positive actual sender message characteristic label increases the probability that the indicated sender is the actual sender. In some embodiments, a positive actual sender recipient organization message characteristic label is created.

In some embodiments, the classification engine may be trained on historical messages from senders other than the actual sender to create a negative actual sender message characteristic label whereby a positive comparison of the second message characteristic to the negative actual sender message characteristic label decreases the probability that the indicated sender is the actual sender.

In some embodiments, the positive or negative actual sender message characteristic patterns and labels may be updated.

In some embodiments, a quality measure may be determined for messages so that messages of similar quality can be used to update message characteristic patterns. In some embodiments, the quality measure may be used to identify message characteristic patterns.

In some embodiments, a message characteristic may comprise a value computed or derived or obtained via a third party from either the message content or a portion of the message content.

In some embodiments, messages may be imported and grouped by message characteristics to train the classification engine and create message characteristic patterns for comparison.

In some embodiments, recipient background information may be obtained from online social network application or social network data store to train the classification engine and create message characteristic patterns for comparison.

In some embodiments, message characteristics may be compared to recipient messaging identity information to determine an indicated sender quality information which can further influence the probability that the indicated sender is the actual sender based upon the indicated sender quality information. In some embodiments, the indicated sender quality information identifies the sender as a first time sender of the message to the recipient, a sender of a message that has different message characteristics than a previous message or a sender of a message having similar message characteristics than a previous message.

In one example embodiment, a computer implemented method is provided for analyzing an electronic message, the method comprising receiving a new received message from an indicated sender on behalf of a recipient at a recipient organization, storing a metadata for the new received message, relaying the new received message to the recipient organization, after relaying the new received message comparing the metadata for the new received message to a threat intelligence data to determine if the new received message is a potentially dangerous message, and alerting the at the recipient organization regarding a danger of the new received message. In some embodiments, the threat intelligence data may be updated and after the new received message is relayed, a regular comparison of the metadata for the received message may be performed to determine if the message is a potentially dangerous message. The comparison may be between many different types of metadata and threat intelligence data. The update may be collected or provided by many sources such as a third party, the recipient, an administrator or through an ongoing analysis of new received messages. In some embodiments, prior to relaying the new received message, the URL of the new received message may be changed whereby any clicks to the original URL are redirected through a well-known proxy server and the step of comparing the metadata for the new received message to an updated threat intelligence comprises regularly comparing the original URL for the new received message to the updated threat intelligence data. In some embodiments, prior to forwarding the new received message, the message body of the new received message may be changed to include a clickable report phishing URL whereby when the clickable report phishing URL is clicked, an updated threat intelligence data is created including a digital hash code and a message characteristic of the new received message. In some embodiments, the alerting the recipient organization regarding the danger of the new received message comprises removing or moving the message from the recipient's mailbox or altering a visible message characteristic of the message. In some embodiments, upon the report phishing URL being clicked, determining an other previously received message with similar message characteristics as the new received message and alerting the recipient organization regarding the danger of the other previously received message. In some embodiments, the step of storing a metadata for the new received message further comprises substituting or removing a metadata element with an unique value to create an altered metadata element, the metadata element comprises a position of the metadata element, a name or a value, and storing the altered metadata element with respect to the new received message.

In some embodiments, the step of relaying the new received message to recipient organization comprises determining the new received message to be a questionable message, changing a Reply-To address message characteristic value to a custom message address, storing an original Reply-To address message characteristic value, and relaying the new received message to the recipient organization. Some embodiments further comprise receiving a new reply message at the custom message address, determining one of the new received message or the new reply message to be a phishing message, and withholding the new reply message from being delivered. Some embodiments further comprise receiving a new reply message at the custom message address, determining one of the new received message or the new reply message to be a phishing message, and forwarding the new received message or the new reply message for manual inspection. Some embodiments further comprise receiving a new reply message at the custom message address, determining the new received message and the new reply message to not be phishing messages, and delivering the new reply message to the original Reply-To address message characteristic value.

In one example embodiment, a computer implemented method is provided for analyzing an electronic message comprising receiving a copy of a new received message from an indicated sender for a recipient at a recipient organization, storing a metadata for the copy of the new received message, comparing the metadata for the copy of the new received message to a threat intelligence data to determine if the new received message is a potentially dangerous message, and alerting the recipient organization regarding a danger of the new received message. In some embodiments, the threat intelligence data is updated to create an updated threat intelligence data; and a regular comparison is made of the metadata for the copy of the new received message to the updated threat intelligence data to determine if the new received message is a potentially dangerous message. In some embodiments, alerting the recipient organization regarding the danger of the new received message comprises steps such as removing the new received message from a mailbox of the recipient, moving the new received message from the mailbox of the recipient to another messaging folder, or altering a visible message characteristic of the new received message. In some embodiments, alerting the recipient organization regarding the danger of the new received message further comprises determining a other previously received message with similar message characteristics as the copy of the new received message, and alerting the recipient organization regarding the danger of the other previously received message.

In one example embodiment, a computer implemented method is provided for analyzing an electronic message, the method comprising receiving a new received message from an indicated sender, the new received message having a first message characteristic of the indicated sender and a second message characteristic, comparing the first message characteristic of the indicated sender to a recipient messaging identity information to determine an indicated sender quality information, and influencing a probability that the indicated sender is an actual sender based upon the indicated sender quality information.

In one example embodiment, a computer implemented method is provided for protecting an electronic message, the method comprising receiving an electronic message to be delivered to a recipient on behalf of a sender, substituting or removing one or more meta data element with altered values to create one or more altered meta data values, and storing the one or more meta data element and the one or more altered meta data values with respect to the electronic message. In some embodiments, the one or more meta data element comprises a position of the one or more meta data element, a name or a value.

In one example embodiment, a computer implemented method is provided for protecting an electronic message, the method comprising receiving a new received message from an indicated sender, determining the indicated sender to be from a well-known brand, extracting one or more URL from the new received message, breaking up each URL into a display URL component and a target URL component, comparing the display URL component to a list of domains and brands associated with the well-known brand, determining a quality of the target URL component with respect to the list of domains and brands associated with the well-known brand, and influencing a probability that the new received message is a phishing message based upon the quality. In some embodiments, the target URL is de-shortened.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

In order that the manner in which the above-recited and other advantages and features of the invention are obtained, a more particular description of embodiments of the invention briefly described above will be rendered by reference to specific embodiments thereof which are illustrated in the appended drawings. Understanding that these drawings depict only example embodiments of the invention and are not therefore to be considered to be limiting of its scope, the invention will be described and explained with additional specificity and detail through the use of the accompanying drawings in which:

FIG. 7 illustrates a flow diagram of an example embodiment of methods for analyzing electronic messages;

FIG. 8 illustrates an example block diagram of an example embodiment of a system for analyzing electronic messages for phishing detection;

FIG. 9 illustrates a flow diagram of an example embodiment of methods for analyzing electronic messages;

Figure 1:
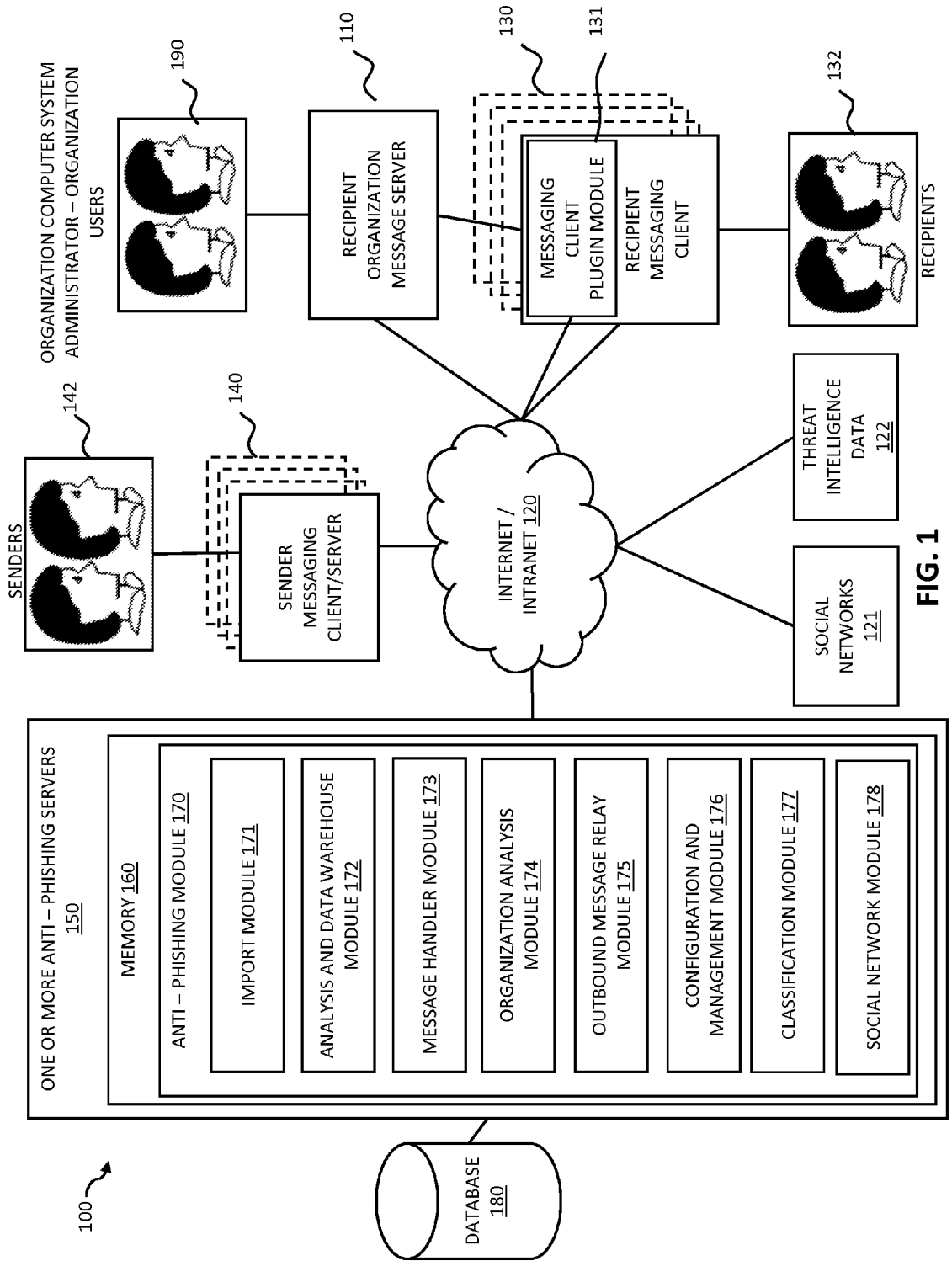
FIG. 1 illustrates an example block diagram of a system for analyzing electronic messages.

The drawings described herein are for illustration purposes only and are not intended to limit the scope of the present disclosure in any way.

DETAILED DESCRIPTION

Systems and methods for electronic message analysis will now be described in detail with reference to the accompanying drawings. In the following detailed description of the examples of the present subject matter, references are made to the accompanying drawings that form a part hereof, and in which are shown by way of illustration specific examples in which the present subject matter may be practiced. These examples are described in sufficient detail to enable those skilled in the art to practice the present subject matter, and it is to be understood that other examples may be utilized and that changes may be made without departing from the scope of the present subject matter. For example, it will be appreciated that, while the following description may describe a system that analyzes email message for detecting phishing message, these embodiments are for illustration purposes only and the systems and methods disclosed herein have wide applicability. For example, and not for limitation, the systems and methods may be used to analyze any type of electronic message such as text messages, twitter messages, picture messages or any other type of electronic message. The systems and methods may also be used to analyze any type of electronic message for determining other characteristics of the electronic message beyond whether the message is a phishing message. Additionally, although the description may use examples of using the disclosed systems and methods to determine whether a sender of an electronic message may the actual sender to illustrate example embodiments of the disclosed systems and methods, it is fully contemplated that the disclosed systems and methods may also be used to determine whether other indicated characteristics of an electronic message are actual characteristics of the electronic message. The following detailed description is, therefore, not to be taken in a limiting sense, and the scope of the present subject matter is defined by the appended claims.

As used herein, the terms "electronic message" and "message" are used interchangeably throughout the document and in addition to the definition of the terms as used in the art of data communications, these terms are used to define any type of electronic message in a communication network. For example, and not for limitation, an electronic message may be an email message, an email, a text message, a skype or chat message, a twitter message, a picture message, a conversation spanning multiple messages in succession between a sender and recipient or any other type of electronic message in a communication network.

As used herein, in addition to the definition of the term as used in the art of data communications, the term "phishing" is also referred to as "spear phishing" in the document and also defines any method of falsely identifying or misrepresenting the source, sender or any characteristic of the source or sender of an electronic message. For example, and not for limitation, phishing includes not only the misrepresentation of identity for nefarious purposes but the misrepresentation of identity for purposes that may be legitimate such as a secretary sending an authorized message in the name of a supervisor using the supervisors email account. As another example, in some embodiments, determining whether a message is a phishing message comprises determining whether the indicated sender of the message is the actual sender of the message.

As used herein, "online social network", "social network" and "social network service" are used interchangeably throughout the document and in addition to the definition of the term as used in the art of data communications, these terms are used to define any type of group affiliation of a user that provides information on a user over an Intranet, Internet or other data communications network. Online social networks are also known as a social networking service or a social networking site and are typically an online platform to allow a user build and maintain social networks or social relations among users who share similar interests, activities, backgrounds or real-life connections. An online social network typically comprises a representation or profile of the user, the user's social links and a variety of additional services that allow individuals to create a profile and create a list of users with whom to share connections or information within the online social network. The online social network may be provided by a proprietary application or group of applications controlled by a singular organization and with access of the user profile controlled by an access control means such as a credential. An online social network may be a separate application from messaging applications that enable disparate systems controlled by multiple organization to communicate with each other by utilizing open messaging standards such as SMTP, POP, IMAP, SMS, PSTN. Popular online social networks contain connection categories, recommendation tools and ways to connect with other users of the network services. Examples of online social networks include but are not limited to Facebook, LinkedIn, Google+, Twitter, alumni associations, Instagram, Reddit, Pinterest, Vine, Tumblr, Nexopia, Badoo, Myspace, Xanga and Friendster.

Further, as used herein, "recipient" and "recipient/recipient organization" are used interchangeably throughout the document and in addition to the definition of the term as used in the art of data communications, these terms are used to define any type of recipient of an electronic message in a communication network which may include for example a user as a recipient or an organization as a recipient. As used herein, a recipient may also be a member of a recipient organization which may be a separate organization or group that the recipient belongs to such as but not limited to an employer, a social network or other association.

Further, as used herein, "sender" and "sender/sender organization" are used interchangeably throughout the document and in addition to the definition of the term as used in the art of data communications, these terms are used to define any type of sender of an electronic message in a communication network which may include for example a user as a sender or an organization as a sender. As used herein, a sender may also be a member of a sender organization which may be a separate organization or group that the sender belongs to such as but not limited to an employer, a social network or other association.

Further, as used herein, in addition to the definition of the term as used in the art of data communications, a "database" can comprise any method of storing data such that it can be retrieved. A database may comprise a file system, a relational database, a nosql database, or a memory system used to organize and store data on a computer readable storage device or computer readable memory device.

Further, as used herein, "recipient background information" comprises information associated with a recipient such as but not limited to third party authentication credentials for online social networks, access rights or authentication tokens to access online social networks on behalf of a recipient for the recipient or others associated with the recipient such as other people who may work or study at the same establishment as the recipient, information taken from an online social network, patterns, profiles, messages posted on the social network to the recipient or to others, message characteristics, message content or any information obtained or derived from such information. The information may be obtained directly from online social networks or obtained and then stored for subsequent access.

Further, as used herein, the terms "obtain", "retrieve" and "receive", in any tense, in addition to the definition of the terms as used in the art of data communications, these terms are used to define any type of having access to something, such as information, either having access directly or having access to the information that may have been gathered earlier and stored in a database.

The terms "classifying" and "text classification" as used herein, in addition to the definition commonly used in the art, are used to define identifying characteristics and comparing those characteristics to labels to determine a degree of similarity of the characteristics to the label. For example, and not for limitation, text classification specifically includes single, binary, multi-class and multi-label classification.

The term "pattern" as used herein, in addition to the definition commonly used in the art, includes a set of characteristics and some of the characteristics may conform to labels and some may not confirm to a label.

The term "label" as used herein, in addition to the definition commonly used in the art, is used to define a representation of a certain characteristic or a group of characteristics. Multiple labels may be included in a pattern and labels may be manually predefined or labels may be determined statistically using techniques such as but not limited to machine learning techniques.

The term "characteristic" as used herein, in addition to the definition commonly used in the art, includes both the category of the characteristic as well as the value of the characteristic. For example and not for limitation, a characteristic may include both the category of "source ID" as well as a specific IP address value representing that source ID. In some embodiments, the characteristic is specified as a different element than the characteristic value. A characteristic may also indicate a derived value. For example and not for limitation, a characteristic value representing an IP address may be converted to a characteristic representing the geographical location of the IP address.

Example Embodiments of Methods for Electronic Message Analysis

Referring to FIG. 7, one example embodiment of a computer implemented method for analyzing electronic messages 700 is shown. The method comprising receiving a received message by a recipient from a sender at 710, obtaining one or more received message characteristic associated with one or more of the recipient or the sender from the received email message at 720, obtaining one or more message characteristic associated with one or more of the recipient or the sender at 730, comparing the received message characteristic with the message characteristic associated with one or more of the recipient or the sender at 740 and using the results of the comparison to influence the likelihood of the received message being a phishing message at 750. The received message received at step 710 may comprise messages having at least one message characteristic. As shown, in some embodiments, the message characteristics at 720 may be obtained by parsing the received message based on at least one predetermined message characteristic. In some embodiments, the message characteristic associated with one or more of the recipient or the sender is obtained from a database.

In some embodiments, parsing the received message based on at least one predetermined message characteristic comprises analyzing the message characteristics of the received message to identify a value of at least one predetermined message characteristic as the message characteristic or to identify whether the at least one predetermined message characteristic as a message characteristic is present in the received message. The predetermined message characteristic may be any of the message characteristics and is used to provide a common categorization of at least one message characteristic for analysis and comparison in the disclosed methods.

As used herein, for example only and not as a limitation, a message characteristic may comprise at least one message characteristic from or representing the message, its metadata, a portion of the message or a portion of its metadata or a value computed or derived or cross-referenced via a third party from the message or its metadata. In some embodiments, a message characteristic can represent the entire body of a message, or it could represent a section of the message such as the first line, the message introduction text, the message signature text, the first word, characters or the first phrase consisting of one or more words. In some embodiments a message characteristic may also represent a statistic, a classification or other characteristics derived from the metadata or body of the message. In some embodiments, a message characteristic could also represent all the metadata that may travel along with a message or a specific portion of the metadata. For example and not for limitation, the message characteristic may comprise at least one of message characteristics selected from the group consisting of: a network path used to reach a recipient or recipient organization from the sender; a geography associated with an IP address of the sender; the IP address of the sender cross referenced with a geo-IP database to determine the location of the sender; a messaging client a software used by the sender or sender organization; a messaging client software version used by the sender or sender organization; a date, a day of week, a time, a time period of the received message; a time zone of the sender or sender organization; a presence and a detail of a digital signature in the received message; a message metadata present in a header portion of the received message; a character set used in a content of the received message; a format of the received message; a message length and a subject length; a character case of the received message; a word misspelling; a similar word spelling; a character case of a subject of the received message; a style of an introduction at a top of the received message; a style and content of the sender's signature in a body of the received message; statistical measures such as a use and/or a frequency of a character, a punctuation, a word, a phrase, a number of words, a length of words, a capitalization of words, a similar spelling, a misspelling, an average number of letters in each word, a ratio of whitespace characters to message text, a number or a whitespace; the punctuation, the word, the phrase and their arrangement within a body of the received message and/or the subject line; another recipient included in the received message "to", "copy" or "cc" (circulated) email addresses or identifiers; a name of the sender; a from and a reply to email address or identifier of the sender; an organization name of the sender; a domain name of the sender or senders organization; a Domain Name Service (DNS) settings of an organization of the sender including an SPF records; the organization's messaging server information including a server IP address; a server network path of the sender; a messaging server software program of the sender; a messaging server software version of the sender; a DKIM signature; a spam score from a spam software; a message ID; a volume of messages sent by the sender; a volume of messages sent by the organization of the sender; a volume of messages received by the recipient; a volume of messages received by recipient organization; a detail associated with a Uniform Resource Locator (URL) or an attachment in the received message; whether the recipient or recipient organization has responded to this specific received message; a phone number; the phone number of where the message originated from; the phone number derived into the geography of where the phone number is located by looking up the phone number in a third party phone database; a caller ID value; a third party identifier; the phone number of where the message originated from; the phone number derived into the geography of where the phone number is located by looking up the phone number in a third party phone database; and a number of interactions between the sender and a recipient of the received message.

In some embodiments, recipient background information associated with the message recipient/recipient organization may be obtained from recipient/recipient organization's online social networks. The recipient background information, such as contact and background information associated with the message recipient/recipient organization, may then be stored in the database. Upon receiving a message, message characteristics from the message sender's information and background may be compared to the recipient background information retrieved from at least one social network and the comparison may be used as one of one or more factors in determining if the message is a phishing attempt. In some embodiments, the value of the message characteristics representing the name of the message sender is compared to the recipient background information and if the name of the message sender is not found the message is marked as being more dangerous. In some embodiments, similar misspellings of the value of the message characteristics representing the name of the message sender is compared to known contacts in the recipient background information and upon being found the message is treated as a phishing attempt. In some embodiments, the value of the message characteristics representing the name of the message sender is compared to the recipient background information and if the name of the message sender is found the message then other message characteristics such as the email address are compared against email address for the found contact in the recipient background information. In some embodiments, if the email address is not found, then the organizations associated with the contact in the recipient organization are compared to the domain used in the email address message characteristic. In some embodiments, if the sender of the message is found in the recipient's background information but as a connection through another common contact, then a reputation quality is calculated to determine the veracity of the sender on the social network and this reputation quality is used to assess the sender of the message from the recipient background information to determine if the message is a phishing message. In some embodiments, if the sender of the message is found in the recipient's background information but as a connection through another common contact, then a relationship quality is calculated to determine the strength of the relationship between the sender and the recipient using factors such as common place of work or education to determine that the sender and recipient know each other and this relationship quality is used to assess the sender of the message from the recipient background information to determine if the message is a phishing message.

In some embodiments, recipient background information associated with the message recipient and/or recipient organization comprises messaging identify information of the recipient.

In some embodiments, a probability of similarity between message characteristics and the probability may be more granular than a binary yes or no similarity. For example, the probability of similarity is a probability value between but not including 0% and 100%.

In some embodiments, messages may be withheld from being relayed to the recipient if the probability that the indicated sender is the actual sender does not meet a threshold.

In some embodiments, message characteristics may be selected from the message before the message is received by the recipient.

In some embodiments, a quality measure may be determined for messages so that messages of similar quality can be used to update message characteristic patterns. In some embodiments, the quality measure may be used to identify message characteristic patterns.

In some embodiments, message characteristics may be compared to recipient messaging identity information to determine an indicated sender quality information which can further influence the probability that the indicated sender is the actual sender based upon the indicated sender quality information.

In some embodiments, the methods may utilize message characteristic patterns and pattern matching techniques to help determine whether the new received message is a phishing message. In these embodiments, the methods further comprise storing the message characteristic in a database, applying a classification engine to the message characteristic to define a message characteristic pattern, receiving a new received message, applying the classification engine to the new received message to define a new received message characteristic pattern, comparing the new received message characteristic pattern to the message characteristic pattern to determine whether the new received message characteristic pattern is similar to the message characteristic pattern and using the results of the comparison to influence the likelihood of the message being a phishing message. Message characteristic patterns may include one or more message characteristic labels for comparison with one or more message characteristics. In some embodiments, the classification engine can be trained on historical messages to create positive or negative labels that can be compared to message characteristics to influence the probability that the indicated sender of the received message is the actual sender. In some embodiments, recipient background information from the online social network application or social network data store can be used to train the classification engine and create message characteristic patterns.

In some embodiments, the methods may utilize pattern groupings to help determine whether the new received message by the recipient as a phishing message. In these embodiments, the methods may further comprise storing the received message characteristic in a database, grouping the received message characteristic into a plurality of pattern groupings, each pattern grouping being defined by a pattern characteristic, storing the pattern groupings in a database along with a count of received messages with the message characteristics that place it in the pattern grouping, receiving a new received message at, comparing the message characteristics of the new received message with the pattern characteristics at and using the results of the comparison to influence the likelihood of the message being a phishing message.

In some embodiments, the methods may utilize statistical distributions to help determine whether the new received message is a phishing message. For example, the comparing the message characteristic of the received message with the message characteristic associated with one or more of the recipient or the sender may comprise obtaining the message characteristics associated with one or more of the recipient or the sender along with a statistical distribution of those message characteristics and comparing the message characteristics of the received message with the similar message characteristics associated with one or more of the recipient or sender from message characteristics having a high statistical distribution. Some embodiments of the methods may further comprise determining a degree of variance of each message characteristic when compared with the similar characteristic associated with one or more of the recipient or sender from messages having a high statistical distribution, establishing a score based on the determined degree of variance for each message characteristic and a pre-assigned weight for each characteristic and obtaining a combined score by adding scores of one or more of the message characteristics in the received message based on a pre-assigned weight.

In some embodiments, the methods may utilize a comparison of URL information in the new received message to domain and brand information associated with a well-known brand to determine the probability that the message is a phishing message.

In some embodiments, the methods may utilize additional data, such as threat intelligence data, to assist in determining the probability that the indicated sender is the actual sender.

In some embodiments, the methods may alter metadata or other message characteristic values to assist in determining the probability that the indicated sender is the actual sender. For example and not for limitation, the methods may further comprise changing a Reply-To address of the new received message determined to be the phishing message to a custom address, allowing the new received message to be delivered to the recipient of the received message, receiving a reply from the recipient at the custom address, further inspecting the new received message or the reply from the recipient, forwarding the reply to certain users for manual inspection, quarantining the reply and delivering the reply to the original Reply-To address. At some later point in time, the recipient may reply to this message which would then be routed to the changed message address where the reply message and the original received message from may be re-analyzed to determine if the original received message is a phishing attempt or phishing message. Based upon the determination, the reply may either be sent for manual examination, quarantined or routed to the original recipient. In some embodiments, the methods may comprise altering other metadata values and storing the original metadata value and the altered metadata value in a database.

In some embodiments, the methods may further comprise storing the message characteristics of the received message associated with the recipient and the sender of the received message in a database as message characteristics associated with the recipient and the sender of messages.

In some embodiments, the methods further comprise storing the recipient background information in the database.

In some embodiments, the methods may further comprise allowing an administrator to select at least one desired message characteristic to be included in the set of message characteristics used for comparing one or more of the message characteristics of the received message with the message characteristics associated with one or more of the recipient or the sender comparing the characteristics of the received message to analyze the likelihood that the received message is the phishing message. In some embodiment, the method may allow the administrator to assign a weight of how much each of the at least one desired characteristics should influence determining the likelihood that the received message is the phishing message. In some embodiments, the methods may further comprise allowing an administrator to specify at least one of the message characteristic as at least one message characteristic indicative of the phishing messages and flagging new received message messages as new phishing messages if the received message has a set of message characteristics matching the set indicative of phishing messages.

In some embodiments, the methods may further comprise importing a plurality of the received messages received by the recipient over a predetermined time interval, obtaining at least one obtained message characteristic of the imported received messages by parsing the recipient's received messages based on the predetermined message characteristic and storing the obtained message characteristic in a database. The predetermined time interval may comprise any time interval defined by the system or user through a user interface.

In some embodiments, the methods may further comprise storing logs of received messages and any associated phishing activity along with details of why the received message was determined to be the phishing message and outputting the logs of the received messages and any associated phishing activity for viewing on a display device.

In some embodiments, the methods may further comprise quarantining a received message determined to be the phishing message as a quarantined message, forwarding the quarantined message to certain users and/or adding a certain text to the header or subject of quarantined email to mark them as suspect and/or outputting the quarantined message for viewing on a display device.

In some embodiments, the methods may further comprise parsing an outbound message sent by the recipient based on a predetermined message characteristic to determine if the outbound message is a response or forward of a previously received message by the recipient, updating the database based on the above determination to indicate that the characteristics of the previously received message are more likely to represent a legitimate sender, comparing ongoing message received from the sender with stored message characteristics and using the outcome of the comparison as a factor in declaring any of the ongoing message received from the sender as a phishing message.

In some embodiments, the methods may further comprise including alerting information, such as visual identifications and reasoning information related to the received message based on the outcome of the comparison, to assist the recipient declare the received message as the phishing message. The alerting information may alert the recipient and/or recipient organization of the danger of the new received message. In some embodiments, the recipient organization may be alerted of a danger of the new received message based on a metadata from a copy of the new received message.

In some embodiments, the methods further comprise preforming activities, such as but not limited to selecting first and second message characteristics, prior to the receipt of the new received message by the recipient or the recipient organization.

In some embodiments, the methods may further comprise determining a coordinated phishing attacks against an organization by spotting a plurality of phishing attacks having similar characteristics against a plurality of users and recipients in the organization.

In some embodiments, the methods may further comprise monitoring changing patterns of outbound message to determine whether a messaging client has been compromised and the sender or sending organization is sending the phishing message.

In some embodiments, the methods may further comprise allowing users to specify a message as a phishing attempt and use the message characteristics of this flagged message to filter received messages to other users and recipients in the organization.

In some embodiments, the methods may further comprise marking certain combination of characteristics to be indicative of the phishing message and determining received messages with similar message characteristics as likely phishing messages and/or phishing attacks.

It is contemplated that the methods and components of the methods described above and herein may be used in-part and in combination to provide embodiments of methods for electronic message analysis.

Figure 2:
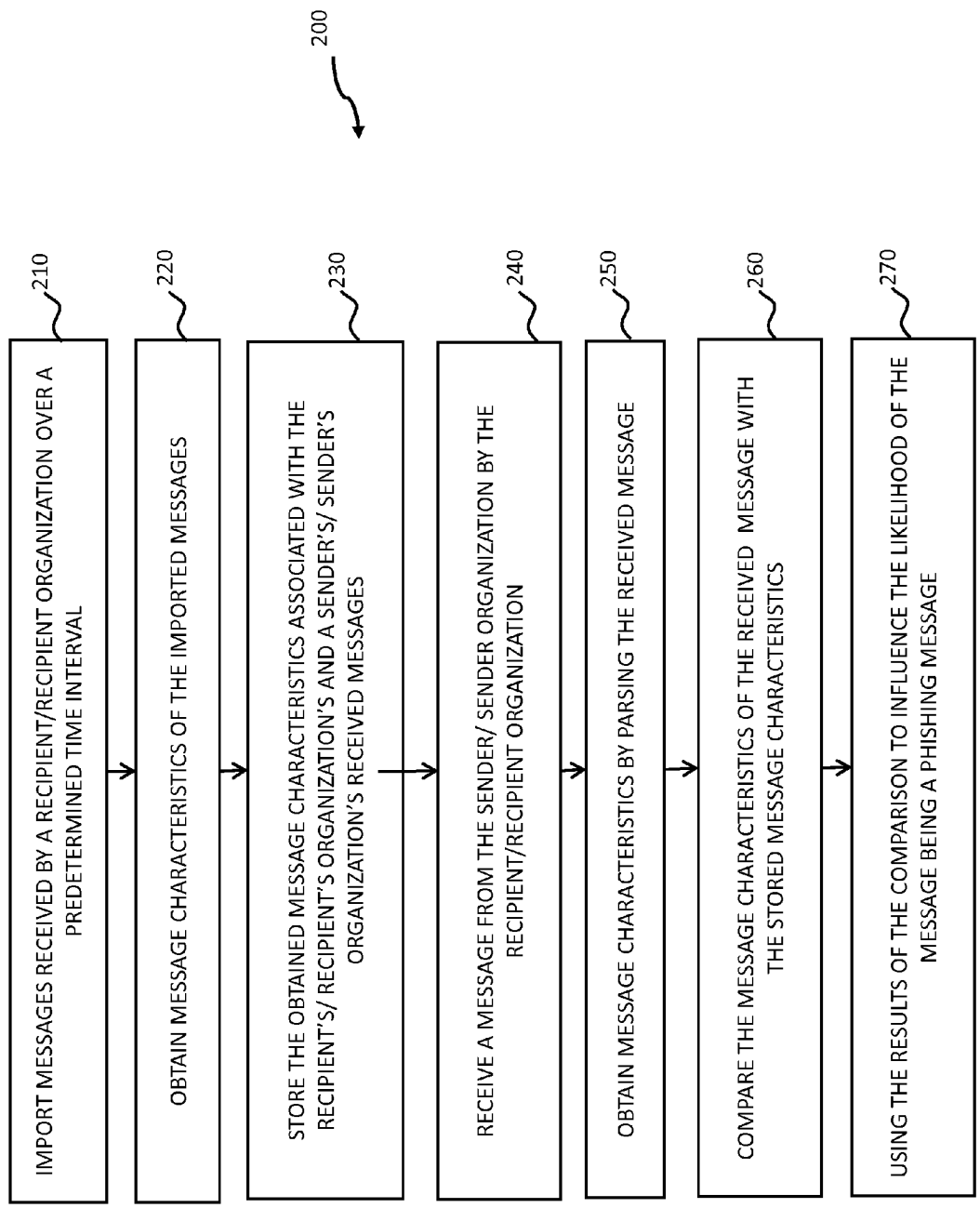
FIG. 2 illustrates a flow diagram of an example embodiment of methods for analyzing electronic messages.

FIG. 2 illustrates an example embodiment of methods for electronic message analysis showing a flow diagram of method 200 for carrying out analysis of electronic messages. At block 210 of FIG. 2, messages received by the recipient/recipient organization over a predetermined time interval are imported. At block 220, message characteristics of the imported messages are obtained by parsing the recipient's/recipient organization's received messages based on the predetermined message characteristic. The message characteristics may include those message characteristics described above. At block 230, the obtained message characteristics associated with the recipient's/recipient organization's and the sender's/sender organization's received message are stored in a database. At block 240, a message is received from a sender/sender organization for a recipient/recipient organization. At block 250, message characteristics are obtained by parsing the received message based on a predetermined message characteristic. At block 260, the message characteristics of the received message are compared with the message characteristics associated with the recipient/recipient organization, and/or the sender/sender organization. In some embodiments, an administrator is allowed to select desired message characteristics to be included in the set of characteristics used for comparing the characteristics of the received message and to assign a weight of how much each characteristic should influence the likelihood that a new message is a phishing message. Further in some embodiments, message characteristics associated with the recipient/recipient organization and sender/sender organization along with their statistical distribution is obtained. The message characteristics of the received message are then compared with the prior message characteristics associated with the recipient/recipient organization and/or sender/sender organization having a high statistical distribution. In some embodiments, message determined as phishing emails are flagged and may be stored for subsequent analysis in determining phishing characteristics of a received message. At block 270, the results of the comparison are used to influence the likelihood of the received message by the recipient/recipient organization being a phishing message.

Figure 3:
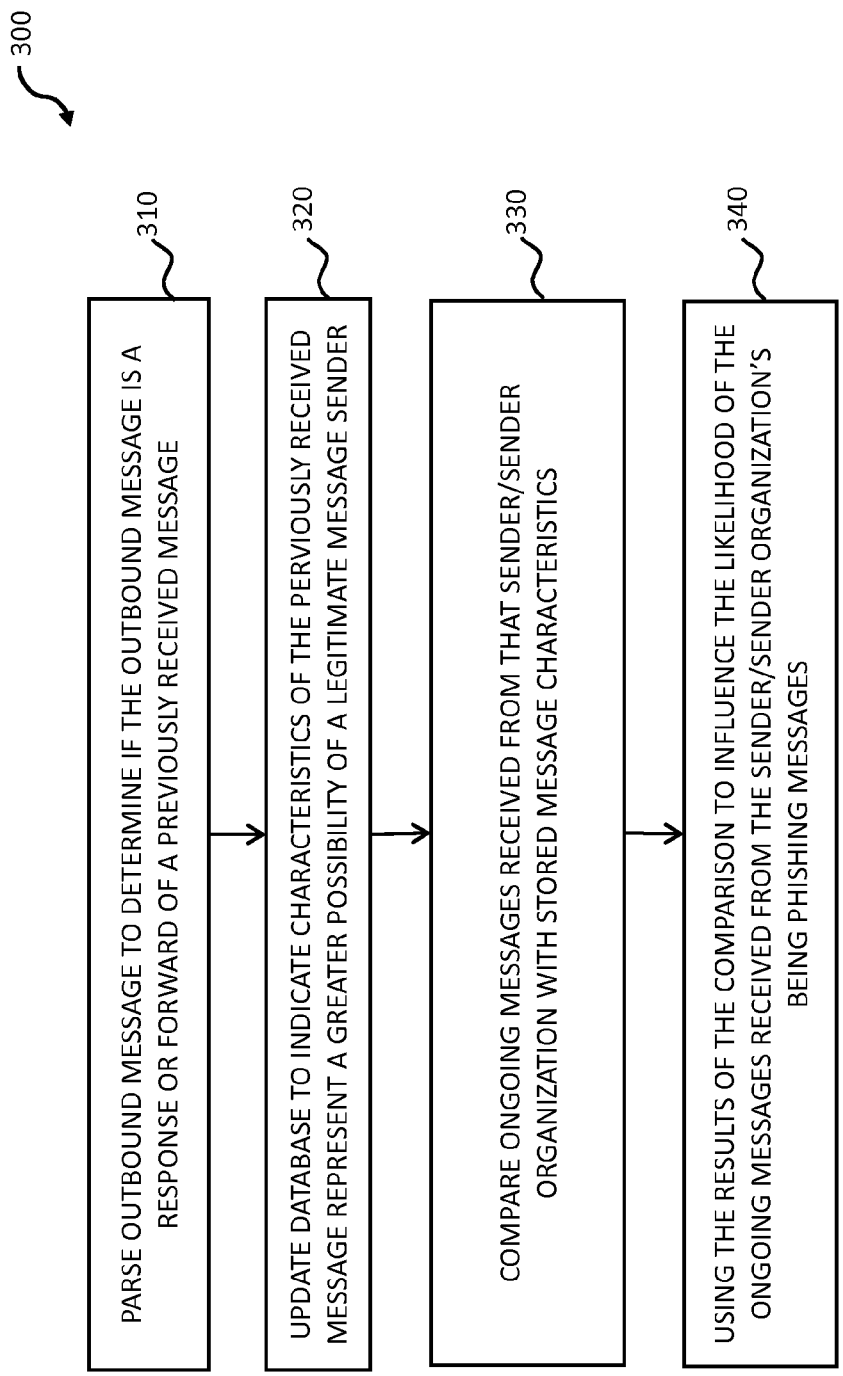
FIG. 3 illustrates a flow diagram of an example embodiment of methods for analyzing electronic messages.

FIG. 3 illustrates a flow diagram of one example embodiment of methods for carrying out analysis of electronic messages for phishing detection. At block 310 of method 300, outbound messages sent by the recipient/recipient organization are parsed based on a set of predetermined message characteristics of an outbound message, or outbound messages characteristics, to determine if the outbound message is a response or forward of a previously received message by the recipient/recipient organization. At block 320, database is updated to reflect that the characteristics of the original/previous messages that this new messages is a reply or forward to most likely represent a legitimate sender/sender organization. At block 330, ongoing messages received from that sender/sender organization are compared with stored message characteristics. At block 340, the results of the comparison are used to influence the likelihood of the ongoing messages received from the sender/sender organization's being phishing messages.

Figure 4:
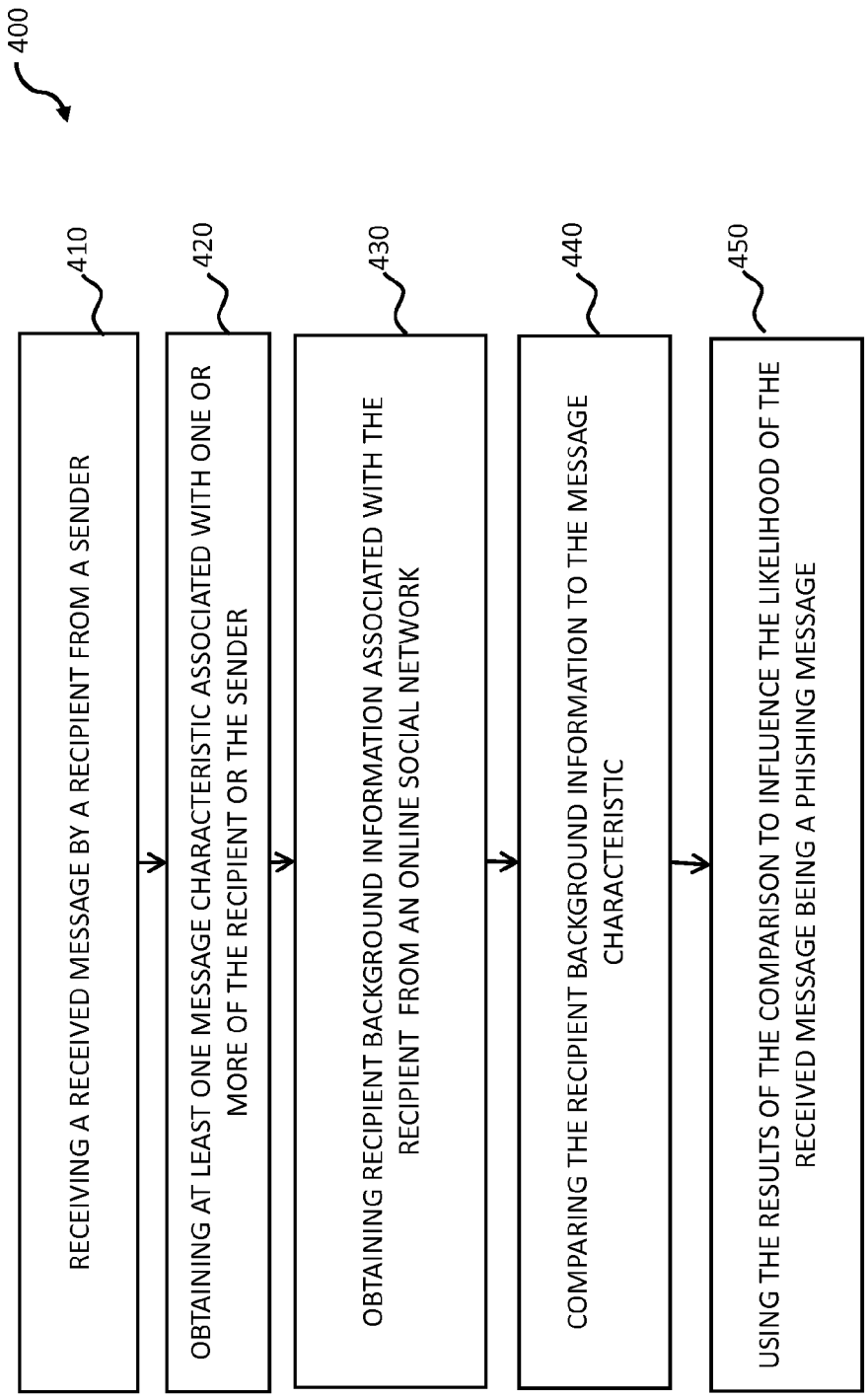
FIG. 4 illustrates a flow diagram of an example embodiment of methods for analyzing electronic messages.

Now, referring to FIG. 4, a flow diagram illustrating one example embodiment 400 for carrying out analysis of electronic messages for phishing detection will be described. The method comprises receiving a received message by a recipient from a sender at 410, obtaining at least one message characteristic associated with one or more of the recipient or the sender at 420, obtaining recipient background information associated with the recipient from an online social network at 430, comparing the recipient background information to the message characteristic at 440 and using the results of the comparison to influence the likelihood of the received message being a phishing message at 450. In some embodiments, the step of obtaining recipient background information associated with the recipient from an online social network at 430 may comprise obtaining the recipient background information from the online social network directly or by obtaining the recipient background information retrieved earlier and stored in a database. In some embodiments, the online social network is a proprietary application or group of applications with user access controlled by one organization separate from an open messaging standard application with user access controlled by another organization.

In some embodiments, the recipient background information comprises a third party authentication credential or access rights from a recipient for one or more online social network and the method further comprises: periodically using the recipient background information for accessing the online social network and retrieving an online social network data as recipient background information; storing recipient background information in a database and associating the recipient background information with a recipient contact in the database whereby the recipient background information can be retrieved on the basis of a message characteristic; comparing the recipient background information to the message characteristic comprises: finding the recipient contact by matching a message characteristic to the recipient background information retrieved from the online social network, and comparing the recipient background information of the recipient contact to the message characteristics of the received message; and determining legitimacy of the message sender based on the comparison of the recipient background information of the recipient contact to the message characteristics of the received message. In some embodiments, the step of finding the recipient contact by matching a message characteristic to the recipient background information retrieved from the online social network comprises at least one of the methods selected from the group consisting of finding the recipient contact by matching a sender name contact identifier or a similar misspelling thereof to a contact name recipient contact identifier in the recipient background information retrieved from the online social network of the recipient, finding the recipient contact by matching a sender email address contact identifier or a similar misspelling thereof to a contact email address recipient contact identifier in the recipient background information retrieved from the online social network of the recipient, finding the recipient contact by matching the domain part of the sender email address contact identifier to a domain name associated with one of a contact place of employment or places of education in the background information of the recipient obtained from the online social network of the recipient, finding the recipient contact by matching the sender phone number contact identifier to a contact phone number recipient contact identifier in the recipient background information retrieved from the online social network of the recipient, or finding the recipient contact by matching the sender third party identifier contact identifier to an identifier recipient contact identifier in the recipient background information retrieved from the online social network of the recipient. In some embodiments, the step of comparing the recipient background information of the recipient contact to the message characteristics of the received message comprises at least one of methods comprising: comparing the message characteristic of the language used in the received message to a language indicated as spoken by the recipient contact in the recipient background information, determining a physical location of where the received message was sent from by cross referencing an IP address of the sent message against a GeoIP database and comparing this location against the physical location of the contact or phone number area code or place of employment or place of education as specified in the recipient background information, and determining a quality of a relationship between the recipient and the recipient contact by evaluating the recipient background information obtained from the online social network and using the quality of a relationship to as another criteria in determining whether to inform the recipient about the quality of the sender associated with the message and as a factor in determining if the message is a phishing message. In some embodiments, the step of determining a quality of a relationship between the recipient and the recipient contact by evaluating the recipient background information obtained from the online social network comprises one or more recipient background information selected from the group consisting of: a length of time recipient contact has spent on the online social network; a length of time recipient contact and recipient have known each other; a number of other contacts both recipient contact and recipient share in common; a number of groups recipient contact and recipient participate in together; a number of places of work, education shared by recipient contact and recipient; a number of received email messages recipient contact and recipient have shared; and a number of online social network the recipient contact and recipient are connected on. These types of recipient background information can then be used as another criteria in determining whether to inform the recipient about the quality of the sender associated with the message and as a factor in determining if the message is a phishing message. In some embodiments, the quality of the employer or the place of education of a recipient contact is used as another attribute to assess the recipient contacts legitimacy whereby the duration of the presence of the company profile on the online social network, the completeness of the profile, the number and frequency of messages posted, the number of other users associated with the profile and the like are examined. The quality of the employer can then be used to determine the quality of the sender associated with the message and as a factor in determining if the message is a phishing message.

In some embodiments, the recipient background information comprises a social network data and a third party authentication credential or access rights from the recipient for the online social networks. For example, the third party authentication credentials may include authentication credentials for one or more third party social networks such as Facebook, LinkedIn, Google+, Twitter and the like. In some embodiments, the online social network data comprises one selected from the group consisting of a contact, a contact identifier, a contact name, an email address, a phone number, an educational affiliation, employment data, a residence and work address, a language spoken, a date when the recipient contact became related to the recipient on the online social networks, a number of online social networks the recipient contact and the recipient are connected on, a date when the recipient contact joined the online social networks, a number of messages recipient contact and recipient have exchanged, text of the messages written by the contact, a number of other contacts that recipient contact and recipient are both related to, a group the recipient contact and the recipient share in common, and information about the employer or place of education of the contact including the amount of content available about the organization, number of people associated with it and the like An illustration of one embodiment of FIG. 4 can be provided using the recipient contacts as one of the recipient background information. In this example, at 440, the message senders name and email address are compared to the social network contacts available of the receiver. The relevant contact is found by comparing message senders name against the names of contacts retrieved from recipient social networks or by comparing message senders email address against the email address of contacts retrieved from recipient online social networks or by comparing the domain part of the message senders email address against the domain names associated with the contacts places of employment and/or places of education or any other such method that is made available by the data retrieved from the social network or by comparing the message senders phone number against the phone number of contacts retrieved from recipient online social networks or by comparing the message senders third party identifier against the third party identifier of contacts retrieved from recipient online social networks. Once the contact is found various tests are conducted to compare message characteristics against the social network properties of the contact including comparing the language used in the message to languages indicated as those spoken by the contact, or determining the physical location of where the message was sent from by cross referencing the IP address of the sent message against a GeoIP database and subsequently comparing this location against the physical location of the contact or phone number area code or place of employment or place of education as specified in the social network, or determining the quality of the relationship between the message recipient and the contact by evaluating background information obtained from the social networks such as the length of time contact has spent on the social network, length of time contact and message recipient have known each other, number of other contacts both contact and user share in common, number of groups contact and user participate in together, number of places of work, education shared by contact and user, number of message contact and message recipient have shared, number of social networks contact and message recipient are connected on and the like and using the quality of a relationship to as another criteria in determining whether to inform the recipient about the quality of the sender associated with the message and as a factor in determining if the message is a phishing message. Additionally the reputation of the organization associated with the message sender is also examined by examining the duration of time their profile has been active, number of other people associated with the organization, the amount of content associated with the organization and the like. The reputation of the organization associated with the message sender can be used to determine the quality of the sender associated with the message and as a factor in determining if the message is a phishing message.

In some embodiments, the methods further comprise comparing the message characteristic of the received message with the message characteristics associated with one or more of the recipient or the sender and influence the likelihood of the received message being a phishing message based on the outcome of the comparison of the recipient background information to the message characteristic and the outcome of the comparison of the message characteristic of the received message with the message characteristic associated with one or more of the recipient or the sender. For example, one embodiment comprises retrieving recipient background information for a hypothetical recipient Dagny Taggart—dtaggart@taggarttc.com—from her online social networks. Upon receiving a new email message from a hypothetical sender—John Smith— jsmith@jsmithco.com—not only is the recipient background information obtained (in real time or in the past) from the social networks of Dagny Taggart compared against the email data associated with John Smith, but the email characteristics of the new received email message are compared with email characteristics of emails sent by John Smith to Dagny Taggart in the past. For example, John Smith's profile on a social network may indicate his address as one in California. Additionally all emails sent by John Smith to Dagny Taggart in the past have been sent using a Comcast connection on an IPhone. If all three of these characteristics compare positively the likelihood of the email being a phish would be reduced.

In some embodiments, the methods further comprise the recipient belonging to an recipient organization having at least one other recipient in the recipient organization and the recipient background information associated with the recipient comprises one of the recipient background information associated with the recipient or the recipient background information associated with the other recipient in the recipient organization.

In some embodiments, the online social network comprises one of a first online social network of the recipient or a second online social network of the other recipient.

In some embodiments, the method comprises receiving an electronic message from an indicated sender to a recipient as a new received message, the electronic message received from a messaging application, the new received message having at least one message characteristic provided by the messaging application, receiving a recipient background information associated with the recipient, the recipient background information comprising recipient background information from at least one online social network, the at least one online social network comprising a source of recipient data separate from the messaging application, the at least one online social network requiring an authentication utilizing an authentication credential or an access right associated with the recipient to provide the recipient background information, comparing the recipient background information to the at least one message characteristic, and determining a probability that the indicated sender of the new received message is an actual originator of the new received message. In these embodiments, the message characteristics may be provided by a messaging application and the recipient background information may be taken from another application or data source separate from the message application. The social network application may have one client and the messaging application may have a different client. For example, in one embodiment, a sender Joe Smith joesmith@joesmith.com may send an email using an apple iphone and a google gmail mail server to Mary Wilkins marywilkins@marywilkins.com who uses a Microsoft exchange mail server and an Microsoft Outlook Client. This email would use open standards such as SMTP to traverse between the google gmail email server and the Microsoft Exchange mail server. In one embodiment the method would receive the message prior to the Microsoft Exchange mail server receiving it and would access Mary Wilkins LinkedIn connection using Mary Wilkins authorization key from the Mary Wilkins recipient background information. In this embodiment, the method would obtain information regarding Joe Smith using the senders name and or email address and would obtain information indicative of Joe Smith's contact details, profile on LinkedIn as well as commonalities in Joe Smith's and mary Wilkins profiles and would use this information to determine that Mary Wilkins and Joe Smith know each other and that the it is unlikely that the message is a phishing message. In some embodiments this information would be retrieved from a social network, stored, and subsequently retrieved from storage. In some embodiments, analysis to determine relationship quality and reputation quality would be done, stored and retrieved upon receipt of a message from a sender. For example, in one embodiment, a sender John Smith johnsmith@johnsmith.com may send an email using an apple iphone and a google gmail mail server to Mary Wilkins marywilkins@marywilkins.com who uses a Microsoft exchange mail server and an Microsoft Outlook Client. This email would use open standards such as SMTP to traverse between the google gmail email server and the Microsoft Exchange mail server. In one embodiment the method would receive the message prior to the Microsoft Exchange mail server receiving it and would access Mary Wilkins LinkedIn connection using Mary Wilkins authorization key from the Mary Wilkins recipient background information. In some embodiments, the method may look for actual sender message patterns or patterns associated with John Smith or John Smith in the Mary Wilkins recipient messaging identity information and not finding any matches with John Smith would then use Mary Wilkin's recipient background information to find John Smith. In some embodiments by finding a match in the recipient background information and depending upon the quality of John Smith's profile and the relationship quality between John Smith and Mary Wilkins the method is able to treat John Smith as somebody known to Mary Wilkins. In other embodiments, by determining that John Smith and Mary Wilkins know each other well via the recipient background information the method may increase the checks on the message to ensure that Mary Wilkins is not being phished using the identity of John Smith. In some embodiments the content of the message could then be compared against messages written by John in Mary's recipient background information to determine if the message sender is really John Smith.

Now, referring to FIG. 9, a flow diagram illustrating one example embodiment 900 for carrying out analysis of electronic messages for phishing detection will be described. The method comprises receiving an electronic message from an indicated sender to a recipient as a new received message with the new received message having at least one message characteristic at 910, receiving a recipient background information associated with the recipient with the recipient background information comprising recipient background information from at least one online social network at 920, comparing the recipient background information to the at least one message characteristic at 930 and determining a probability that the indicated sender of the new received message is an actual originator of the new received message at. In some embodiments, the step of obtaining recipient background information associated with the recipient from an online social network at 920 may comprise obtaining the recipient background information from the online social network directly or by obtaining the recipient background information retrieved earlier and stored in a database.

One example embodiment illustrating the methods of FIG. 9 comprises receiving text messages on a cellular phone from a hypothetical sender with a phone number 987-654-3210 and callerid John Smith to a hypothetical recipient Dagny Taggart with phone number 123-456-7890. Upon recipient of this text message the recipient background information for Dagny Taggart or the recipient background information associated with colleagues of Dagny Taggart is retrieved. Recipient contacts within this recipient background information are searched using message characteristics such as the name John Smith or the phone number 987-654-3210. In some embodiments recipient contacts received from recipient background information and stored in the database are searched. A matching recipient contact can then be examined in more detail to determine if the indicated sender is the actual sender of the text message and the result can be used as a factor to determine phishing.

Now, referring to FIG. 10, a flow diagram illustrating one example embodiment 1000 for carrying out analysis of electronic messages for phishing detection will be described. The method comprises importing a plurality of received messages received by the recipient as imported received messages over a predetermined time interval with the imported received message having at least one message characteristic at 1010, identifying a recipient contact from a recipient background information using the message characteristic at 1020, retrieving a recipient background information associated with the recipient for the sender of the imported received message comprising recipient background information regarding the sender of imported received message from at least one online social network at 1030 and storing recipient contact with recipient background information and message characteristics in the database at 1040.

Figure 10:
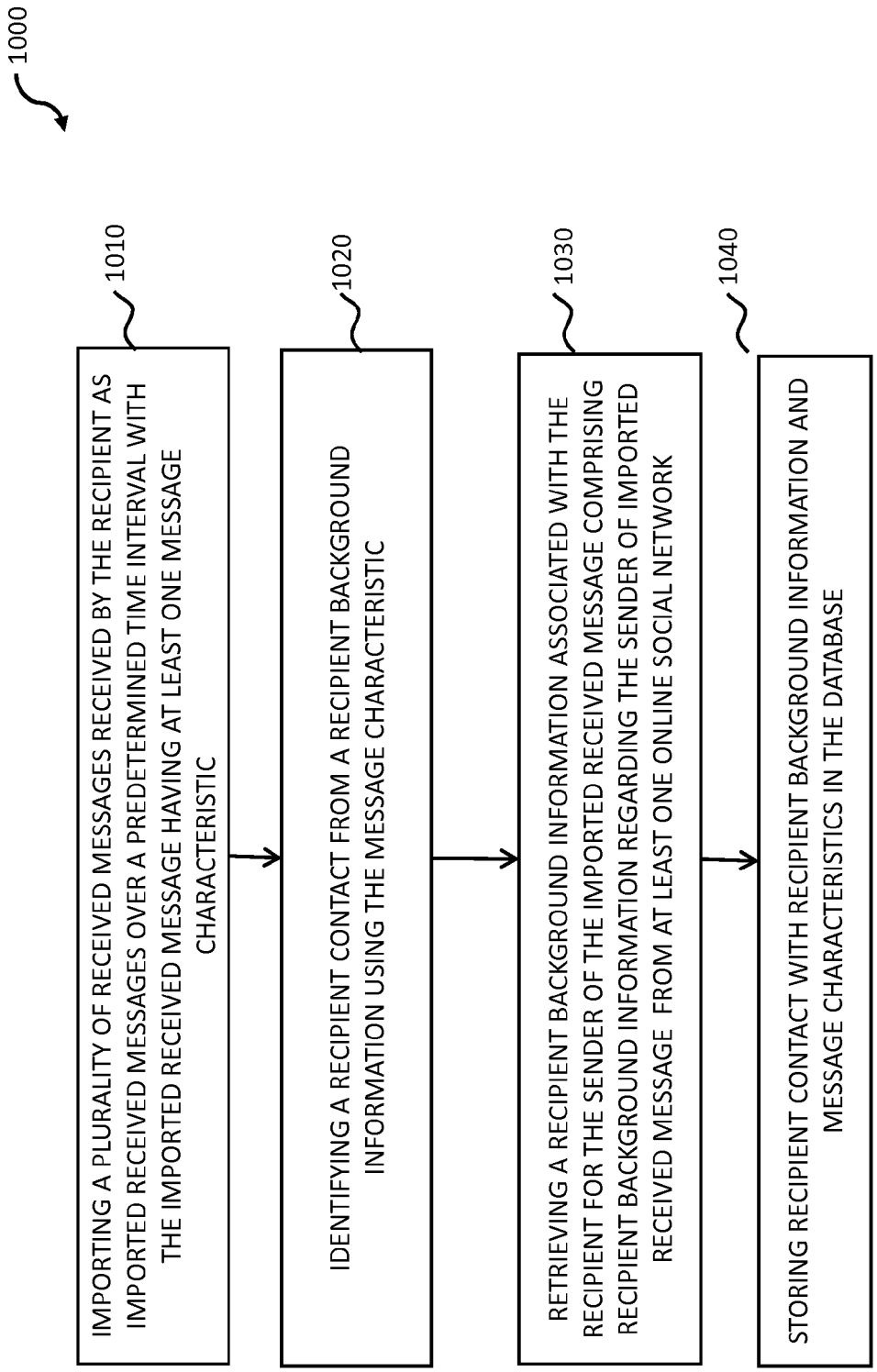
FIG. 10 illustrates a flow diagram of an example embodiment of methods for analyzing electronic messages.

One example embodiment illustrating the methods of FIG. 10 comprises receiving emails from multiple senders to a hypothetical recipient Dagny Taggart—dtaggart@taggarttc.com. For each email, the recipient background information for Dagny Taggart or the recipient background information associated with colleagues of Dagny Taggart recipient contacts matching sender message characteristic of the received email are retrieved. In some embodiments recipient contacts may be regularly retrieved and stored in a database such that remote access to online social networks is not necessary. In some embodiments data from one or more online social networks can be associated with the same recipient contact. In some embodiments, the data retrieved from the recipient background information can be used to update the data regarding the recipient contacts in the database. In some embodiments, the domain name used in the sender email can be used to search the recipient background information for information regarding the background and quality of the organization that owns the domain name and the resultant can be used to influence the likelihood that the email is a phishing message. In some embodiments, the quality of the organization that owns the domain name can be examined by using the recipient background information to look at the duration of the presence of the company profile on the online social network, the completeness of the profile, the number and frequency of messages posted, the number of other users associated with the profile and the like. In some embodiments, URL's included in the body of the email can be compared to the recipient background information from online social networks to determine if the URL and/or a domain host of the URL are in the background information which may reflect the URL and/or domain host to be high quality URL, or well known or well traversed by the recipient, and the result of the comparison may be used as a factor to influence the likelihood that the email is a phishing message.

In some embodiments, the methods may comprise importing a plurality of received messages received by the recipient over a predetermined time interval, obtaining a plurality of message characteristics of the imported received messages by parsing the recipient received message based on a predetermined message characteristic and storing the message characteristics associated with the recipient and the sender received messages in a database.

In some embodiments, the methods for electronic message analysis utilize pattern matching techniques. In some embodiments, determining the probability that the indicated sender is the actual sender is performed using pattern matching techniques. In some embodiments, the pattern matching techniques allow patterns and pattern labels to represent one or multiple message characteristics. Since certain classification techniques can include a degree of similarity rather than a binary similarity of "yes" or "no", more granular estimates and probability may be obtained and be used to determine whether a message is from an actual sender.

In some embodiments, the methods may comprise applying a classification engine to the email characteristics to define a message characteristic pattern, receiving a new received message, applying the classification engine to the new received message to define a new received message characteristic pattern, comparing the new received message characteristic pattern to the message characteristic pattern to determine whether the new received message characteristic pattern is similar to the message characteristic pattern, and using the results of the comparison to influence the likelihood of the new received message being a phishing message. In some embodiments, the methods further comprise: storing the message characteristics in a database and grouping the message characteristics into a first group and a second group; the first group comprising the message characteristics of a plurality of received messages selected based on a name of the sender, an email address of the sender and names and email addresses of the recipients of the received message; the second group comprising the message characteristics of the plurality of received messages selected based on the name of the sender and the email address of the sender of the received email message; training a classification engine to the message characteristics comprises applying a classification engine to the first and second group of message characteristics to create a first group message characteristic pattern and a second group message characteristic pattern; and comparing the new received message characteristic pattern to the message characteristic pattern comprises comparing the new received message characteristic pattern to at least one of the first group message characteristic pattern and the second group message characteristic pattern.

In some embodiments, the methods may comprise storing the received message characteristics in a database, grouping the received message characteristics into a plurality of pattern groupings and each pattern grouping being defined by a pattern characteristic, storing the pattern groupings in a database along with a count of received messages with the message characteristics that place it in the pattern grouping, receiving a new received message, comparing the message characteristics of the new received message with the pattern characteristics, and using the outcome of the comparison as a factor in declaring the new received message by the recipient as a phishing message. In some embodiments, the pattern groupings comprise at least one of the group consisting of a sender and recipient group pattern representing the message characteristics of the sender and the recipient, a sender and recipient organization group pattern representing the message characteristics associated with the sender and an organization of the recipient, a sender organization and recipient group pattern representing the message characteristics associated with an organization of the sender and the recipient, a sender organization and recipient organization group pattern representing the message characteristics associated with the organization of the sender and the organization of the recipient, a sender organization group pattern representing the message characteristics associated with the organization of the sender organization, and a sender group pattern representing the message characteristics associated with the sender. In some embodiments, the step of storing the pattern groupings in a database along with a count of received messages with the message characteristics that place it in the pattern grouping comprises storing the pattern groupings in a database along with one or more of the count or a chronology of received messages with the message characteristics that place it in the pattern grouping.

Figure 5A:
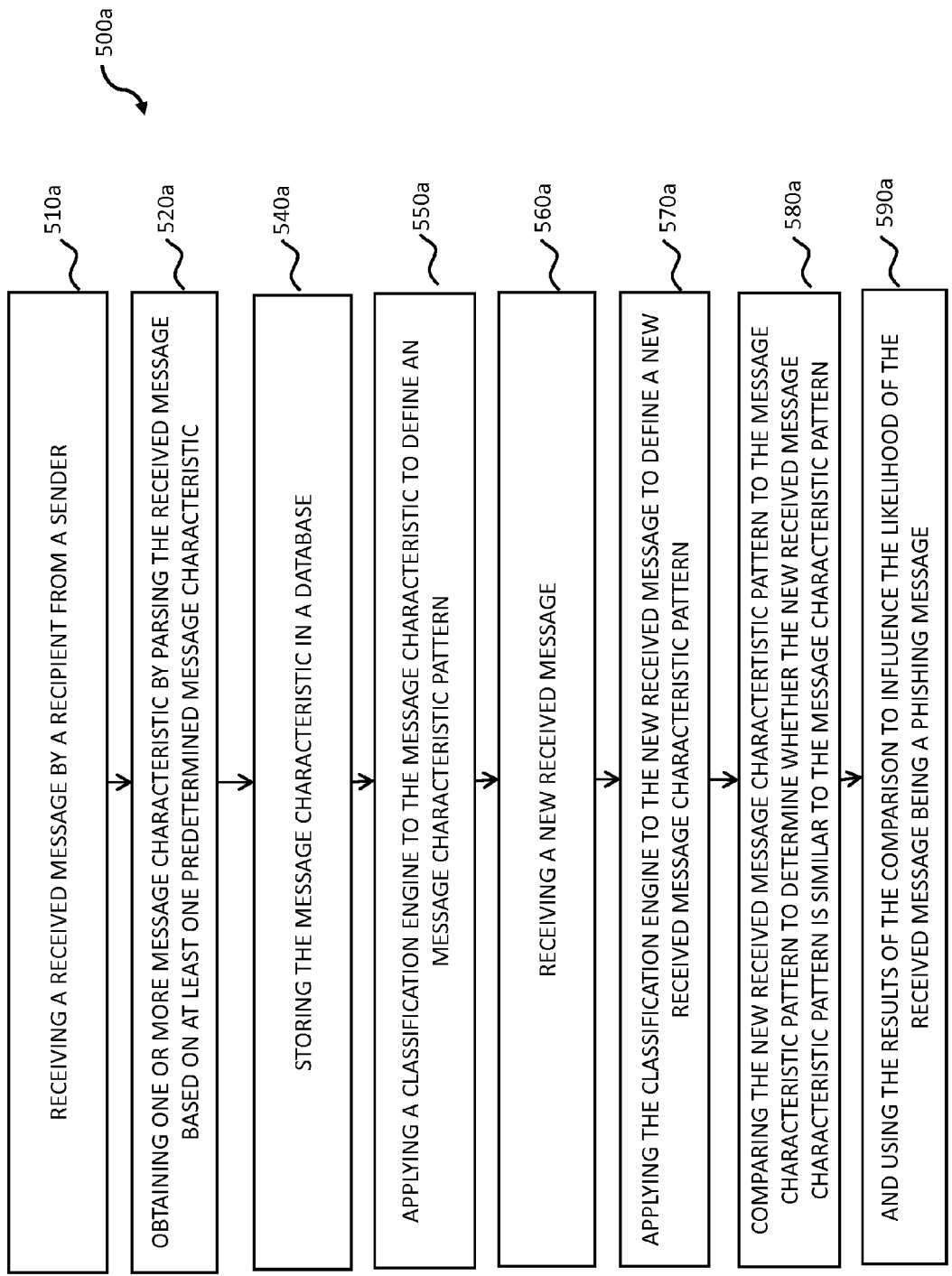
FIG. 5A illustrates a flow diagram of an example embodiment of methods for analyzing electronic messages.

FIG. 5A illustrates one example embodiment of a computer implemented method for analyzing electronic messages for phishing detection which may utilize message characteristic patterns to help determine whether the new received message is a phishing message. One example embodiment of this method 500a comprises receiving a received message by a recipient from a sender at 510a, obtaining one or more message characteristic by parsing the received message based on at least one of a set of predetermined message characteristics at 520a, the message characteristic comprising one or more of a sender message characteristic or a recipient message characteristic, storing the message characteristic in a database at 540a, applying a classification engine to the message characteristic to define a message characteristic pattern at 550a, receiving a new received message at 560a, applying the classification engine to the new received message to define a new received message characteristic pattern at 570a, comparing the new received message characteristic pattern to the message characteristic pattern to determine whether the new received message characteristic pattern is similar to the message characteristic pattern at 580a and using the results of the comparison to influence the likelihood of the received message being a phishing message at 590a. In some embodiments, applying a classification engine to the message characteristics comprises applying a classification engine to a first and a second group of message characteristics to create a first group message characteristic pattern and a second group message characteristic pattern, and comparing the new received message characteristic pattern to the message characteristic pattern comprises comparing the new received message characteristic pattern to at least one of the first group message characteristic patterns and the second group message characteristic patterns. In some embodiments, storing the message characteristics in a database further comprises grouping the message characteristics into a first group and a second group; the first group comprising the email characteristics of a plurality of received messages selected based on a name of the sender, an email address of the sender and a name and email address of the recipient of the received message; the second group comprising the message characteristics of the plurality of received messages selected based on the name of the sender and the email address of the sender of the received message; applying a classification engine to the message characteristics comprises applying a classification engine to the first and second group of message characteristics to create a first group message characteristic pattern and a second group message characteristic pattern; and comparing the new received message characteristic pattern to the message characteristic pattern comprises comparing the new received message characteristic pattern to at least one of the first group message characteristic pattern and the second group message characteristic pattern. In some embodiments, the message characteristics comprise the content of the received message and the new received message. In some embodiments, the methods may further comprise accruing a minimum number of received messages in each group, storing the results of the training, and updating the training of an algorithm in the classification engine with the new received message characteristics. The minimum number of received messages may be a minimum number of imported received messages.

One example embodiment illustrating the methods of FIG. 5A comprises receiving emails from a hypothetical sender—John Smith—jsmith@jsmithco.com to a hypothetical recipient Dagny Taggart—dtaggart@taggarttc.com. In this example the email data would be broken into message characteristics such as the quality of words utilized, the amount of whitespace and punctuation characters, the character case and other characteristics. The classification engine would then build two message characteristic patterns based on these characteristics one for all emails received in the system from John Smith—jsmith@jsmithco.com regardless of the recipient and the other message characteristic pattern for emails from John Smith—jsmith@jsmithco.com to Dagny Taggart—dtaggart@taggarttc.com. Upon receiving a new message from John Smith the classifier would break the new email into similar characteristics—build a message characteristic pattern of these characteristics and then compare the message characteristic pattern of the new received message to the previously created message characteristic patterns to assess if the emails writing style was similar to the other emails received from John Smith.

Figure 5B:
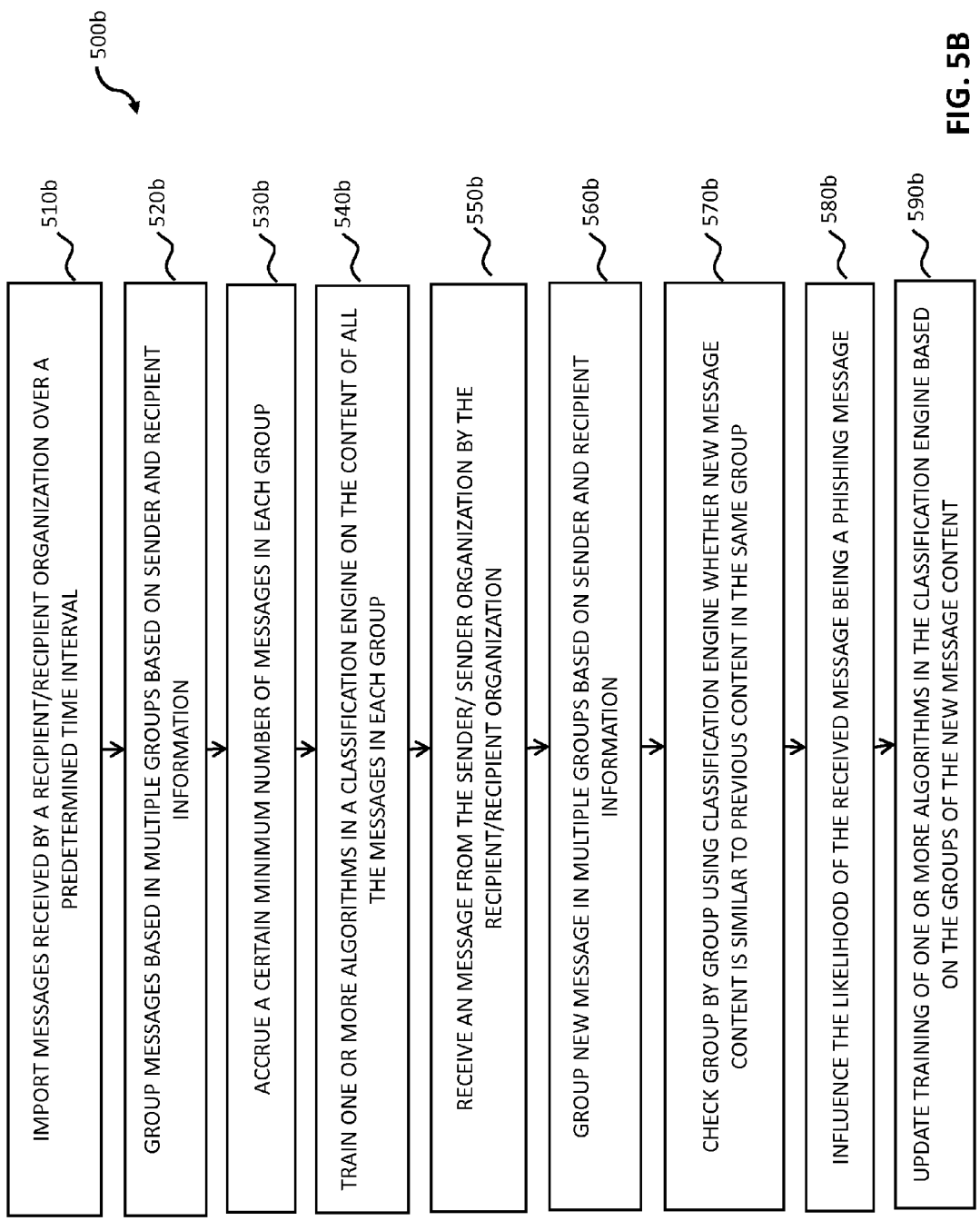
FIG. 5B illustrates a flow diagram of an example embodiment of methods for analyzing electronic messages.

FIG. 5B illustrates one example embodiment of the methods for electronic message analysis utilizing email message characteristic patterns. FIG. 5B illustrates a flow diagram of method 500b for carrying out analysis of electronic messages for phishing detection.

Now, referring to FIG. 5, at block 510b, messages received by the recipient/recipient organization over a predetermined time interval are imported.

At block 520b, each message is grouped into multiple groups: first group based on the messages sender name, sender email address, and the email addresses of the recipients on the message and the second group based just on message sender name, sender email address email.

At block 530b, messages are accrued in each group until a certain minimum threshold of messages are present.

At block 540b, one or more algorithms such as but not limited to Neural Nets, Hidden Markov Models and the like are trained using a classification engine on the contents of the message in each group. This training serves the purpose of teaching the classification engine to find commonalities in each group that can be used to compare future message to ascertain if they truly belong to the group. Different algorithms have different levels of success thus one or more algorithms are trained on each group.

At block 550b, a message is received from a sender/sender organization for a recipient/recipient organization.

At block 560b, the new message is grouped into multiple groups: first group based on the message sender name, sender email address, and the email addresses of the recipients on the email and the second group based just on message sender name, sender email address email.

At block 570b, the classification engine checks each algorithm trained on the groups associated with the new message against the content of the new message to determine if the new message shares commonalities with the other message in its groups. Depending upon the determination at block 580b the likelihood of the received message being a phishing message is influenced. At block 590b, the training of each algorithm in the classification engine is updated with the contents of the new message.

Figure 11:
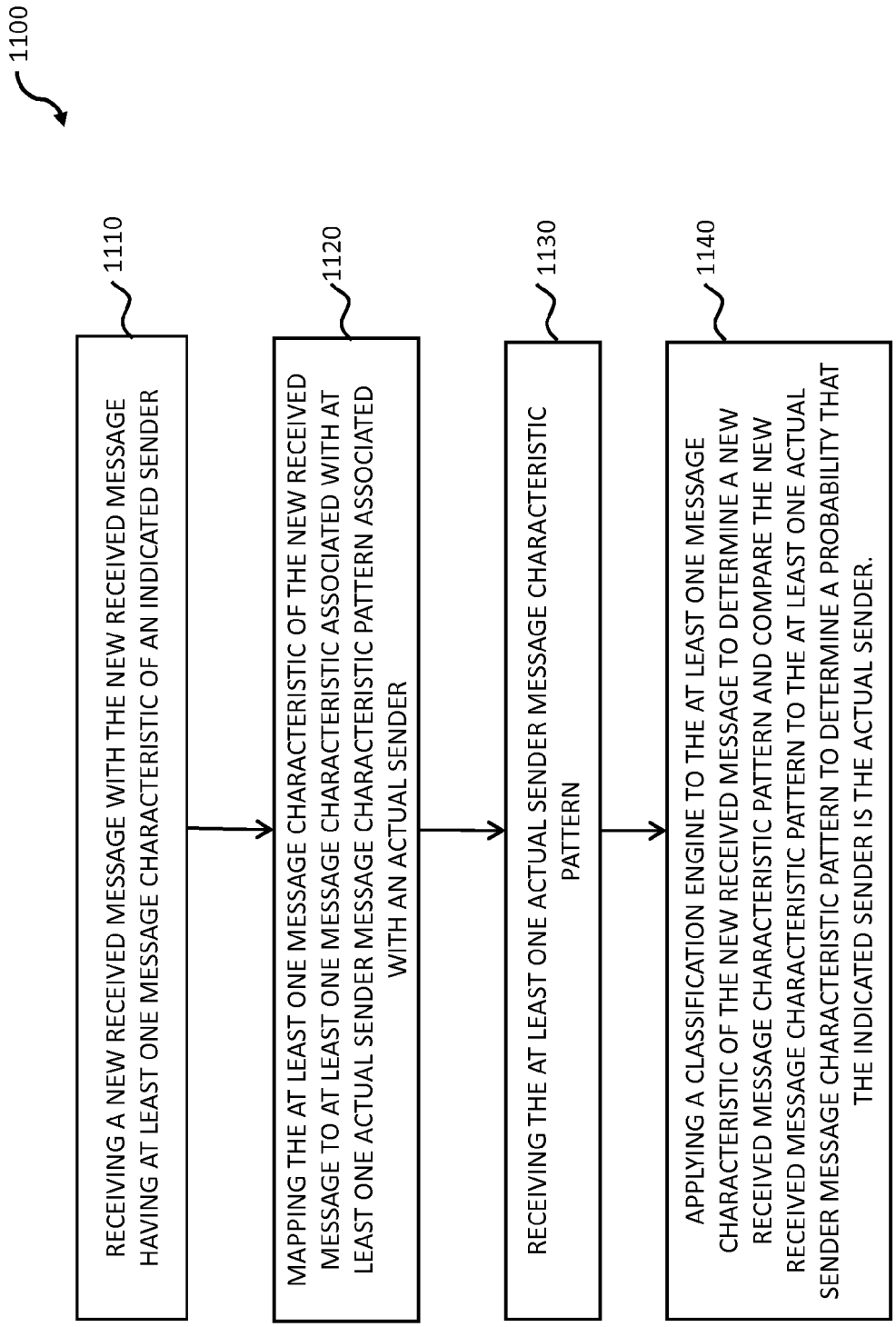
FIG. 11 illustrates a flow diagram of an example embodiment of methods for analyzing electronic messages.

FIG. 11 illustrates one embodiment of a computer implemented method for analyzing electronic messages for phishing detection which may utilize message characteristic patterns to help determine whether the new received message is a phishing message. One example embodiment of this method 1100 comprises receiving a new received message with the new received message having at least one message characteristic of an indicated sender at 1110, mapping the at least one message characteristic of the new received message to at least one message characteristic associated with at least one actual sender message characteristic pattern associated with an actual sender at 1120, receiving the at least one actual sender message characteristic pattern at 1130, and applying a classification engine to the at least one message characteristic of the new received message to determine a new received message characteristic pattern and compare the new received message characteristic pattern to the at least one actual sender message characteristic pattern to determine a probability that the indicated sender is the actual sender at 1140.

One example embodiment illustrating the methods of FIG. 11 comprises receiving emails from a hypothetical sender—John Smith—jsmith@jsmithco.com to a hypothetical recipient Dagny Taggart—dtaggart@taggarttc.com. In this example the message would be broken into message characteristics such as common words, dictionary words, non-dictionary words, phrases, proper nouns, the quality of words utilized, the amount of whitespace and punctuation characters, the character case and others. One or more attributes of the new received message will then be used to retrieve sender message characteristic patterns. In this example, for instance the name John Smith could be used to receive all sender message characteristic patterns created for a John Smith. Upon receiving sender message characteristic patterns the appropriate classification engine can be applied to compare the message characteristics of the new received message against the retrieved sender message characteristic patterns for John Smith to determine if the sender of the message is really John Smith. This comparison would then influence the likelihood of the new received message being classified as phishing.

One example embodiment illustrating the methods of FIG. 11 comprises receiving a text message on a phone from a hypothetical sender with a phone number 987-654-3210 and callerid John Smith to a hypothetical recipient Dagny Taggart with phone number 123-456-7890. In this example the message would be broken into message characteristics such as common words, dictionary words, non-dictionary words, phrases, proper nouns, the quality of words utilized, the amount of whitespace and punctuation characters, the character case and others. One or more attributes of the new received message will then be used to retrieve sender message characteristic patterns. In this example, for instance the name John Smith could be used to receive all sender message characteristic patterns created for a John Smith. Upon receiving sender message characteristic patterns the appropriate classification engine can be applied to compare the message characteristics of the new received message against the retrieved sender message characteristic patterns for John Smith to determine if the sender of the message is really John Smith. This comparison would then influence the likelihood of the new received message being classified as phishing.

In one example embodiment a computer implemented method for analyzing electronic messages comprises using a received electronic message from a sender, training a plurality of text classifiers on a content of the received electronic message with a sender label, training the plurality of text classifiers on a content of other received electronic message from other senders with an impostor label, the sender label comprising electronic messages from the sender, the impostor label comprising electronic messages from other senders, wherein received electronic message is labeled as either sender or impostor and then provided to the text classifier, wherein each text classifier has a weight assigned to the two labels such that the sum of the weights is a hundred, wherein the plurality of text classifiers have different weights assigned to the two labels, receiving a new received electronic message from an indicated sender, determining a quality of the message, selecting a text classifier for the indicated sender such that if the message quality of the new received electronic message is high the text classifier that is chosen has a high sender label weight, using the text classifier to classify the new received electronic message into the sender or impostor label, and using the results of the text classifier as one factor in determining the probability of the new received electronic message being a phishing message. For example and not for limitation, consider the following as one example of this embodiment. A first email is received from Alice for Bob. The system creates three text classifiers. It trains the first text classifier with Alice's email calling it the sender email. It also trains the text classifiers with other emails from Mary and calls these emails impostor emails. The first of three classifiers has a 75% probability bias that new emails that the text classifier it used to compare against will be sender and 25% probability bias that the new email is an impostor. The second text classifier has a 60% probability bias of sender and 40% of impostor and the third text classifier has a 50% probability bias of new emails being a sender or impostor. When a new email is received, the email is checked to see if it is of high or low quality. The quality determination is made using characteristics such as compliance with standards such as SPF, DKIM, DMARC, presence of digital certificates, misspellings in the emails or IP/Domain reputation. Based upon the quality determination the new email is judged to be of high quality. Since it is likely that the new email is really from the sender, the classifier with the high sender bias is checked.

In some embodiments, selecting a text classifier for the sender such that if the message quality of the new received electronic message is high the text classifier that is chosen has a high sender label weight comprises selecting a text classifier for the sender such that if the message quality of the new received electronic message is high the text classifier that is chosen has a low sender label weight. For example and not for limitation, consider the following as one example of this embodiment. A first email is received from Alice for Bob. The system creates three text classifiers. It trains the first text classifier with Alice's email calling it the sender email. It also trains the text classifiers with other emails from Mary and calls these emails impostor emails. The first of three classifiers has a 75% probability bias that new emails that the text classifier it used to compare against will be sender and 25% probability bias that the new email is an impostor. The second text classifier has a 60% probability bias of sender and 40% of impostor and the third text classifier has a 50% probability bias of new emails being a sender or impostor. When a new email is received, the email is checked to see if it is of high or low quality. The quality determination is made using characteristics such as compliance with standards such as SPF, DKIM, DMARC, presence of digital certificates, misspellings in the emails or IP/Domain reputation. Based upon the quality determination the new email is judged to be of high quality. Since it is likely that the new email is really from the sender, the classifier with the low sender bias is checked to confirm that the email really is from the sender.

In one example embodiment analyzing electronic messages with a classification engine, the methods may further comprise importing a plurality of received messages received by the recipient as imported received messages over a predetermined time interval, retrieving the message characteristics for each imported received message, grouping the imported received messages by one or more unique sender identifiers and training the classification engine on at least one message characteristic of the imported received messages for the unique sender identifiers that have a minimum number of imported received messages to create one or more unique sender message characteristic patterns that represents a positive actual sender classified message characteristic pattern or a positive unique sender classified message characteristic pattern that increases the probability that the new received message was from the unique sender.

Figure 14:
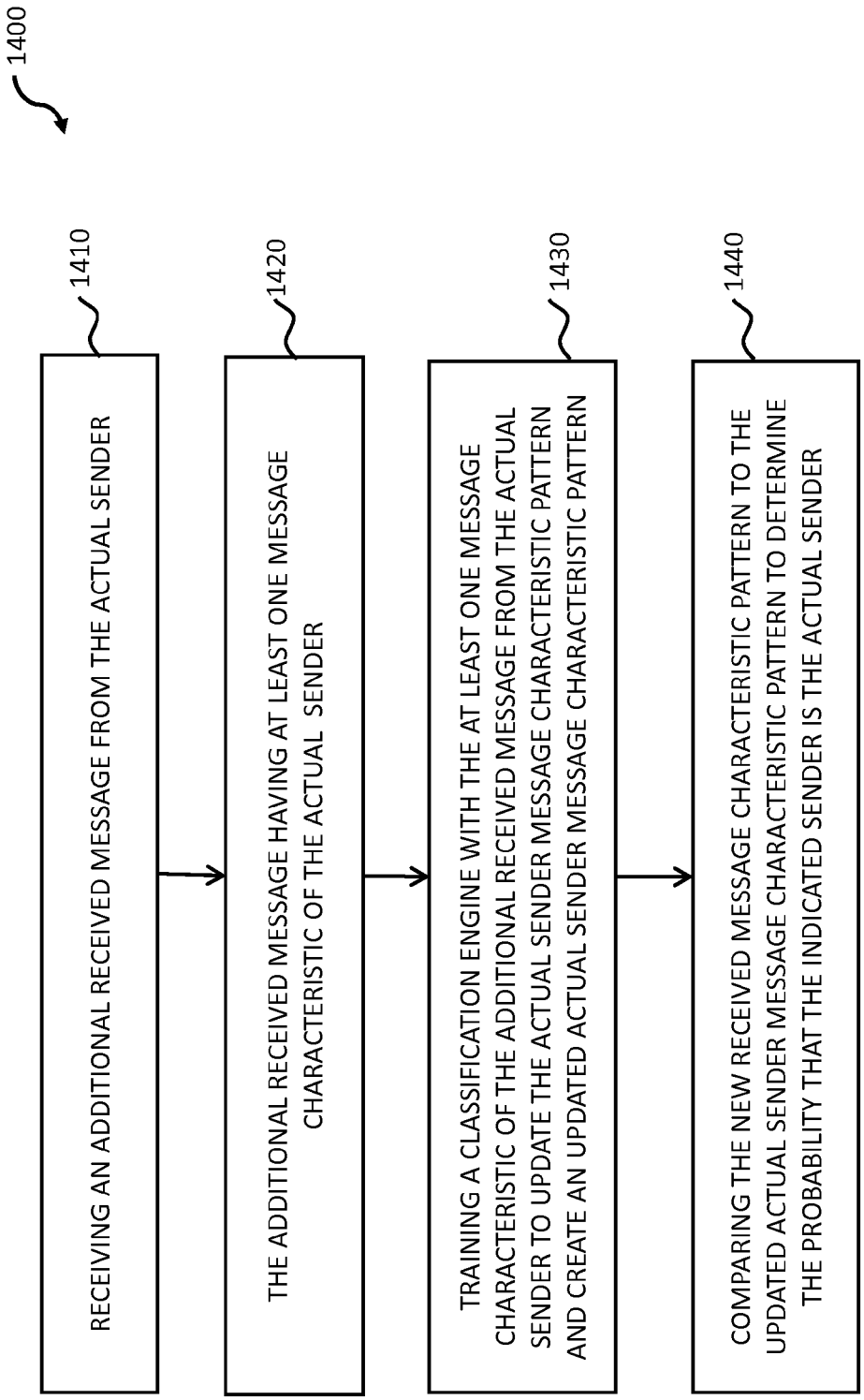
FIG. 14 illustrates a flow diagram of an example embodiment of methods for analyzing electronic messages.

Referring to FIG. 14, some of the embodiments described may further comprise methods to update message characteristic patterns. As shown, the methods may further the steps of method 1400 which comprise receiving an additional received message from the actual sender at 1410, the additional received message having at least one message characteristic of the actual sender as shown at 1420, training a classification engine with the at least one message characteristic of the additional received message from the actual sender to update the actual sender message characteristic pattern and create an updated actual sender message characteristic pattern at 1430 and comparing the new received message characteristic pattern to the updated actual sender message characteristic pattern to determine the probability that the indicated sender is the actual sender.

Figure 12:
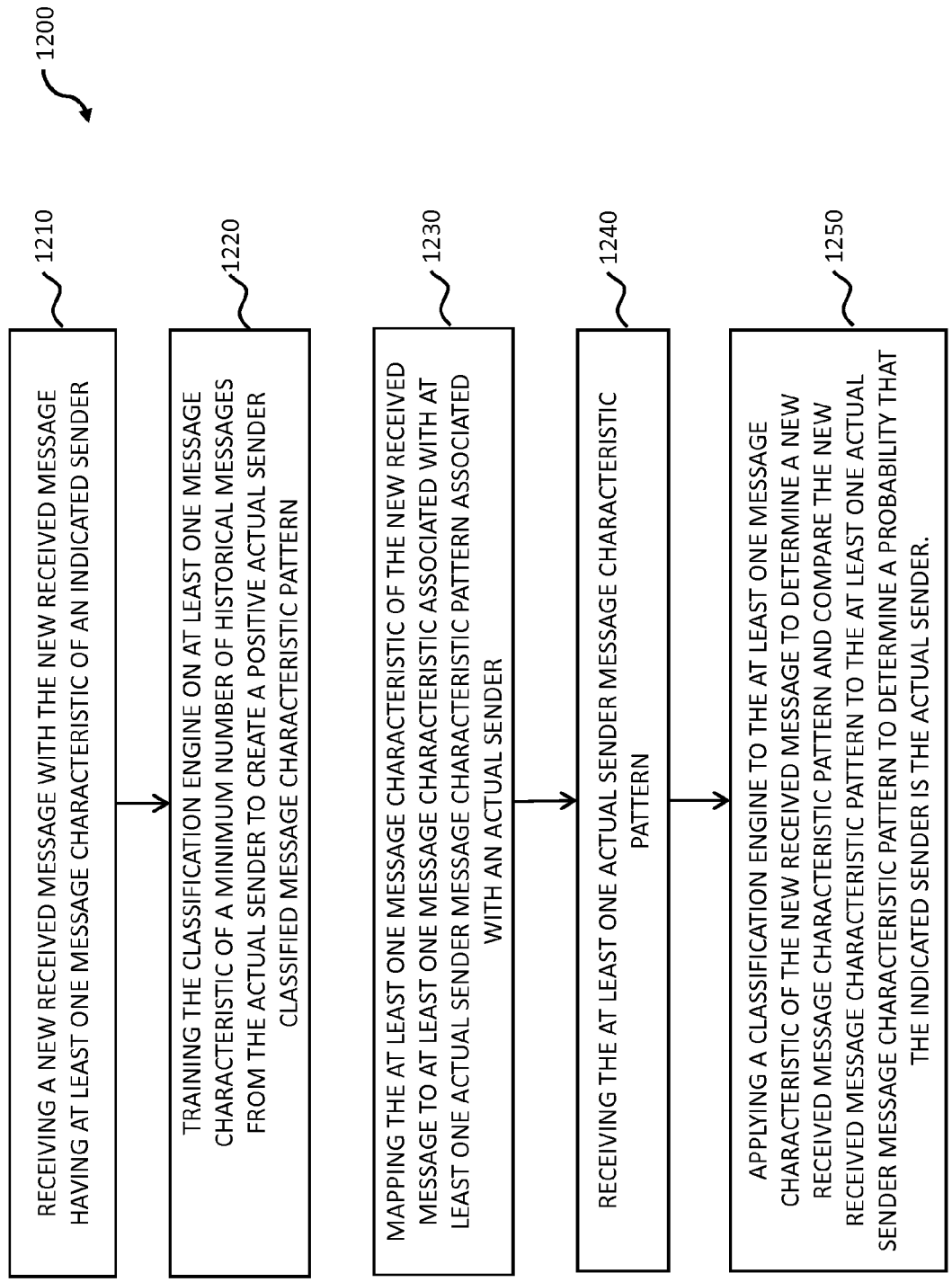
FIG. 12 illustrates a flow diagram of an example embodiment of methods for analyzing electronic messages.

FIG. 12 illustrates one example embodiment of a computer implemented method for analyzing electronic messages for phishing detection which may utilize message characteristic patterns to help determine whether the new received message is a phishing message. One example embodiment of this method 1200 comprises receiving a new received message with the new received message having at least one message characteristic of an indicated sender at 1210, training the classification engine on at least one message characteristic of a minimum number of historical messages from the actual sender to create a positive actual sender classified message characteristic pattern at 1220, mapping the at least one message characteristic of the new received message to at least one message characteristic associated with at least one actual sender message characteristic pattern associated with an actual sender at 1230, receiving the at least one actual sender message characteristic pattern at 1240, and applying a classification engine to the at least one message characteristic of the new received message to determine a new received message characteristic pattern and compare the new received message characteristic pattern to the at least one actual sender message characteristic pattern to determine a probability that the indicated sender is the actual sender at 1250.

One example embodiment illustrating the methods of FIG. 12 comprises receiving emails from a hypothetical sender—John Smith—jsmith@jsmithco.com to a hypothetical recipient Dagny Taggart—dtaggart@taggarttc.com. In this example the message would be broken into message characteristics such as common words, dictionary words, non-dictionary words, phrases, proper nouns, the quality of words utilized, the amount of whitespace and punctuation characters, the character case and others. Once multiple messages from John Smith have been collected they will be broken into message characteristics and a classification engine will be applied to them to create an actual sender message characteristic pattern for John Smith that represents a positive actual sender classified message characteristic pattern. In some embodiments only messages from John Smith will be used and an actual sender message characteristic pattern for John Smith that represents a positive actual sender classified message characteristic pattern will be created. In some embodiments, only messages from senders who are not John Smith will be used to create a negative actual sender classified message characteristic pattern that will be a part of the actual sender message characteristic pattern for John Smith. In some embodiments messages from both John Smith and other senders will be used so that the classifier knows what John Smith writes like and excludes from that the writing characteristics of other senders resulting in an actual sender message characteristic pattern for John Smith. In some embodiments, only one classification engine will be utilized to create the actual sender message characteristic pattern for John Smith. In some embodiments only one classification engine will be utilized to create multiple actual sender message characteristic patterns for John Smith, where each pattern has been derived using different classification algorithms. In some embodiments multiple classification engines will be used to create multiple actual sender message characteristic patterns for John Smith each with one or more algorithms. On receipt of a new message, one or more message characteristics of the new message will be used to retrieve actual sender message characteristic patterns. In this example, for instance the name John Smith could be used to receive all actual sender message characteristic patterns created for a John Smith. Upon receiving actual sender message characteristic patterns for John Smith the appropriate classification engine can be applied to compare the message characteristics of the new received message against the retrieved actual sender message characteristic patterns for John Smith to determine if the sender of the message is really John Smith. In some embodiments, if the classification engine compares the message characteristics of the new received message to an actual sender message characteristic pattern that comprises a positive actual sender classified message characteristic pattern then a positive comparison would increase the likelihood of the message having been written by sender. In some embodiments, if the classification engine compares the message characteristics of the new received message to a actual sender message characteristic pattern that comprises the negative actual sender classified message characteristic pattern then a positive comparison would decrease the likelihood of the message having been written by sender. In some embodiments, if the classification engine compares the message characteristics of the new received message to an actual sender message characteristic pattern that was built using message characteristics from the sender and message characteristics from messages that are not from the sender then the outcome of the comparison would indicate a probability of the new received message being either from the sender or not from the sender and a positive comparison with the sender would increase the likelihood of the message having been written by sender. In some embodiments if a classification engine is used to compare the message characteristics of the received message against multiple actual sender message characteristic patterns, then the probability that the received message may be a phishing message may be based on a calculation of the individual probabilities determined by the classification engine for each actual sender message characteristic pattern. This comparison would then influence the likelihood of the new received message being classified as phishing.

Figure 13:
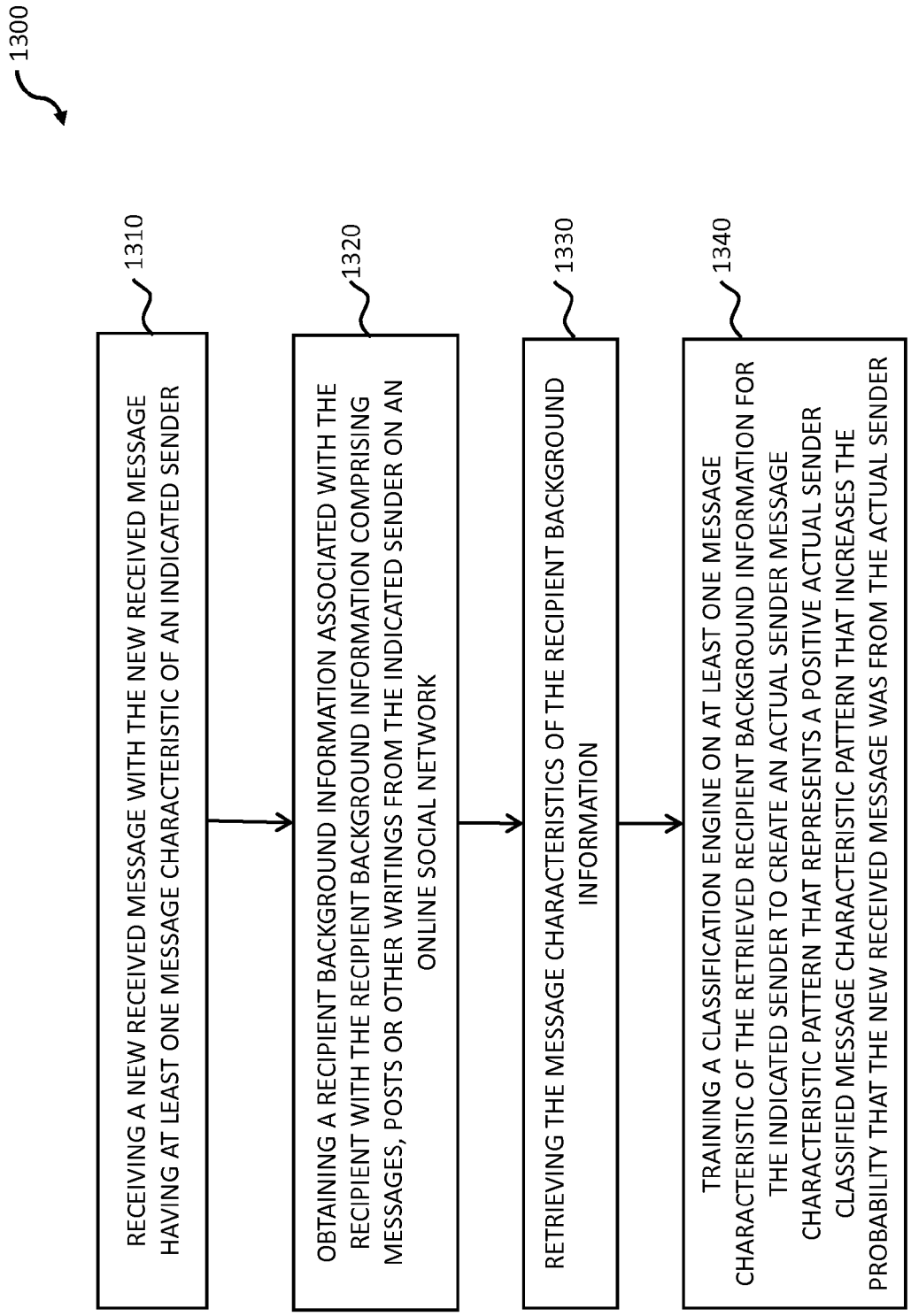
FIG. 13 illustrates a flow diagram of an example embodiment of methods for analyzing electronic messages.

FIG. 13 illustrates one example embodiment of a computer implemented method for analyzing electronic messages for phishing detection which may utilize message characteristic patterns to help determine whether the new received message is a phishing message. One example embodiment of this method 1300 comprises receiving a new received message with the new received message having at least one message characteristic of an indicated sender at 1310, obtaining a recipient background information associated with the recipient with the recipient background information comprising messages, posts or other writings from the sender on an online social network at 1320, retrieving message characteristics of the recipient background information at 1330, and training a classification engine on at least one message characteristic of the retrieved recipient background information for the sender to create an actual sender message characteristic pattern that represents a positive actual sender classified message characteristic pattern that increases the probability that the new received message was from the actual sender at 1340.

One example embodiment illustrating the methods of FIG. 13 comprises receiving emails from a hypothetical sender—John Smith—jsmith@jsmithco.com to a hypothetical recipient Dagny Taggart—dtaggart@taggarttc.com. In this example the message would be broken into message characteristics such as common words, dictionary words, non-dictionary words, phrases, proper nouns, the quality of words utilized, the amount of whitespace and punctuation characters, the character case and others. The recipient background information for Dagny Taggart or another person associated with Dagny Taggert's would then be retrieved using a message characteristic such as the John Smith's email address or his JSmithCo and the name John Smith. Messages written by John Smith would then be retrieved from the online social networks and the classification engine would be trained on these retrieved messages to create an actual sender message characteristic pattern for John Smith comprising a positive actual sender classified message characteristic pattern representative of John Smith's writing. In some embodiments, the classifier may also be trained on messages not written by John Smith so that the classifier can distinguish those message characteristics that are specific to John Smith. The classification engine would then be applied to the message characteristics of the new received message against the actual sender message characteristic pattern representing John Smith's writing to determine if the author of the message is the same as the author of the messages on the social networks. This comparison would then influence the likelihood of the new received message being classified as phishing.

Figure 15:
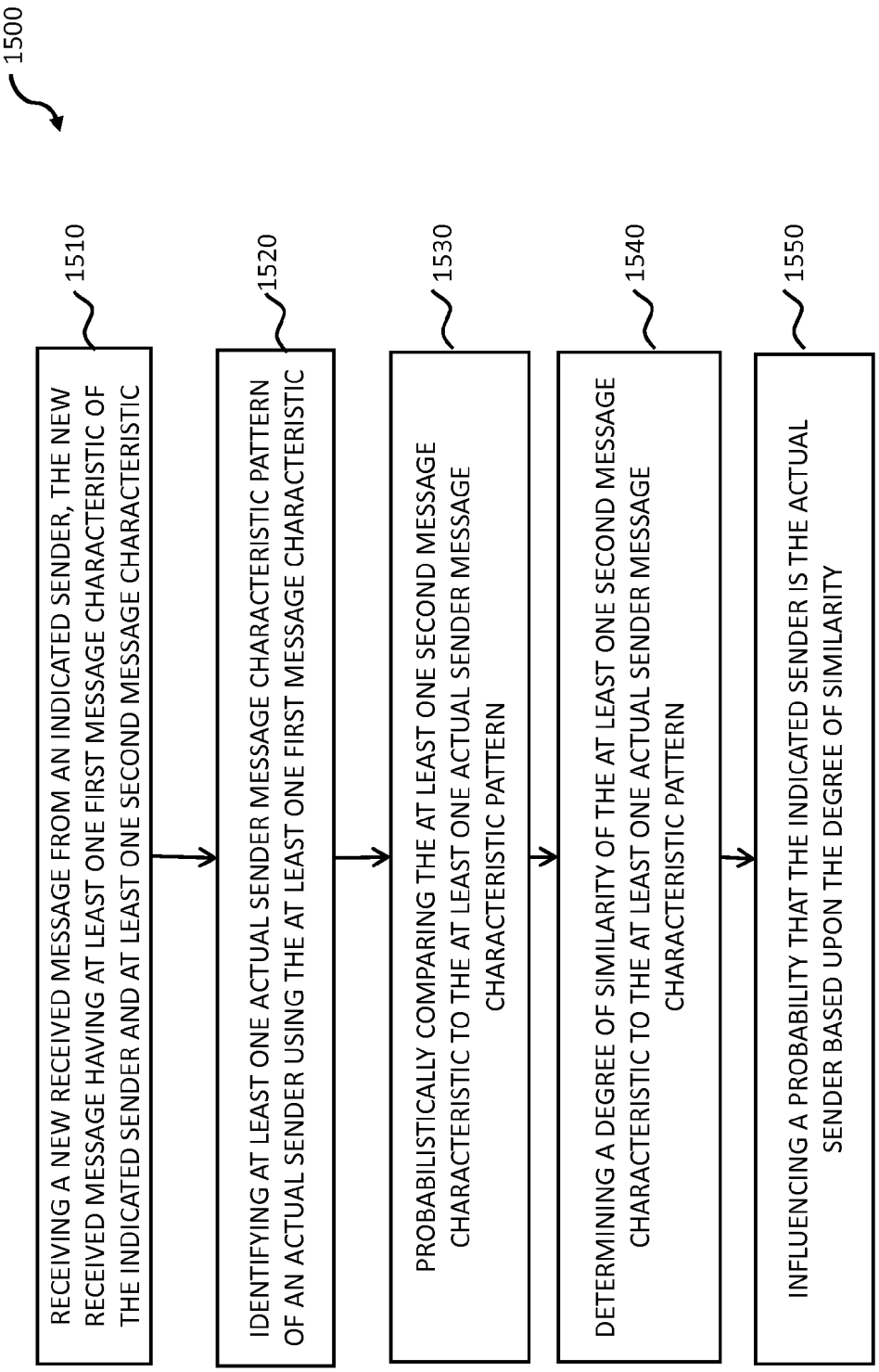
FIG. 15 illustrates a flow diagram of an example embodiment of methods for analyzing electronic messages utilizing message characteristic patterns.

As illustrated in FIG. 15, one example embodiment of computer implemented methods for analyzing electronic messages 1500 comprises receiving a new received message from an indicated sender at 1510 with the new received message having at least one first message characteristic of the indicated sender and at least one second message characteristic, identifying at least one actual sender message characteristic pattern of an actual sender using the at least one first message characteristic at 1520, probabilistically comparing the at least one second message characteristic to the at least one actual sender message characteristic pattern at 1530, determining a degree of similarity of the at least one second message characteristic to the at least one actual sender message characteristic pattern 1540, and influencing a probability that the indicated sender is the actual sender based upon the degree of similarity at 1550. To illustrate an example and not for limitation, one embodiment comprises receiving a new email from a sender Joe Smith with an email address joesmith@joesmith.com. Upon receipt, the first message characteristics including the name and/or the email address and possibly first message characteristics from the message are extracted and used to retrieve previously created actual sender message characteristic patterns. These actual sender message characteristic patterns represent Joe Smith's e-mail style. It is important to note that the retrieval may result in zero or more patterns being retrieved and in certain embodiments a quality score of the new email may be used to further select the actual sender message characteristic patterns meeting the quality of the new email. In other embodiments, an evaluation threshold may be used to ascertain the actual sender message characteristic patterns readiness for use. Once a certain number of actual sender message characteristic patterns have been selected second message characteristics such as the content of the new email are probabilistically compared against the selected actual sender message characteristic patterns. This probabilistic comparison entails a comparison of second message characteristics to one or more labels within the actual sender message characteristic patterns using a classification engine. In some embodiments a label may represent Joe Smith, in other embodiments a label may represent Joe Smith when he writes to a certain recipient, in other embodiments a label may represent senders who are not Joe Smith. The result of the probabilistic comparison indicates the likelihood of the new email actually being from the Joe Smith who has sent previous emails. And this result is used to change the likelihood of this email being a phishing email.

In some embodiments, the at least one actual sender message characteristic pattern comprising at least one message characteristic label, the step of probabilistically comparing the at least one second message characteristic to the at least one actual sender message characteristic pattern comprises comparing the at least one second message characteristic to the at least one message characteristic label, and the step of determining a degree of similarity of the at least one second message characteristic to the at least one actual sender message characteristic pattern comprises determining a degree of similarity of the at least one second message characteristic to the at least one message characteristic label.

In some embodiments, the at least one actual sender message characteristic pattern comprises a first message characteristic label and at least one second message characteristic label, the step of probabilistically comparing the at least one second message characteristic to the at least one actual sender message characteristic pattern comprises probabilistically comparing the at least one second message characteristic to the first message characteristic label and comparing the at least one second message characteristic to the at least one second message characteristic label, and the degree of similarity of the at least one second message characteristic to the at least one actual sender message characteristic pattern comprises a selection of at least one of a degree of similarity of the at least one second message characteristic to the first message characteristic label and a degree of similarity of the at least one second message characteristic to the at least one second message characteristic label.

In some embodiments, the step of identifying at least one actual sender message characteristic pattern of an actual sender using the at least one first message characteristic comprises, determining a probability of similarity of the at least one first message characteristic to an actual sender message characteristic, the probability of similarity is a probability value between 0% and 100%, and identifying at least one actual sender message characteristic pattern of the actual sender using the probability of similarity of the at least one first message characteristic to the actual sender message characteristic.

In some embodiments, the degree of similarity of the at least one second message characteristic to the at least one actual sender message characteristic pattern comprises a value between 0% and 100%.

In some embodiments, the method further comprises comparing the probability that the indicated sender is the actual sender to a threshold and withholding the new received message from being relayed to a recipient if the probability does not meet the threshold.

In some embodiments, the methods further comprise preforming activities prior to the receipt of the new received message. In some embodiments, the method further comprises selecting, before receipt of the new received message, the at least one first message characteristic from a plurality of message characteristics. In some embodiments, the method further comprises selecting, by an administrator before receipt of the new received message, the at least one first message characteristic from a plurality of message characteristics. In some embodiments, the method further comprises dynamically selecting, before receipt of the new received message, the at least one first message characteristic from a plurality of message characteristics. In some embodiments, the method further comprises selecting, before receipt of the new received message, the at least one second message characteristic from a plurality of message characteristics. In some embodiments, the method further comprises dynamically selecting, before receipt of the new received message, the at least one second message characteristic from a plurality of message characteristics.

In some embodiments, the method further comprises training a classification engine on a minimum number of historical messages from the actual sender to create at least one new actual sender message characteristic pattern, and the at least one new actual sender message characteristic pattern comprises at least one positive actual sender message characteristic label whereby a positive comparison of the at least one second message characteristic to the at least one positive actual sender message characteristic label increases the probability that the indicated sender is the actual sender.

In some embodiments, the method further comprises training a classification engine on at least one message characteristic of a minimum number of historical messages from the actual sender to a specific recipient to create at least one new actual sender message characteristic pattern, and the at least one new actual sender message characteristic pattern comprises at least one positive actual sender recipient message characteristic label whereby a positive comparison of the at least one second message characteristic to the at least one positive actual sender recipient message characteristic label increases the probability that the indicated sender is the actual sender.

In some embodiments, the method further comprises training a classification engine on at least one message characteristic of a minimum number of historical messages from the actual sender to a recipient at a recipient organization to create at least one new actual sender message characteristic pattern, and the at least one new actual sender message characteristic pattern comprises at least one positive actual sender recipient organization message characteristic label whereby a positive comparison of the at least one second message characteristic to the at least one positive actual sender recipient organization message characteristic label increases the probability that the indicated sender is the actual sender.

In some embodiments, the method further comprises receiving at least one additional received message from the actual sender, training a classification engine with the at least one additional received message from the actual sender to update the at least one actual sender message characteristic pattern, and the at least one actual sender message characteristic pattern comprises at least one updated positive actual sender message characteristic label whereby a positive comparison of the at least one second message characteristic to the at least one updated positive actual sender message characteristic label increases the probability that the indicated sender is the actual sender.

In some embodiments, the method further comprises receiving at least one additional received message from the actual sender, training a classification engine with the at least one additional received message from the actual sender to create at least one new actual sender message characteristic pattern, and the at least one new actual sender message characteristic pattern comprises at least one new positive actual sender message characteristic label whereby a positive comparison of the at least one second message characteristic to the at least one new positive actual sender message characteristic label increases the probability that the indicated sender is the actual sender.

In some embodiments, the method further comprises importing a plurality of received messages as imported received messages over a predetermined time interval, grouping the imported received messages by at least one sender identity message characteristic, training a classification engine on a group by group basis on at least one second imported message characteristic of each imported received message to create at least one new actual sender message characteristic pattern, and the at least one new actual sender message characteristic pattern comprises at least one positive unique sender message characteristic label associated with the actual sender whereby a positive comparison of the at least one second message characteristic to the at least one positive unique sender message characteristic label for the actual sender increases the probability that the indicated sender is the actual sender.

In some embodiments, the method further comprises determining a quality measure for the new received message, importing a plurality of received messages as imported received messages over a predetermined time interval, determining an imported message quality measure for each of the plurality of received messages, grouping the imported received messages by at least one sender identity message characteristics and the imported message quality measure, training a classification engine on a group by group basis on at least one second imported message characteristic of each imported received message to create at least one new actual sender message characteristic pattern, and the at least one new actual sender message characteristic pattern comprises at least one positive actual sender message characteristic label associated with the actual sender whereby a positive comparison of the at least one second message characteristic of the new received message with a quality measure similar to the imported message quality measure of the at least one positive actual sender message characteristic label for the actual sender increases the probability that the indicated sender is the actual sender.

For example, one embodiment comprises creating actual sender message characteristic patterns for one or more senders by importing historical email received from them. So assume Joe Smith, joesmith@joesmith.com and Mary Smith, mary@marysmith.com have emailed Dan Jones in the past. Messages from Dan Jones's mailbox will be imported. They will first be grouped by first message characteristics and then one or more actual sender message characteristic patterns will be created for each group. Each actual sender message characteristic pattern will have one or more labels that is created using a classification engine. In some embodiments, each label may be updated using new messages received from a sender matching the first message characteristics associated with the label actual sender message characteristic pattern. In some embodiments, actual sender message characteristic patterns, may be created upon receipt of sufficient message matching a common first message characteristic. In some embodiments a quality indicator will also be determined for each message and the grouping would comprise not just a common first message characteristics but also a common quality standard for the message. In this case the actual sender message characteristic pattern would only comprise messages of a certain quality.

Some embodiments may further comprise training a classification engine on historical messages or additional received messages to create negative characteristic labels. In some of these embodiments, the methods may comprise training a classification engine on at least one message characteristics of a minimum number of historical messages from one or more other senders who are not the actual sender to create at least one new actual sender message characteristic pattern, and the at least one new actual sender message characteristic pattern comprises at least one negative actual sender message characteristic label whereby a positive comparison of the at least one second message characteristic to the at least one negative actual sender message characteristic label decreases the probability that the indicated sender is the actual sender. In some of these embodiments, the methods may comprise training a classification engine with an at least one additional received message from one or more other senders who are not the actual sender to update the at least one actual sender message characteristic pattern, and the at least one actual sender message characteristic pattern comprises at least one updated negative actual sender message characteristic label whereby a positive comparison of the at least one second message characteristic to the at least one updated negative actual sender message characteristic label decreases the probability that the indicated sender is the actual sender. For illustration of one embodiment and not for limitation, an actual sender message characteristic pattern may also contain negative labels for messages from senders different than the sender for whose first message characteristics the actual sender message characteristic pattern is being created. These negative labels are added to the actual sender message characteristic pattern to reduce noise resulting from generic second message characteristics and improve the quality of matching labels. For example, in one embodiment when a new message is received from Joe Smith, joesmith@joesmith.com, one actual sender message characteristic patterns matching Joe Smith's first message characteristic pattern is retrieved. The actual sender message characteristic patterns may contain two labels—one positive label created using previous messages from Joe Smith and a negative label created using negative messages from Joe Smith. The new message is probabilistically compared against the retrieved actual sender message characteristic pattern and it is determined to be a 60% match against the positive label and a 40% match against the negative label. Thus indicating that it is more likely that Joe Smith originated this message than not.

In some embodiments, the method further comprises determining a quality measure of the new received message, receiving at least one additional received message from the actual sender, determining an additional quality measure for the at least one additional received message from the actual sender, training a classification engine with the at least one additional received message from the actual sender with a similar quality measure similar to the quality measure of the new received message to update the at least one actual sender message characteristic pattern, and the at least one actual sender message characteristic pattern comprises at least one updated positive actual sender message characteristic label with a quality measure similar to the quality measure of the at least one actual sender message characteristic pattern whereby a positive comparison of the at least one second message characteristic to the at least one updated positive actual sender message characteristic label increases the probability that the indicated sender is the actual sender.

In some embodiments, the method further comprises determining a quality measure of the new received message, receiving at least one additional received message from the actual sender, determining an additional quality measure for the at least one additional received message from the actual sender, training a classification engine with the at least one additional received message from the actual sender with a similar quality measure similar to the quality measure of the new received message to update the at least one actual sender message characteristic pattern, and the at least one actual sender message characteristic pattern comprises at least one new positive actual sender message characteristic label with a quality measure similar to the quality measure of the at least one actual sender message characteristic pattern whereby a positive comparison of the at least one second message characteristic to the at least one new positive actual sender message characteristic label increases the probability that the indicated sender is the actual sender.

In some embodiments, the second message characteristic comprises one of a message content, a metadata, a portion of a message content, a portion of a metadata, a value computed or derived or obtained via a third party from either a message content or a portion of the message content, and a writing style indicator comprising one of: a section or a statistic comprising one of a phrase, a word occurrence, a word frequency, an average length of words, a message content writing style, a punctuation usage, a capitalization, a message introduction text, a word ordering, a word section, a word spelling, a word misspelling, a word similarity, a grammatical part of speech, a message signature text, a whitespace frequency, or a value computed or derived or obtained via third party from either the metadata or a portion of the metadata or a value computed or derived or obtained via third party from any message attachments.

In some embodiments, the method further comprises: obtaining a recipient background information associated with a recipient; the recipient background information comprising messages, posts or other writings from the indicated sender on an online social network application; retrieving at least one message characteristic associated with the indicated sender from the recipient background information; and training a classification engine on the at least one message characteristic associated with the indicated sender from the recipient background information to create at least one new actual sender message characteristic pattern; and the at least one new actual sender message characteristic pattern comprises at least one positive actual sender message characteristic label associated with the actual sender whereby a positive comparison of the at least one second message characteristic of the new received message with the at least one positive actual sender message characteristic label increases the probability that the indicated sender is the actual sender.

In some embodiments, the step of receiving a new received message from an indicated sender further comprises determining a quality measure of the new received message, and the step of identifying at least one actual sender message characteristic pattern using the at least one first message characteristic comprises identifying at least one actual sender message characteristic pattern using the at least one first message characteristic and the quality measure of the new received message.

In some embodiments, the step of identifying at least one actual sender message characteristic pattern using the at least one first message characteristic comprises identifying at least one actual sender message characteristic pattern using the at least one first message characteristic and an evaluation threshold for the at least one actual sender message characteristic pattern.

In some embodiments, the method further comprises comparing the at least one first message characteristic of the indicated sender to a recipient messaging identity information to determine an indicated sender quality information and further influencing the probability that the indicated sender is the actual sender based upon the indicated sender quality information. To illustrate one example, and not for limitation, in one embodiment a message that is received from a sender Joe Smith, with email address joesmith@joesmith.com for Dan Jones, first message characteristics such as the senders name, email address and other characteristics are further compared against Dan Jones's recipient messaging identity information to determine similarity of sender identity information to other sender identity information associated with Dan Jones. For instance, if Dan Jones's recipient messaging identity information contains an entry for Joel Smith but not Joe Smith the sender quality information of this message could be determined to be suspect and the likelihood of this message being a phishing message be increased. In some embodiments, the recipient messaging identity information might contain information from Dan Jones's connections on social networking application. In other embodiments, the recipient messaging identity information might contain information regarding other users at Dan Jones's organization. In other embodiments, based upon the recipient messaging identity information, it is determined that that the sender Joe Smith is a first time sender—to either Dan Jones, Dan Jones's organization or to the system and this is indicated on the message. In other embodiments, it is determined that the sender Joe Smith joesmith@joesimith.com exists in the recipient messaging identity information but other first message characteristics are different than previously seen and the message is updated to indicate this to Dan Jones.

In some embodiments, the recipient messaging identity information comprises at least one selected from the group of an internet domain name used to send and receive an electronic message by at least one recipient organization affiliated with at least one recipient, an email addresses of at least one recipient at at least one recipient organization, a first name and a last name of at least one recipient at at least one recipient organization, a from name of at least one recipient at at least one recipient organization used for an electronic message, a username of at least one recipient at at least one recipient organization used for an electronic message, a phone number of at least one recipient at at least one recipient organization, a grouping of the at least one first message characteristics present in a recipient background information associated with at least one recipient in at least one recipient organization, and a grouping of the at least one first message characteristic for each indicated sender who has sent an electronic message to at least one recipient at at least one recipient organization.

In some embodiments, the indicated sender quality information identifies the indicated sender as one selected from the group of a first time sender of the new received message to a recipient, a first time sender of the new received message to a recipient organization, and a first time sender of the new received message to a recipient at a recipient organization.

In some embodiments, the indicated sender quality information identifies the indicated sender as one selected from the group of a sender of the new received message to a recipient with a value of the at least one first message characteristic being different than a previous value of the at least one first message characteristic in a previous message, a sender of the new received message to a recipient organization with a value of the at least one first message characteristic being different than a previous value of the at least one first message characteristic in a previous message, and a sender of the new received message to a recipient at a recipient organization with a value of the at least one first message characteristic being different than a previous value of the at least one first message characteristic in a previous message.

In some embodiments, the indicated sender quality information identifies the indicated sender as one selected from the group of a sender of the new received message with the at least one first message characteristic being similar but not identical to the recipient messaging identity information, and a sender of the new received message with the at least one first message characteristic containing a similar misspelling of the recipient messaging identity information to a previous misspelling of the recipient messaging identity information in a previous message.

In some embodiments, the indicated sender quality information identifies the indicated sender as one selected from the group of a sender of the new received message having the at least one first message characteristic being similar to or containing a similar misspelling of one of an at least one internet domain name used to send and receive electronic messages by a recipient organization affiliated with a recipient, a sender of the new received message having the at least one first message characteristic being similar to or containing a similar misspelling of at least one of a first or last name associated with a recipient at at least one recipient organization, a sender of the new received message having the at least one first message characteristic being similar to or containing a similar misspelling of a username associated with a recipient at at least one recipient organization, a sender of the new received message having the at least one first message characteristic being similar to or containing a similar misspelling of a from name associated with a recipient at at least one recipient organization, a sender of the new received message having the at least one first message characteristic being similar to or containing a similar misspelling of one of an email address associated with a recipient at at least one recipient organization, and a sender of the new received message having the at least one first message characteristic being similar to or containing a similar misspelling of one of a phone number associated with a recipient at at least one recipient organization.

Figure 19:
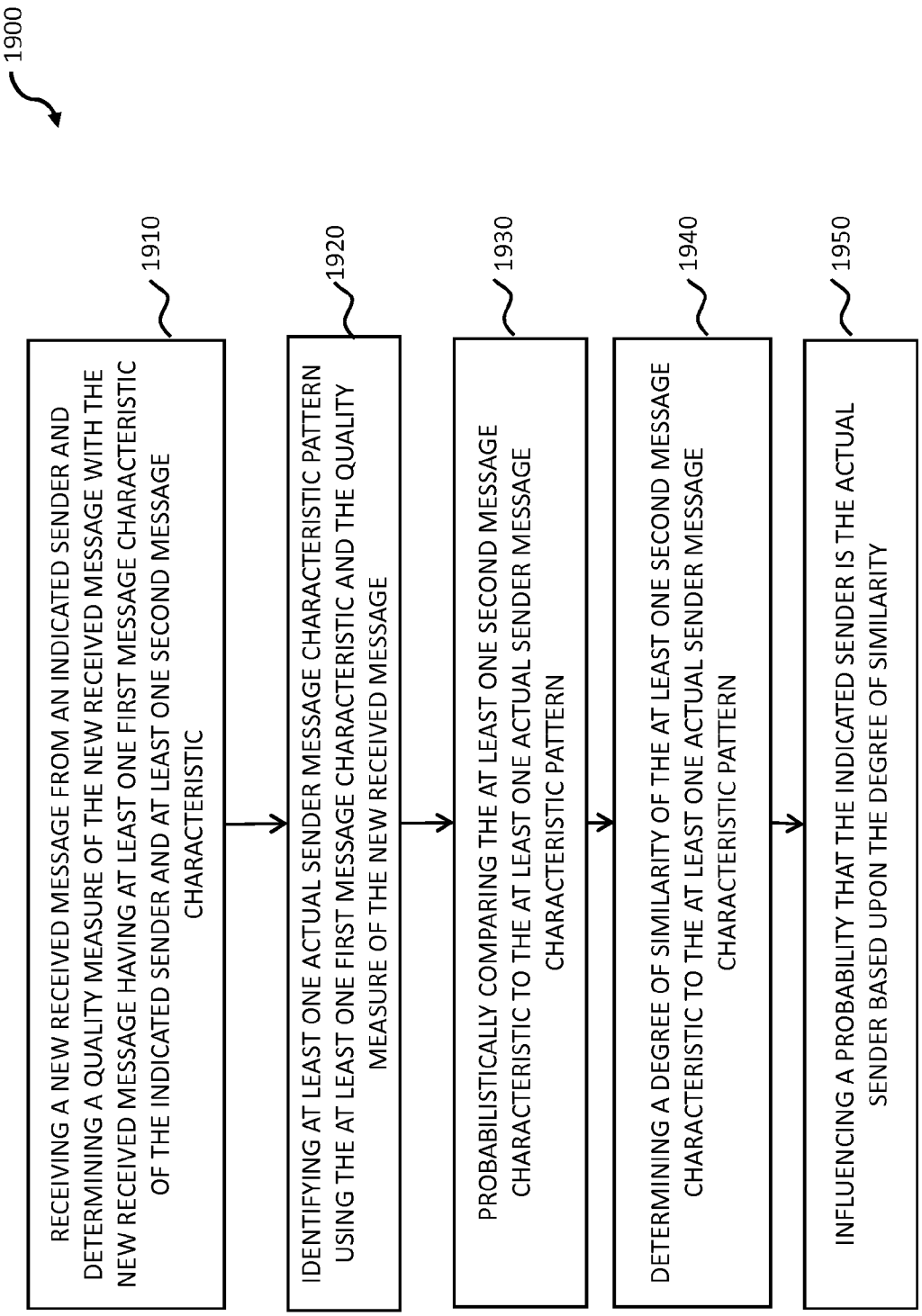
FIG. 19 illustrates a flow diagram of an example embodiment of methods for analyzing electronic messages utilizing a quality measure.

FIG. 19 illustrates one example embodiment of methods utilizing message characteristic pattern. This method of analyzing electronic messages 1900 comprises receiving a new received message from an indicated sender and determining a quality measure of the new received message at 1910 with the new received message having at least one first message characteristic of the indicated sender and at least one second message characteristic, identifying at least one actual sender message characteristic pattern using the at least one first message characteristic and the quality measure of the new received message at 1920, probabilistically comparing the at least one second message characteristic to the at least one actual sender message characteristic pattern at 1930, determining a degree of similarity of the at least one second message characteristic to the at least one actual sender message characteristic pattern at 1940 and influencing a probability that the indicated sender is the actual sender based upon the degree of similarity at 1950.

Figure 6A:
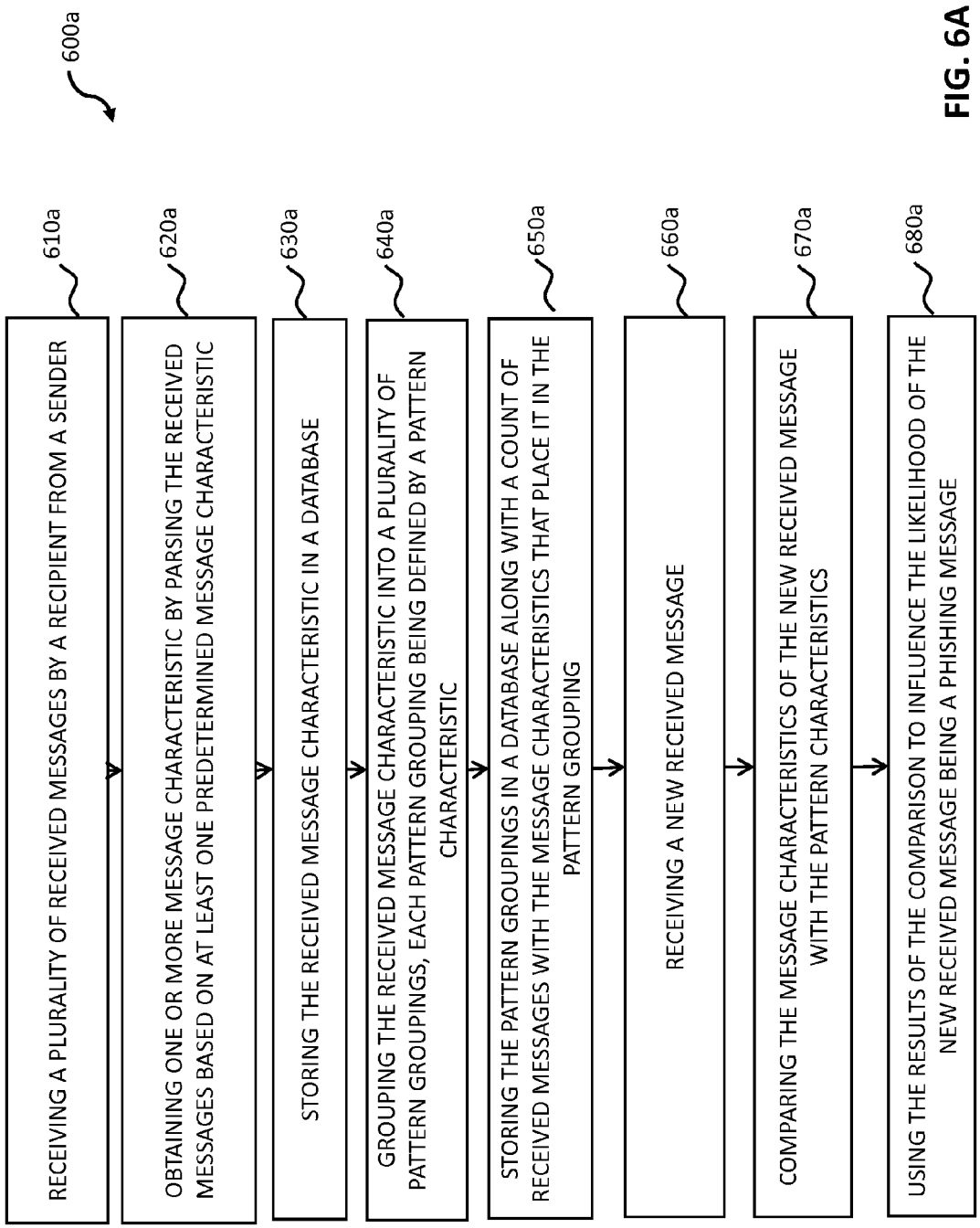
FIG. 6A illustrates a flow diagram of an example embodiment of methods for analyzing electronic messages.

FIG. 6A illustrates one example embodiment of a computer implemented method for analyzing electronic messages for phishing detection may utilize pattern groupings to help determine whether the new received message by the recipient as a phishing message. In one example embodiment, the method 600a comprises receiving a plurality of received messages by a recipient from a sender at 610a, obtaining one or more message characteristic by parsing the received messages based on at least one of a set of predetermined message characteristics at 620a, storing the received message characteristic in a database at 630a, grouping the received message characteristic into a plurality of pattern groupings at 640a, each pattern grouping being defined by a pattern characteristic, storing the pattern groupings in a database along with a count of received messages with the message characteristics that place it in the pattern grouping at 650a, receiving a new received message at 660a, comparing the message characteristics of the new received message with the pattern characteristics at 670a and using the results of the comparison to influence the likelihood of the new received message being a phishing message at 680a. In some embodiments, storing the pattern groupings in a database along with a count of received messages with the message characteristics that place it in the pattern grouping comprises storing the pattern groupings in a database along with one or more of a count or a chronology of received messages with the message characteristics that place it in the pattern grouping. In some embodiments, comparing the message characteristics of the new received message with the pattern characteristics further comprises grouping the new received message into a plurality of pattern groups, comparing the new received message characteristics to the message characteristics present in each pattern group, and scoring the new received message based upon the pattern groups it is grouped into. Some embodiments further comprise updating the database with data reflecting the pattern characteristics of the new received message. Some embodiments further comprise formulating a confidence score for each pattern grouping based upon a count of received messages in the pattern grouping, formulating a newness score for each pattern grouping indicating a duration of time for which the pattern grouping has been an active pattern grouping and the pattern characteristics further comprise the confidence score and the newness score. In some embodiments, the pattern groupings comprise a pattern grouping of message characteristics associated with the sender and the recipient. In some embodiments, the pattern groupings comprise at least one of the group consisting of a sender and recipient group pattern representing the message characteristics of the sender and the recipient, a sender and recipient organization group pattern representing the message characteristics associated with the sender and an organization of the recipient, a sender organization and recipient group pattern representing the message characteristics associated with an organization of the sender and the recipient, a sender organization and recipient organization group pattern representing the message characteristics associated with the organization of the sender and the organization of the recipient, a sender organization group pattern representing the message characteristics associated with the organization of the sender organization, and a sender group pattern representing the message characteristics associated with the sender. In some embodiments, the message characteristic comprises at least one message characteristic selected from the received message.

One example embodiment illustrating the methods of FIG. 6A comprises receiving emails from a hypothetical sender—John Smith—jsmith@jsmithco.com to a hypothetical recipient Dagny Taggart—dtaggart@taggarttc.com. Email characteristics such as John's sending IP address, IP address cross referenced with a GeoIP database to determine Johns location in the world, the server information used by John's email provider and other such email data are then obtained from the messages either directly or by cross referencing other databases, software systems. These characteristics are stored in the database. Commonly occurring characteristics are stored in the database in pattern groupings. So for instance, John typically sends email to Dagny only in the time period of 8 AM-12 PM in the East coast time zone. Or John normally uses an IPhone to send email along with data service provided by ATT otherwise he uses gmail with a server located on the east coast. Along with the patterns, data is also stored regarding the frequency of emails sent by John adhering to each pattern. Patterns are also created for the Company where John works as well as the company where Dagny works. When new emails are received those emails are broken down into characteristics and those characteristics values are used to check the existence of a previously used pattern for each possible pattern grouping. If a pattern grouping is found that has been used regularly for a certain length of time the likelihood of the email being phishing is reduced.

Figure 6B:
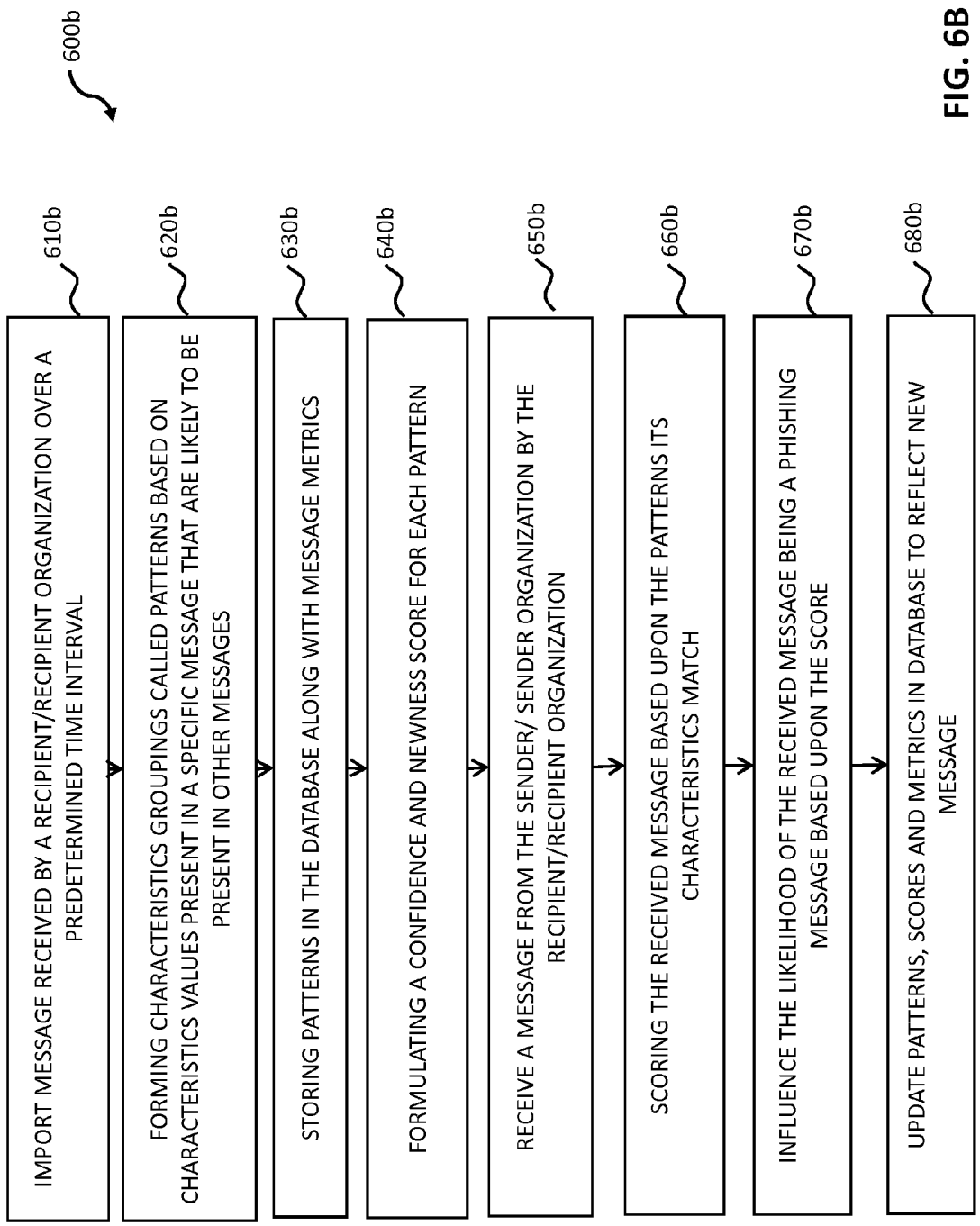
FIG. 6B illustrates a flow diagram of an example embodiment of methods for analyzing electronic messages.

FIG. 6B illustrates one example embodiment of the methods for electronic message analysis utilizing pattern groupings. FIG. 6B illustrates a flow diagram of method 600b for carrying out analysis of electronic messages for phishing detection.

Now, referring to FIG. 6B, at block 610*b*, messages received by the recipient/recipient organization over a predetermined time interval are imported.

At block 620*b*, message characteristics of the imported messages are obtained by parsing the recipient's/recipient organization's received messages. Characteristic groupings called Patterns are then created based on message characteristic values present in a specific message that are likely to be present in other messages and pre-assigned characteristic data that place each characteristic into one or more of the following groups—sender and recipient—representing the message characteristics that are associated with the sender and the recipient, sender and recipient organization—representing the message characteristics that are associated with the sender and the recipients organization, sender organization and recipient—representing the message characteristics that are associated with the senders organization and the recipient, sender organization and recipient organization—representing the message characteristics that are associated with the sender organization and the recipient organization, sender organization—representing the message characteristics that are associated with the sender organization and the sender—representing the message characteristics that are associated with the sender.

At block 630*b*, Patterns are created or updated in the database along with metrics regarding such as the count, frequency, date and time of messages conforming to a Pattern. At block 640*b*, based upon the number of patterns for each unique value of sender and recipient, sender and recipient organization, sender organization and recipient, sender organization and recipient organization, sender organization, sender groups and the metrics corresponding to each pattern a confidence score and a newness score are created At block 650*b*, a message is received from a sender/sender organization for a recipient/recipient organization.

At block 660*b*, message characteristics of the received messages are obtained by parsing the recipient's/recipient organization's received messages. Patterns associated with the sender/sender organization and/or recipient/recipient organization are compared against the received messages characteristics. If a determination is made that the received message characteristics are similar to a pre-existing pattern associated with the sender/sender organization and/or recipient/recipient organization then the credibility and newness score of the most appropriate pattern is used to influence the likelihood that the new message is a phishing message.

At block 670*b*, the likelihood of the received message by the recipient/recipient organization being a phishing electronic message is influenced based upon the score. At block 680*b*, the message characteristics of the received message are used to update the pattern/its metrics or to create new pattern.

In various examples, system and method described in FIGS. 1-13 propose techniques for carrying out analysis of electronic message for phishing detection. In some embodiments, the methods further comprise the addition of an indicator to visually indicate to users that a message may be a phishing attempt. Additionally, the methods may notify an organization's computer system administrators regarding any synchronized attacks targeting multiple of their users by identifying any found patterns in incoming messages. Furthermore, the methods may alert an organization's computer system administrators about any possible security compromises that may result in phishing attacks within the organization. Furthermore, the methods may alert an organization's system administrators about possible responses to phishing messages with the capability to prevent such response from being delivered to the phisher. In addition, the methods may assist in determining any coordinated phishing attacks against an organization by determining phishing attacks with similar characteristics against multiple users of that organization. In addition, the methods may, as described in above, use an outbound message reply as a trust factor for the sender/sender organization of the original message in determining the phishing nature of a received message from the sender/sender organization. Also, the above methods may use changing patterns of outbound messages to help determine whether a message client has been compromised and a sender/sender organization is sending any phishing message. Moreover, the above methods may allow users to specify a message as a phishing attempt or a legitimate message and use the characteristics of the flagged message to filter messages to other users at that organization.

In some embodiments, the methods for electronic message analysis alter metadata or other message characteristic values to assist in determining the probability that the indicated sender is the actual sender.

In some embodiments, a method for analyzing electronic messages for phishing message detection comprises receiving a received message having a plurality of message characteristics, the email characteristics comprising a Reply-To address and a recipient address, determining whether the received message by the recipient to be a questionable phishing message, changing the Reply-To address to a custom address if the received message is the questionable phishing message, allowing the received message to be delivered to the recipient address, receiving a reply message from the recipient address at the custom address, inspecting the reply message from the recipient to determine whether the questionable phishing message is a phishing message, quarantining the reply message or forwarding the reply message for manual inspection if the questionable phishing message is the phishing message and delivering the reply to the original Reply-To address if the questionable phishing message is not the phishing message. A questionable phishing message may comprise a received message having some message characteristics consistent with a phishing message but not all message characteristics consistent with a phishing message. For example, one embodiment illustrating the process of changing the Reply-To comprises receiving a new message from a hypothetical sender—John Smith—jsmith@jsmithco.com to a hypothetical recipient Dagny Taggart—dtaggart@taggarttc.com. When this message is received it may be uncertain or questionable if the message is a phishing attempt, so the system may change the Reply-To portion of the message from jsmith@jsmithco.com to cntr1454545@phishingguardian.com and deliver the message to Dagny. At some later point in time, Dagny may reply to this message which would then be routed to the message address of cntr1454545@phishingguardian.com wherein the reply message and the original message from John would be re-analyzed to determine if there is a higher probability of the original message being a phishing attempt or phishing message. Based upon the determination, the reply might either get sent for manual examination, quarantined or routed to the original recipient John Smith. In some embodiments, a threshold of message characteristics is used to determine whether a received message is not a phishing message, a questionable phishing message or phishing message. In some embodiments, the inspection of the reply message is done with a manual inspection by particular users.

In some embodiments the method for analyzing electronic messages comprises: receiving an electronic message to be delivered to a recipient on behalf of a sender; substituting or removing one or more metadata element with random values to create one or more altered metadata values; and the metadata element comprises a position of the metadata element, a name or a value; and storing the metadata element and the altered metadata element with respect to the electronic message. For example and not for limitation, consider the following as one example of this embodiment. An email is received and this email has its 5th header User-Agent with a value Microsoft Outlook 2013. The system firstly moves the $5^{th}$ header to the $3^{rd}$ location. Secondly it changes User-Agent to X-PG-AUS and changes the value to MOA1. The original values and the changed values are stored for the future.

In some embodiments the method for analyzing electronic messages comprises receiving a received electronic message for an original recipient from an original sender, inserting additional message content in the received electronic message, receiving a new received electronic message from the original recipient for a new recipient that is a reply or a forward of the received electronic message, removing the inserted additional message content, and delivering the new received electronic message to the new recipient. For example and not for limitation, consider the following as one example of a system implementing this embodiment. An email is received by the system. The system adds a message and a link at the bottom of the email for the message recipient. The message recipient forwards the email to someone else. The system removes the link before the message is received by the recipient.

In some embodiments, methods of electronic message analysis comprise receiving a new received message from an indicated sender on behalf of a recipient, determining the new received message to be a questionable message, changing a Reply-To address message characteristic value to a custom message address, storing an original Reply-To address message characteristic value, and relaying the new received message to the at least one recipient organization.

In some embodiments, the methods further comprise receiving a new reply message at the custom message address, determining at least one of the new received message or the new reply message to be a phishing message, and withholding the new reply message from being delivered.

In some embodiments, the methods further comprise receiving a new reply message at the custom message address, determining at least one of the new received message or the new reply message to be a phishing message, and forwarding the at least one of the new received message or the new reply message for manual inspection.

In some embodiments, the methods further comprise receiving a new reply message at the custom message address, determining the new received message and the new reply message to not be phishing messages, and delivering the new reply message to the original Reply-To address message characteristic value.

In some embodiments, methods for protecting electronic messages comprise: receiving an electronic message to be delivered to a recipient on behalf of a sender; substituting or removing one or more meta data element with altered values to create one or more altered meta data values; the one or more meta data element comprises a position of the one or more meta data element, a name or a value; and storing the one or more meta data element and the one or more altered meta data values with respect to the electronic message. To illustrate and example and not for limitation, in one embodiment an email may be received where the headers of the email contain the header X-Mailer: Microsoft Office Outlook, Build 11.0.5510 along with other headers. This header makes information available to the recipients of the message regarding the sender email client. In one embodiment, the solution may remove this header before delivering the email to the recipient. In an alternate embodiment the header may be changed to X-Mailer: 75czys4Q0ifzk5Vx8EFSQb. This would enable concealment of information associated with the sender of the message.

In some embodiments, the methods for electronic message analysis utilize identify information of the recipient to assist in determining the probability that the indicated sender is the actual sender. In one example embodiment a computer implemented method for analyzing electronic messages, the method comprising: receiving a received electronic message by a recipient from a sender; obtaining one or more identity characteristics by parsing the received email message based on at least one predetermined identity characteristic; the identity characteristics comprising one or more identity characteristics selected from a group consisting of a name, a from email address, a reply to email address, a phone number, a caller ID or a username for the sender; receiving a new received electronic message; obtaining one or more new identity characteristic for new received electronic message; comparing the new identity characteristic for new received electronic message against identity characteristic for received electronic message; and providing an indicator to the message recipient that the new received electronic message is from a new sender who has previously never communicated with the recipient. For example and not for limitation, consider the following as one example of this embodiment. Let us say Bob is a new employee at a company. The first email he receives is from Alice. The system stores Alice's name and email address as identity characteristics. The next email, as a new received email, is from John. Since Bob has not received an email from John in the past the methods provide a new sender indicator to Bob. Let us say Alice was to email next. Since Alice has emailed Bob in the past no indicator is provided.

In some embodiments, the recipient belongs to an organization having a plurality of recipients and the step of providing an indicator to the message recipient that the new received electronic message is from a new sender who has previously never communicated with the recipient comprises providing an indicator to the message recipient that the new received electronic message is from a new sender who has previously never communicated with any of the plurality of recipients of the organization. For example and not for limitation, consider the following as one example of this embodiment. Let us say Bob is a new employee at a company (organization). The first email he receives is from Alice. Alice has emailed Mary who works at the same company in the past. The system does not alert Bob with an indicator for this email to Alice. However let us say John emails Bob—and John has never emailed anyone at the recipient company. John would be flagged with an indicator as a new sender to Bob.

Figure 16:
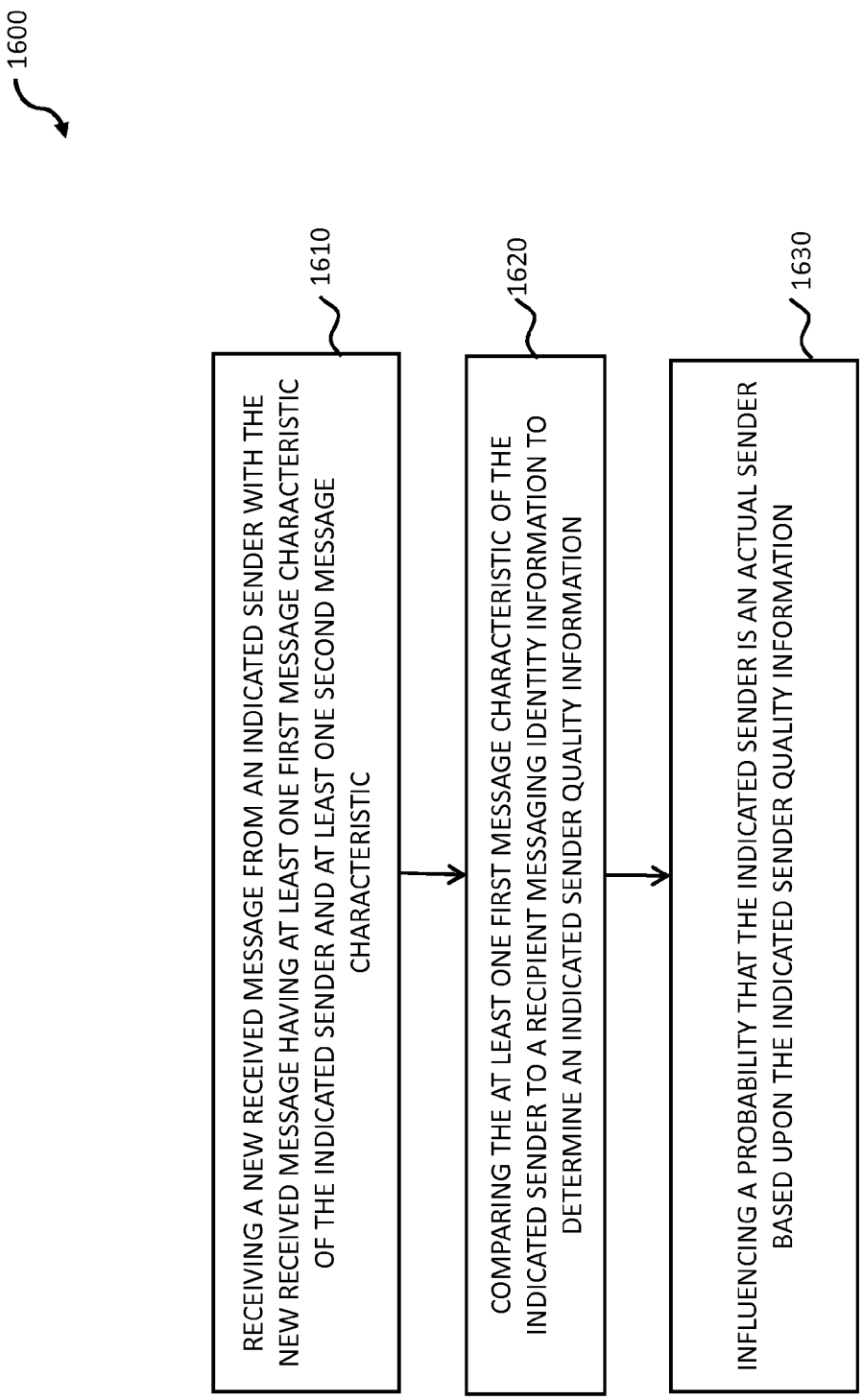
FIG. 16 illustrates a flow diagram of an example embodiment of methods for analyzing electronic messages utilizing message characteristics.

As illustrated in FIG. 16, one example embodiment of computer implemented methods for analyzing electronic messages, the method 1600 comprises receiving a new received message from an indicated sender at 1610 with the new received message having at least one first message characteristic of the indicated sender and at least one second message characteristic, comparing the at least one first message characteristic of the indicated sender to a recipient messaging identity information to determine an indicated sender quality information at 1620, and influencing a probability that the indicated sender is an actual sender based upon the indicated sender quality information at 1630. To illustrate one embodiment and not for limitation, in one embodiment a message that is received from a sender Joe Smith, with email address joesmith@joesmith.com for Dan Jones, first message characteristics such as the senders name, email address and other characteristics are compared against Dan Jones's recipient messaging identity information to determine similarity of sender identity information to other sender identity information associated with Dan Jones. For instance, if Dan Jones's recipient messaging identity information contains an entry for Joel Smith but not Joe Smith the sender quality information of this message could be determined to be suspect and the likelihood of this message being a phishing message be increased. In some embodiments, the recipient messaging identity information might contain information from Dan Jones's connections on social networking application. In other embodiments, the recipient messaging identity information might contain information regarding other users at Dan Jones's organization. In other embodiments, based upon the recipient messaging identity information, it is determined that that the sender Joe Smith is a first time sender—to either Dan Jones, Dan Jones's organization or to the system and this is indicated on the message. In other embodiments, it is determined that the sender Joe Smith joesmith@joesimith.com exists in the recipient messaging identity information but other first message characteristics are different than previously seen and the message is updated to indicate this to Dan Jones.

In some embodiments, the recipient messaging identity information comprises at least one selected from the group of an internet domain name used to send and receive an electronic message by at least one recipient organization affiliated with at least one recipient, an email addresses of at least one recipient at at least one recipient organization, a first name and a last name of at least one recipient at at least one recipient organization, a from name of at least one recipient at at least one recipient organization used for an electronic message, a username of at least one recipient at at least one recipient organization used for an electronic message, a phone number of at least one recipient at at least one recipient organization, a grouping of at least one first message characteristic present in a recipient background information associated with at least one recipient in at least one recipient organization, and a grouping of the at least one first message characteristic for each indicated sender who has sent an electronic message to at least one recipient at at least one recipient organization.

In some embodiments, the indicated sender quality information identifies the indicated sender as one selected from the group of a first time sender of the new received message to a recipient, a first time sender of the new received message to a recipient organization, and a first time sender of the new received message to a recipient at a recipient organization.

In some embodiments, the indicated sender quality information identifies the indicated sender as one selected from the group of a sender of the new received message to a recipient with a value of the at least one first message characteristic being different than a previous value of the at least one first message characteristic in a previous message, a sender of the new received message to a recipient organization with a value of the at least one first message characteristic being different than a previous value of at least one first message characteristic in a previous message, and a sender of the new received message to a recipient at a recipient organization with a value of the at least one first message characteristic being different than a previous value of the at least one first message characteristic in a previous message.

In some embodiments, the indicated sender quality information identifies the indicated sender as one selected from the group of a sender of the new received message with the at least one first message characteristic being similar but not identical to the recipient messaging identity information, and a sender of the new received message with the at least one first message characteristic containing a similar misspelling of the recipient messaging identity information to a previous misspelling of the recipient messaging identity information in a previous message.

In some embodiments, the indicated sender quality information identifies the indicated sender as one selected from the group of a sender of the new received message having the at least one first message characteristic being similar to or containing a similar misspelling of one of an at least one internet domain name used to send and receive electronic messages by a recipient organization affiliated with a recipient, a sender of the new received message having the at least one first message characteristic being similar to or containing a similar misspelling of at least one of a first or last name associated with a recipient at at least one recipient organization, a sender of the new received message having the at least one first message characteristic being similar to or containing a similar misspelling of a username associated with a recipient at the at least one recipient organization, a sender of the new received message having the at least one first message characteristic being similar to or containing a similar misspelling of a from name associated with a recipient at the at least one recipient organization, a sender of the new received message having the at least one first message characteristic being similar to or containing a similar misspelling of one of an email address associated with a recipient at the at least one recipient organization, and a sender of the new received message having the at least one first message characteristic being similar to or containing a similar misspelling of one of a phone number associated with a recipient at the at least one recipient organization.

In some embodiments, the methods further comprise adding an indicator to the new received message to indicate the indicated sender quality information.

In one example embodiment a computer implemented method for analyzing electronic messages is provided, the method comprising: receiving a received electronic message by a recipient from a sender; obtaining one or more identity characteristics by parsing the received email message based on at least one predetermined identity characteristic; the identity characteristics comprising one or more identity characteristics selected from a group consisting of a name, a from email address, a reply to email address, a phone number, a caller ID and a username for the sender; receiving a new received electronic message by the recipient; obtaining one or more identity characteristic for new received electronic message; comparing identity characteristic for new received electronic message against one or more misspellings of the identity characteristic for received electronic message; and increasing a probability that the new received electronic message is a phishing message based upon a matched comparing of identity characteristic for new received electronic message against one or more misspellings of the identity characteristic for received electronic message is true. For example and not for limitation, consider the following as one example of this embodiment. Let us say Alice Yu emails Bob. The system stores Alice Yu as the sender's name. The next email Bob receives is from Aliice Yu (note the different spelling in the first name). The system treats this new email as a possible phishing attempt by increasing the probability that it is a phishing attempt since the name is a possible misspelling to someone else who communicates with Bob.

In some embodiments, the new received message is received by the recipient and the received electronic message is received by another recipient at the recipient organization. For example and not for limitation, consider the following as one example of a system implementing this embodiment. Let us say Alice, as the sender, emails Mary as "another recipient". The system stores Alice Yu as the sender's name. Then another employee of the organization Bob, as the recipient, receives an email from Aliice Yu (note the different spelling of first name). The system treats the email to Bob as a possible phishing attempt since the name ("Allice Yu") is a misspelling of a characteristic of someone who communicates with personnel at Bob's company.

In some embodiments, comparing identity characteristic for new received electronic message against one or more misspellings of the identity characteristic for received electronic message comprises comparing a string distance between the identity characteristic for new received electronic message against the identity characteristic for received electronic message and increasing the probability that the electric message is a phishing message if the string distance between the identity characteristic for new received electronic message and the identity characteristics for received electronic messages is close but unequal. For example and not for limitation, consider the following as one example of this embodiment. Let us say Alice emails Bob. The system stores Alice Yu as the sender's name. The next email Bob receives is from Aliice Yu (note the different first name). The system calculates and looks at the string distance between Alice Yu and Aliice Yu and since the result is off by one character it treats this as a more likely phishing attempt.

In some embodiments, the new received message is received by the recipient and the received electronic message is received by another recipient at the recipient organization. For example and not for limitation, consider the following as one example of this embodiment. Let us say Alice emails Mary. The system stores Alice Yu as the sender's name. Then another employee Bob receives an email from Aliice Yu (note the different first name). The system recognizes a common identity characteristic for Alice Yu because Mary and Bob are in the same organization. The system treats this as a possible phishing attempt since the string distance between Alice Yu and Aliice Yu is one character.

In one example embodiment, a computer implemented method for analyzing electronic messages is provided, the method comprising: storing one or more sender identity characteristic selected from of at least one of a group consisting of a name, a from email address, a reply to email address, a caller id, a phone number and a username for all current and historical personnel at a recipient organization in a database; receiving a received electronic message addressed to a message recipient at the recipient organization; the sender identity characteristic is not present in the database; extracting one or more message characteristic of the received message; evaluating the message characteristic for possible phishing vectors; increasing the probability that the message characteristic represent a phishing email as a result of the evaluation; receiving a new received electronic message; extracting one or more new message characteristic of new received electronic message; comparing the message characteristic of received electronic message to the new message characteristic of new received electronic message; and increasing the probability that the new received electronic message is a phishing message based upon the results of the comparison. For example and not for limitation, consider the following as one example of this embodiment. A company has three employees Alice, Bob and Mary who have worked with it in its history. The system stores their names, email address, etc. as sender identity characteristics. A new message is received for an email address that does not belong to these three users. The system extracts the characteristics of this email so that when another new message is received it can increase the probability that this new message characteristic is indicative of a possible phishing messages.

In some embodiments, the methods may utilize a comparison of URL information in the new received message to domain and brand information associated with a well-known brand to determine the probability that the message is a phishing message.

In one example embodiment a computer implemented method for analyzing electronic messages is provided, the method comprising: receiving a new received electronic message from a sender; extracting one or more URL from the electronic message; breaking up each URL into a display URL component and a target URL component; further breaking up display URL component into one or more of a following part: a display protocol, a display port, a display domain part, a display subdomain part, a display top level private domain part or a display file part; comparing the display top level private domain part to a list of well-known domains; further breaking up target URL component into one or more of the following parts: a target protocol, a target port, a target domain part, a target subdomain part, a target top level private domain part or a target file part; comparing the target top level private domain part to a well-known domain matching the display top level private domain; and increasing the probability that the message is a phishing message if the target top level private domain part does not match the well-known domain matching the display top level private domain. For example and not for limitation, consider the following as one example of this embodiment. An email is received with a visible URL of www.facebook.com but a target URL of www.facelook.com (note the "l"). The system extracts facebook.com and compares it to a list of well-known domains. The display URL matches the well-known domain facebook.com. Since these match, the system then compares facelook.com and facebook.com. Since these don't match the system increases the probability and likelihood that the email is a phish.

In some embodiments, comparing the target top level private domain part to a well-known domain matching the display top level private domain comprises comparing misspellings of the target top level private domain part to a well-known domain matching the display top level private domain and increasing the probability that the message is a phishing message if the target top level private domain part does not match the well-known domain matching the display top level private domain comprises increasing the probability that the message is a phishing message if the target top level private domain part are equal to misspellings of the well-known domain matching the display top level private domain. For example and not for limitation, consider the following as one example of this embodiment. An email is received with a visible URL of www.facebook.com but a target URL of www.facelook.com (note the "l"). The system extracts facebook.com and compares it to a list of well-known domains. The display URL matches the well-known domain facebook.com. Since these match the system then compares the target top private domain facelook.com and misspellings of facebook.com. Since these match the system increases the probability and likelihood that the email is a phish.

In some embodiments, comparing the target top level private domain part to a well-known domain matching the display top level private domain comprises comparing a string distance of the target top level private domain part to a well-known domain matching the display top level private domain and increasing the probability that the message is a phishing message if the target top level private domain part does not match a well-known domain matching the display top level private domain comprises increasing the probability that the message is a phishing message if the string distance of the target top level private domain part to the well-known domain matching the display top level private domain of the display URL is similar but unequal. For example and not for limitation, consider the following as one example of this embodiment. An email is received with a visible URL of www.facebook.com but a target URL of www.facelook.com (note the "l"). The system extracts facebook.com and compares it to a list of well-known domains. The display URL matches the well-known domain facebook.com. Since these match, the system then computes the string distance of the target top private domain facelook.com and the well-known domain of facebook.com. Since the string distance is very small and not an equal match the system increases the probability and likelihood that the email is a phish.

In some embodiments, a method for analyzing an electronic message comprises receiving a new received message from an indicated sender, determining the indicated sender to be from a well-known brand, extracting one or more URL from the new received message, breaking up each URL into a display URL component and a target URL component, comparing the display URL component to at least one of a list of domains and brands associated with the well-known brand, de-shortening the target URL component if necessary, determining a quality of the target URL component with respect to at least one of the list of domains and brands associated with the well-known brand, and influencing a probability that the new received message is a phishing message based upon the quality.

In some embodiments, determining the quality of the target URL component with respect to at least one of the list of domains and brands associated with the well-known brand comprises at least one of the following comparing a recency of a date of registration of a domain associated with the target URL component with an age of the well-known brand, comparing a geography of registration of the domain associated with the target URL component with a geography of the well-known brand, comparing a geography of an IP address associated with the target URL component with a geography of the well-known brand, comparing an IP address associated with the target URL component again with an updated threat intelligence, comparing the domain associated with the target URL component with the updated threat intelligence, and comparing the target URL component to at least one similar misspelling of the domain associated with the well-known brand.

To illustrate one example utilizing a URL or other domain information for analysis, and not for limitation, in one embodiment an email may be received where the from name contains the trademark Vanguard. Further analysis indicates other references to the Vanguard trademark within the body of the message. All the URL's are then extracted from the message and any URL's that are shortened or proxied through services such as TinyURL are de-shortened so that the actual destination URL is determined. For example, a URL tiny.url/asjasjas may be retrieved from the email and de-shortened to vnagaurd.com/profilecheck.php. This actual URL is then compared to all the domains known to be associated with the Vanguard brand. The likelihood of the phishing message is increased since vnagaurd.com is determined to not be associated with Vanguard. In another embodiment, the actual URL vnagaurd.com/profilecheck.php is further compared to misspellings of domains associated with Vanguard, along with additional checks. Since this actual URL contains a domain very similar to vanguard.com the likelihood of this email being a phishing email is increased.

In one example embodiment a computer implemented method for analyzing electronic messages is provided, the method comprises receiving a received electronic message from a sender, analyzing the received electronic message for a phishing characteristic using an analysis approach, declaring the received electronic message as a phishing message as a result of the analysis, creating a digital fingerprint of a content of the received electronic message, the digital fingerprint representing an abbreviated representation of the electronic message, receiving a new received electronic message, creating a digital fingerprint of the contents of the new received electronic message, comparing the digital fingerprint of the contents of the received electronic message with the digital fingerprint of the contents of the new received electronic message to determine a percentage difference in the content of the new received electronic message, and declaring the new received electronic message as a phishing message based upon similar results of the comparison. For example and not for limitation, consider the following as one example of this embodiment. An email comes in that is determined to be a phishing email. A digital fingerprint is created for the phishing email. A new email comes in and a digital fingerprint is created for it as well. The digital fingerprints are compared to determine the percentage difference in the contents of the emails. If there are similar or equal the new email is called a phishing message.

In some embodiments, the methods for electronic message analysis utilize additional data, such as threat intelligence data, to assist in determining the probability that the indicated sender is the actual sender.

Figure 17:
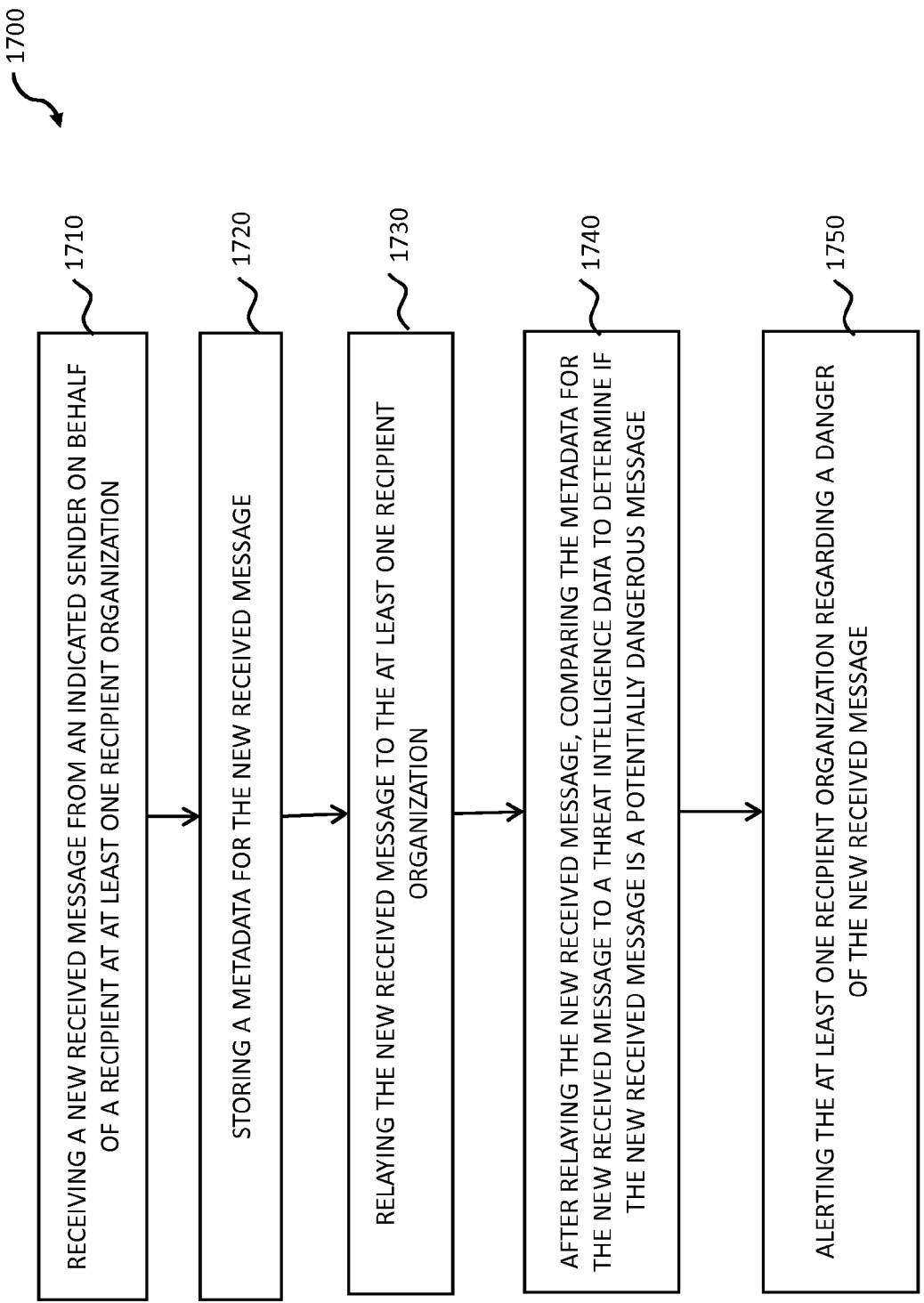
FIG. 17 illustrates a flow diagram of an example embodiment of methods for analyzing electronic messages utilizing threat intelligence data.

As illustrated in FIG. 17, one example embodiment of computer implemented methods for analyzing electronic messages, the method 1700 comprises receiving a new received message from an indicated sender on behalf of a recipient at at least one recipient organization at 1710, storing a metadata for the new received message at 1720, relaying the new received message to the at least one recipient organization at 1730, after relaying the new received message comparing the metadata for the new received message to a threat intelligence data to determine if the new received message is a potentially dangerous message at 1740, and alerting the at least one recipient organization regarding a danger of the new received message at 1750. To illustrate one embodiment and not for limitation, in one embodiment an email that is received from Joe Smith on Jan. 1, 2015 at 1 PM for a Dan Jones. This email is determined not to be a phishing email. Meta-Data for this email is stored and the email is relayed to the mail server designated by Dan Jones' organization. At Jan. 1, 2015 at 3 PM the stored meta-data for this email is deemed to be indicative of a phishing message. The organization is alerted regarding the email being a phishing message. In some embodiments, the meta-data for an email message is repeatedly compared against threat intelligence data that has updated for multiple days after relaying the message. In some embodiments for example, once the message from Joe Smith is determined to be a phishing message the organization is alerted and the email in Dan Jones mailbox is altered or removed or the folder is changed to tell Dan Jones that the message is a phishing message. In some embodiments, for example once the message from Joe Smith is determined to a phishing message, other messages from any senders including Joe Smith are examined to determine their similarity to Joe Smith's phishing message and the organization is alerted regarding these similar messages being phishing messages. In other embodiments, a report phishing email link is added to the bottom of the message prior to relaying it. When this link is clicked by the recipient other messages from any senders including Joe Smith are examined to determine their similarity to Joe Smith's phishing message and the organization is alerted regarding these similar messages being phishing messages. In other embodiments, when the email is responded to or forwarded this Report phishing link is removed from the email. In other embodiments, if the email is determined to possibly be a phishing message the Reply-To email address is changed such that any replies from Dan Jones to the message would not get delivered to Joe Smith but would rather be available for examination to ensure that neither the original message nor the response are phishing messages. At the time of the examination if neither message is determined to be a phishing message the response is delivered to Joe Smith otherwise the message is quarantined awaiting inspection.

In some embodiment, the methods further comprise updating the threat intelligence data with an update to create an updated threat intelligence data and after relaying the new received message, regularly comparing the metadata for the new received message to the updated threat intelligence data to determine if the new received message is the potentially dangerous message.

In some embodiments, the step of comparing the metadata for the new received message to a threat intelligence data to determine if the new received message is a potentially dangerous message comprises at least one of: comparing a sender email address of the new received message with suspicious email addresses and domain names present in an updated threat intelligence data; comparing an IP address associated with the new received message with an IP address present in the updated threat intelligence data; comparing any server host names associated with the new received message with server host names present in the updated threat intelligence data; comparing a digital hash code representation associated with the new received message with a digital hash code representation in the updated threat intelligence data; comparing any of a message characteristic associated with the new received message with a message characteristic reported in the updated threat intelligence data; comparing a filename, a file size or a digital hash code associated with attachments included with the new received message with a digital hash code in the updated threat intelligence data; and comparing a URL or a de-shortened URL included in a body of the new received message with a URL in the updated threat intelligence data.

In some embodiments, the update is collected from at least one of a data feed from a third party, a report from the recipient or a messaging administrator at the at least one recipient organization via a web based administrative console, a report from the recipient or the messaging administrator at the at least one recipient organization via a URL present in a body of the new received message, a report from the recipient or the messaging administrator at the at least one recipient organization via an email forwarded to a customer email address, and through an ongoing analysis of more than one new received message.

In some embodiments, the methods further comprise: prior to relaying the new received message, changing an original URL of the new received message to a changed URL whereby any clicks to the original URL are redirected through a well-known proxy server; and the step of regularly comparing the metadata for the new received message to an updated threat intelligence data to determine if the new received message is a potentially dangerous message comprises regularly comparing the original URL for the new received message to the updated threat intelligence data.

In some embodiments, the step of relaying the new received message to the at least one recipient organization further comprises prior to forwarding the new received message, changing a message body of the new received message to include a clickable report phishing URL whereby when the clickable report phishing URL is clicked, an updated threat intelligence data is created including a digital hash code and a message characteristic of the new received message.

In some embodiments, the step of alerting the at least one recipient organization regarding the danger of the new received message comprises at least one selection from the group of removing the new received message from a mailbox of the recipient, moving the new received message from the mailbox of the recipient to another messaging folder, and altering a visible message characteristic of the new received message.

In some embodiments, the step of alerting the at least one recipient organization regarding the danger of the new received message further comprises determining an other previously received message with similar message characteristics as the new received message, and alerting the at least one recipient organization regarding the danger of the other previously received message.

In some embodiments, the method further comprises: upon the report phishing URL being clicked, determining a other previously received message with similar message characteristics as the new received message; and alerting the at least one recipient organization regarding the danger of the other previously received message.

In some embodiments, the step of storing a metadata for the new received message further comprises: substituting or removing at least one metadata element with an unique value to create at least one altered metadata element; the at least one metadata element comprises a position of the at least one metadata element, a name or a value; and storing the at least one altered metadata element with respect to the new received message.

In some embodiments, the step of forwarding the new received message to the at least one recipient organization comprises determining the new received message to be a questionable message, changing a Reply-To address message characteristic value to a custom message address, storing an original Reply-To address message characteristic value, and forwarding the new received message to the at least one recipient organization.

In some embodiments, the methods further comprise receiving a new reply message at the custom message address, determining at least one of the new received message or the new reply message to be a phishing message, and withholding the new reply message from being delivered.

In some embodiments, the methods further comprise receiving a new reply message at the custom message address, determining at least one of the new received message or the new reply message to be a phishing message, and forwarding the at least one of the new received message or the new reply message for manual inspection.

In some embodiments, the methods further comprise receiving a new reply message at the custom message address, determining the new received message and the new reply message to not be phishing messages, and delivering the new reply message to the original Reply-To address message characteristic value.

Figure 18:
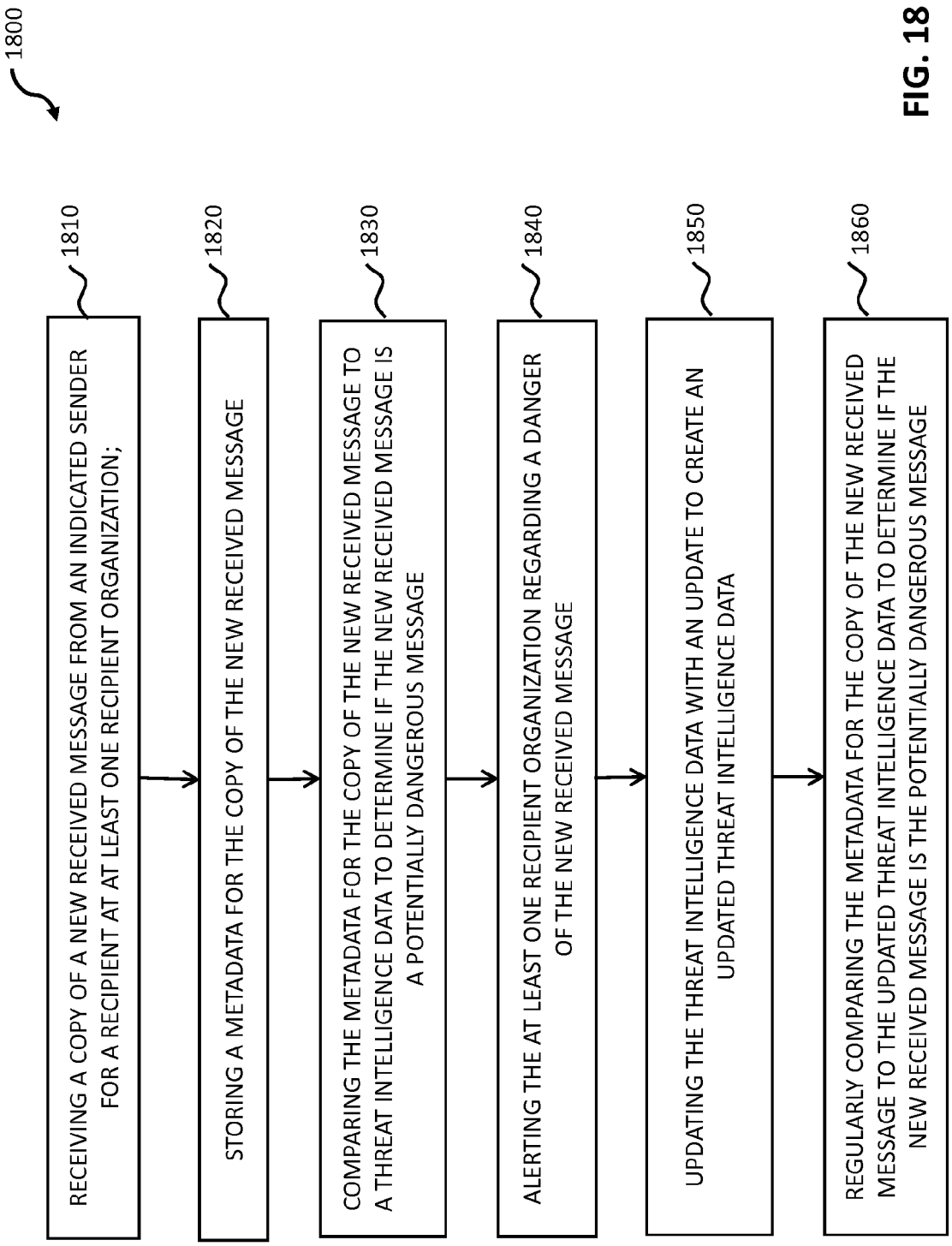
FIG. 18 illustrates a flow diagram of an example embodiment of methods for analyzing electronic messages including alerting a recipient organization.

As illustrated in FIG. 18, in one example embodiment the method for electronic message analysis comprises receiving a copy of a new received message from an indicated sender for a recipient at at least one recipient organization at 1810, storing a metadata for the copy of the new received message at 1820, comparing the metadata for the copy of the new received message to a threat intelligence data to determine if the new received message is a potentially dangerous message at 1830 and alerting the at least one recipient organization regarding a danger of the new received message at 1840. In some embodiments, the method further comprises updating the threat intelligence data with an update to create an updated threat intelligence data at 1850 and regularly comparing the metadata for the copy of the new received message to the updated threat intelligence data to determine if the new received message is the potentially dangerous message at 1860, In some embodiments, the step of alerting the at least one recipient organization regarding the danger of the new received message comprises at least one selection from the group of removing the new received message from a mailbox of the recipient, moving the new received message from the mailbox of the recipient to another messaging folder, and altering a visible message characteristic of the new received message. In some embodiments, the step of alerting the at least one recipient organization regarding the danger of the new received message further comprises determining an other previously received message with similar message characteristics as the copy of the new received message, and alerting the at least one recipient organization regarding the danger of the other previously received message. To illustrate one embodiment and not for limitation, in one embodiment an organization delivers the emails to the intended recipients and stores a copy of the emails received from outside the organization in a mailbox. These copies are indexed and the meta-data is stored and analyzed. So for example, if one email contained a URL to a phishing site listed in threat intelligence data it would be determined to be bad and the organization would be notified that the email they had received was a phishing message. In some embodiments, the meta-data of the email is compared not just once but on a regular basis against new threat intelligence data. For example, if an email was delivered from a certain IP address that IP address will be compared against threat intelligence received every day for the next 3 days. In some embodiments, once an email is determined to be a phishing email based upon the copy of the email a further action can be taken to alter or remove the original message. For example, if an email was sent by Joe Smith on Jan. 1, 2015 to Dan Jones. Dan Jones mailbox has that message. The meta-data of this message is examined using a copy of this message and on Jan. 1, 2015 is determined not to be a phishing message—nothing is done on Jan. 1, 2015. The meta-data is examined again on Jan. 2, 2015 and the message is determined to be a phishing message. At this point the organization is alerted. Additionally, the original email in Dan Jones mailbox is altered or removed or the folder is changed to tell Dan Jones that the message is a phishing message. In other embodiments, once the message from Joe Smith is determined to be a phishing message, other messages from any senders including Joe Smith are examined to determine their similarity to Joe Smith's phishing message and the organization is alerted regarding these similar messages being phishing messages.

It is recognized that the elements of the above methods may be combined in any manner to support the methods disclosed herein.

Although certain methods, apparatus, and articles of manufacture have been described herein, the scope of coverage of this application is not limited thereto. To the contrary, this application covers all methods, apparatus, and articles of manufacture fairly falling within the scope of the appended claims either literally or under the doctrine of equivalents.

One Example Embodiment of a System for Electronic Message Analysis

As will be readily apparent to those skilled in the art, systems for the disclosed methods of electronic message analysis can be embodied in hardware, software, or a combination of hardware and software. For example, a computer system or server system, or other computer implemented apparatus combining hardware and software adapted for carrying out the methods described herein, may be suitable. One embodiment of a combination of hardware and software could be a general purpose computer system with a computer program that, when loaded and executed, carries out the respective methods described herein. In some embodiments, a specific use computer, containing specialized hardware for carrying out one or more of the instructions of the computer program, may be utilized. In some embodiments, the computer system may comprise a device such as, but not limited to a digital phone, cellular phone, laptop computer, desktop computer, digital assistant, server or server/client system.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

One example embodiment of a system for electronic message analysis generally comprises the elements of FIG. 1 in a software program product to be executed by a computer implemented system. FIG. 1 illustrates a block diagram of one example embodiment of a system 100 for analyzing electronic messages. As shown in FIG. 1, the system 100 includes one or more recipient messaging server 110 one or more recipient messaging client 130, one or more sender messaging client/server 140 that are all coupled to one or more anti-phishing server 150 via a communication network such as an Internet/Intranet 120. The recipient messaging client is associated with a recipient 132 and the sender messaging client is associated with a sender 142. The one or more anti-phishing server 150 is coupled to a database 180. The recipient messaging server 110 may be in communication with an organization computer system administrator or organization users 190. As shown in FIG. 1, the recipient messaging client 130 may include a messaging client plugin module 131. As shown, memory 160 in the anti-phishing server 150 is coupled to a processor and includes an anti-phishing module 170. The anti-phishing module 170 includes an import module 171, an analysis and data warehouse module 172, message handler module 173, an organizational analysis module 174, an outbound message relay module 175, a configuration and management module 176 a classification module 177 and a social network module 178. In some embodiments, the system may further comprise being coupled with third party online social networks 121 and threat intelligence data 122. The recipient messaging client 130 and the client of the sender messaging client/server 140 may comprise any type of computer implemented interface allowing a user to access electronic messages such as but not limited to desktop software, server software, mobile device software or internet browser based software such as Microsoft Outlook, Gmail. It is understood that the messaging client may also be a client for other types of electronic messaging such as text messaging. Embodiments of the disclosed system and modules and other system components are configure to, separately or in any combination, execute any of the disclosed methods of electronic message analysis.

FIG. 8 is a schematic diagram of one embodiment of a processor based computer system 800 by which the methods for electronic message analysis may be carried out. The processor based computer system 800 can be used for the operations described in association with any of the computer implemented methods described herein. The processor based computer system 800 includes at least one processor 810, a memory 820 and an input/output device 840. Each of the components 810, 820, and 840 are operably coupled or interconnected using a system bus 850. The processor based computer system 800 may further comprise a storage device 830 operably coupled or interconnected with the system bus 850.

The processor 810 is capable of receiving the instructions and/or data and processing the instructions of a computer program for execution within the computer system 800. In some embodiments, the processor 810 is a single-threaded processor. In some embodiments, the processor 810 is a multi-threaded processor. The processor 810 is capable of processing instructions of a computer stored in the memory 820 or on the storage device 830 to communicate information to the input/output device 840. Suitable processors for the execution of the computer program instruction include, by way of example, both general and special purpose microprocessors, and a sole processor or one of multiple processors of any kind of computer.

The memory 820 stores information within the processor based computer system 800. Memory 820 may comprise: a magnetic disk such as an internal hard disk or removable disk; a magneto-optical disk; an optical disk; or a semiconductor memory device such as PROM, EPROM, EEPROM or a flash memory device. In some embodiments, the memory 820 comprises a transitory or non-transitory computer readable medium or computer readable memory device. In some embodiments, the memory 820 is a volatile memory unit. In other embodiments, the memory 820 is a non-volatile memory unit.

The processor 810 and the memory 820 can be supplemented by, or incorporated in, ASICs (application-specific integrated circuits).

The storage device 830 may be capable of providing mass storage for the processor based computer system 800. In various embodiments, the storage device 830 may be, for example only and not for limitation, a computer readable medium such as a floppy disk, a hard disk, an optical disk, a tape device, CD-ROM and DVD-ROM disks, alone or with a device to read the computer readable medium, or any other means known to the skilled artisan for providing the computer program to the computer system for execution thereby. In some embodiments, the storage device 830 comprises a transitory or non-transitory computer readable medium.

In some embodiments, the memory 820 and/or the storage device 830 may be located on a remote system such as a server system, coupled to the processor 810 via a network interface, such as an Ethernet interface.

The input/output device 840 provides input/output operations for the processor based computer system 800 and may be in communication with a user interface 840A as shown. In one embodiment, the input/output device 840 includes a keyboard and/or pointing device. In some embodiments, the input/output device 840 includes a display unit for displaying graphical user interfaces or the input/output device 840 may comprise a touchscreen. In some embodiments, the user interface 840A comprises devices such as, but not limited to a keyboard, pointing device, display device or a touchscreen that provides a user with the ability to communicate with the input/output device 840.

The processor based computer system 800 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet.

A functional diagram of one embodiment of the computer program capable of executing the described methods is shown in the functional diagram in FIG. 1.

One example embodiment of the systems and methods for electronic message analysis may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

Example Embodiments of Systems for Electronic Message Analysis in Operation

Now, the operation of the system 100 will be described as an illustration of one embodiment of the system in operation. The one or more recipients/recipient organization receives a message from one or more senders/sender's organization via the message handler module 173. The analysis and data warehouse module then obtain message characteristics by parsing the received message based on a set of predetermined message characteristics. Examples of message characteristics comprise those characteristics described above herein.

Further, in operation, messages received by the recipient/recipient organization over a predetermined time interval may be imported by the import module 171 on its own or optionally via the messaging client plugin module 131. The analysis and data warehouse module 172 then parses the recipient/recipient organization received emails based on the set of predetermined message characteristics to obtain message characteristics of the imported emails. The analysis and data warehouse module 172 then stores the obtained message characteristics associated with recipient/recipient organization and sender/sender organization in the database 180.

Furthermore, in operation, the configuration and management module is configured to allow an administrator to select desired message characteristics to be included in the set of characteristics used for comparing the characteristics of the received message and to assign or change a weight of how much each characteristic should influence the likelihood that a new message is a phishing message.

Now, during operation, the analysis and data warehouse module 172 compares message characteristics of the received message with message characteristics associated with the recipient/recipient organization and/or from that sender/sender organization by the analysis and data warehouse module. In some embodiments, the analysis and data warehouse module 172 obtains a statistical distribution of each of the stored message characteristics associated with the recipient/recipient organization for a sender/sender organization. The analysis and data warehouse module 172 then compares the message characteristics of the received message with message characteristics associated with the recipient/recipient organization for that sender/sender organization having high statistical distribution.

The analysis and data warehouse module 172 then scores and determines a probability whether the message characteristics of the received message match the message characteristics associated with the recipient/recipient organization for that sender/sender organization. This probability may be one or more factor to determine whether the received message by the recipient/recipient organization is a phishing message. This probability may be reflective of whether the proposed or indicated sender of the message is the actual sender.

In some embodiments, the analysis and data warehouse module 172 determines a degree of variance of each message characteristic when compared with the recipient/recipient organization for that sender/sender organization having high statistical distribution. The analysis and data warehouse module 172 then establishes a score based on the determined degree of variance for each message characteristic, wherein the analysis and data warehouse module 172 assigns weights for each established score based on the determined degree of variance. The analysis and data warehouse module 172 then obtains a combined score by adding scores of all the message characteristics in the received message based on the assigned weights.

In some embodiments, the analysis and data warehouse module 172 stores logs of received message and any associated phishing activity along with details of why the message was determined to be a phishing message in the database. The configuration and management module 176 may then output logs of received messages and any associated phishing activity for viewing on a display device.

In some embodiments, the message handler module 173 quarantines message determined to be phishing message. In these embodiments, the configuration and management module 176 may then output quarantined message for viewing on a display device or forwards these message to certain users or adds certain text to the header or subject of the message to mark them as suspect or questionable phishing messages.

In some embodiments, either the messaging client plugin module 131 or the outbound message relay module 175 parses outbound messages sent by the recipient/recipient organization based on predetermined outbound message characteristics to determine if the outbound message is a response or forward of a previously received message by the recipient/recipient organization. The analysis and data warehouse module 172 then updates message characteristics of the previously received messages based on the above determination to determine that the characteristics of previously received message are more likely to represent a legitimate sender/sender organization. The analysis and data warehouse module 172 then compares ongoing message received from the sender/sender organizations with the message characteristics, and wherein the analysis and data warehouse module scores and declares any of the ongoing message received from sender/sender organizations as phishing based on the outcome of the comparison.

In some embodiments, either the message handler module 173 or the messaging client plugin module 131 includes visual identifications and reasoning information to the received message based on the outcome of the comparison to assist the recipient/recipient organization of the nature of the received message.

In some embodiments, either the messaging client plugin module 131 or the social network module 178 obtains recipient background information from the message recipient/recipient organization's online social networks. The analysis and data warehouse module 172 then associates the recipient background information such as recipient contacts to message characteristics associated with the recipient or the sender such as past message addressees and stores the resultant recipient background information in the database. The analysis and data ware house module 172, upon receiving a message, scores and determines a probability whether the message characteristics of the new received message match the recipient background information in the database 180. This probability may be one or more factor to determine whether the received message is a phishing message. This probability may be reflective of whether the proposed or indicated sender of the message is the actual sender.

In some embodiments, the organization analysis data warehouse module 172 determines coordinated phishing attacks against an organization by spotting phishing attacks having similar characteristics against multiple users in the organization. In some embodiments, the organization analysis module 174 monitors changing patterns of outbound message to determine whether an organization's messaging client has been compromised and the sender/sender organization is sending a phishing message. In some embodiments, either the messaging client plugin module 131 or the configuration and management module 176 allows users to specify a message as a phishing attempt or a legitimate message and use the characteristics of this flagged message to filter messages to other users in the organization.

In one embodiment, a system for analyzing electronic messages for phishing message detection comprises a system similar to that illustrated in FIG. 1 configured to execute the methods of electronic message analysis utilizing message characteristics. In this embodiment, the methods generally comprise receiving a message from one or more sender by one or more recipients via the message handler module, obtaining a message characteristic by parsing the received message based on a set of predetermined message characteristics by the analysis and data warehouse module, comparing one or more of the email characteristic of the received message with a message characteristic associated with one or more of the recipient or the sender by the analysis and data warehouse module, using the outcome of the comparison by the analysis and data warehouse module as a factor in determining the received message by the recipient as a phishing message and storing the message characteristic associated with one or more of the recipient or the sender in a database. In this embodiment, the configuration and management module allows an administrator to select the message characteristics to be included in the predetermined message characteristics used for comparing the message characteristics of the received message and to assign a weight of how much each message characteristic should influence the likelihood that a new message is a phishing message. In some embodiments, the methods further comprise one of the import module or the messaging client plugin module directly imports message received by the recipient over a predetermined time interval, the analysis and data warehouse module parses the recipient received messages based on the predetermined message characteristics to obtain message characteristics of the imported messages and the analysis and data warehouse module stores the obtained messages characteristics associated with one or more of the recipient or sender received message in the database. In some embodiments, the methods further comprise: one of the import module or the messaging client plugin module directly imports received messages received by the recipient over a predetermined time interval; the analysis and data warehouse module groups the new received messages into a first group based on the messages sender name, sender email address or other sender identifier, and the email addresses of the recipients or their recipient identifiers on the message and a second group based just on messages sender name, sender email address or other sender identifier, wherein the analysis and data warehouse module accrues a certain minimum number of messages in each group; the classification module performs training using one or more algorithms on the message data of the messages in each group; the analysis and data warehouse module store the result of the training; upon receipt of a new message the analysis and data warehouse module parse the new message, grouping it into one of the first or second group; the classification module checks each trained algorithm to determine whether the new message is written in a similar style as the other messages belonging to the first or the second group; the analysis and data warehouse module use the outcome to influence the likelihood that the new message is the phishing message; the classification module updates the training of each algorithm in the classification engine for the specified groups with the contents of the new message; and the analysis and data warehouse module stores the updated results of the training. In some embodiments, the methods further comprise: one of the import module or the messaging client plugin module directly imports messages received by the recipient over a predetermined time interval; the analysis and data warehouse module groups the new received message into groupings called patterns that are based on message characteristic values present in a specific received message that are likely to be present in other received message and pre-assigned message characteristic data that place each message characteristic into one or more of the following patterns: sender and recipient, sender and recipient organization, sender organization and recipient, sender organization and recipient organization, sender organization, and sender; the analysis and data warehouse stores patterns in the database along with information regarding the count of messages with characteristics that place it in a specific group as well as the dates on which messages belonging to a group were received; the analysis and data warehouse module formulates a confidence score for each pattern based upon the number of messages received conforming to a pattern; the analysis and data warehouse module formulates a newness score for each pattern indicating the duration of time for which the pattern has been active; upon the receipt of a new message the analysis and data warehouse module determines if it belongs to a pre-existing pattern or requires the creation of a new pattern; the analysis and data warehouse module scores the message based upon the pattern its characteristics match if any, and the patterns confidence and newness scores; the analysis and data warehouse module uses the outcome to influence the likelihood that the new message is the phishing message; and the analysis and data warehouse module update the database with data reflecting the pattern, characteristics and appearance of the new received message. In some embodiments, the methods further comprise: the analysis and data warehouse module obtains stored message characteristics associated with one or more of the recipient or the sender along with their statistical distribution and the analysis and data warehouse module compares one or more of the message characteristics of the received message with the obtained message characteristics associated with the one or more of the recipient or the sender that are similar to the new message characteristics and have a high statistical distribution. In some embodiments, the methods further comprise: the analysis and data warehouse module determines degree of variance of each message characteristic when compared with the similar message characteristic from prior messages associated with one or more of the recipient or the sender; the analysis and data warehouse module establishes a score based on the determined degree of variance for each message characteristic and a pre-assigned weight for each characteristic and the analysis and data warehouse module obtains a combined score by adding scores of one or more of the message characteristics in the received message based on the pre-assigned weights. In some embodiments, the methods further comprise the analysis and data warehouse module stores logs of received message and any associated phishing activity along with details of why the received message was determined to be the phishing message in the database and the configuration and management module outputs the logs of the received message and any associated phishing activity for viewing on a display device. In some embodiments, the methods further comprise: the messaging handler module quarantines received messages determined to be the phishing message as quarantined message, the configuration and management module forwards quarantined messages to certain users, the configuration and management module adds certain text to the header or subject of quarantined messages to mark them as suspect, and the configuration and management module outputs the quarantined messages for viewing on a display device. In some embodiments, the methods further comprise: the messaging handler module changes the Reply-To address of the new received message determined to possibly be the phishing message to a custom address based on settings in the configuration and management module and allows the new received message to be delivered to the original messages intended recipient; upon receiving a reply at the custom address the analysis and warehouse module does a further inspection of one of the original message or the response to the original received message; the configuration and management module quarantines the response; the configuration and management module forward quarantined response to certain users; and wherein the messaging handler module replaces the altered custom Reply-To address with the original Reply-To address and delivers the message response. In some embodiments, the methods further comprise either the messaging client plugin module or the outbound messaging relay module parses outbound messages sent by the recipient based on a set of predetermined message characteristics to determine if the outbound message is a response or forward of a previously received message by the recipient, the analysis and data warehouse module updates the database based on the above determination to indicate that the characteristics of the previously received message are more likely to represent a legitimate sender, the analysis and data warehouse module compares ongoing messages received from the sender with stored message characteristics, and the analysis and data warehouse module declares any of the ongoing emails received from the sender as the phishing message based on the outcome of the comparison. In some embodiments, the methods further comprise the messaging handler module along with the messaging client plugin module includes visual identifications and reasoning information to the received message based on the outcome of the comparison to assist the recipient of the nature of the received message. In some embodiments, the methods further comprise the analysis and data warehouse module determines coordinated phishing attacks against an organization by spotting the phishing messages having similar characteristics against multiple recipients in the organization. In some embodiments, the methods further comprise the organization analysis module monitors changing patterns of an outbound message to determine whether an messaging client has been compromised and the sender is sending the phishing message. In some embodiments, the methods further comprise either the messaging client plugin module or the configuration and management module allows a user to specify a received message as the phishing messages and use the message characteristics of the specified received message to filter received messages to other users in the organization of the recipient. In some embodiments, the methods further comprise the configuration and management module allows administrators to specify the combination of a set of message characteristics as indicative of the phishing messages and the analysis and data warehouse module then flags new received messages with similar characteristics as new phishing messages.

In one example embodiment, a system for analyzing electronic messages for phishing message detection comprises a system similar to that illustrated in FIG. 1 configured to execute the methods of electronic message analysis utilizing information from online social networks. In this embodiment, the methods comprise receiving a message from one or more sender by one or more recipients via the messaging handler module, obtaining message characteristics by parsing the received message based on a set of predetermined message characteristics by the analysis and data warehouse module, comparing one or more of the email characteristics of the received message with message characteristics associated with one or more of the recipient or the sender by the analysis and data warehouse module, using the outcome of the comparison by the analysis and data warehouse module as a factor in declaring the received email message by the recipient as a phishing electronic message, and storing the received messages characteristics associated with the recipient and the sender received message in a database. In this embodiment, the messaging client plugin module along with the social network module are configured to obtain background information associated with the recipient such as contacts and information posted by or about these contacts from an online social network, wherein the analysis and data warehouse module stores the background information in the database, wherein the analysis and data ware house module, upon receiving a received message, determines whether the background information in the received message is correct using the stored background information, and wherein the analysis and data warehouse module uses the outcome of the above determination as a factor in declaring the received email as the phishing message. In some embodiments, the analysis and data warehouse comparison of message sender to online social network information comprises: one of the messaging client plugin or the social network module accepting third party authentication credentials or access rights from users for at least one online social network or membership systems; one of the messaging client plugin or the social network module storing such authentication credentials or access rights in the database; the analysis and data warehouse module periodically using such authentication credentials or access rights to access the electronic system, via website or programming interface to retrieve data including contacts names, email addresses, phone numbers, educational affiliations, employment data, residence address, work address, languages spoken, date when they became related to the user on the online social network, date when they joined online social network, number of messages contact and user have exchanged, number of other contacts that contact and user are both related to, groups they share in common, messages they have posted, information about their places of study or employment and their respective reputation and the like; the analysis and data warehouse module storing retrieved data and/or links to data in the database so that it is associated with a contact and can be retrieved on the basis of a message sender; the analysis and data warehouse module finding the relevant contact by comparing message senders name against the names of contacts retrieved from online social network; the analysis and data warehouse module finding the relevant contact by comparing message senders email address against the email address of contacts retrieved from the recipient online social network; the analysis and data warehouse module finding the relevant contact by comparing the domain part of the message senders email address against the domain names associated with the contacts places of employment or places of education; the analysis and data warehouse module finding the relevant contact by comparing the phone number of the message sender against the phone number associated with the contact; the analysis and data warehouse module finding the relevant contact by comparing the third party identifier of the message sender against the third party identifier associated with the contact; the analysis and data warehouse module upon finding the contact, comparing the language used in the message to languages indicated as those spoken by the contact; analysis and data warehouse module upon finding the contact, determining the physical location of where the message was sent from by cross referencing the IP address of the sent message against a GeoIP database and subsequently comparing this location against the physical location of the contact or phone number area code or place of employment or place of education as specified in the online social network; the analysis and data warehouse module upon finding the contact, determining the quality of the relationship between the message recipient and the contact by evaluating background information obtained from the online social network such as the length of time contact has spent on the online social network, length of time contact and message recipient have known each other, number of other contacts both contact and user share in common, number of groups contact and user participate in together, number of places of work, education shared by contact and user, number of messages contact and message recipient have shared, number of online social network contact and message recipient are connected on and the like; and the analysis and data warehouse module influencing the legitimacy of the message based upon the relationship and profile quality of contact matching the message sender found in the recipient recipient background information. In some embodiments, the methods further comprise either the import module or the messaging client plugin module directly imports the received messages received by the recipient over a predetermined time interval, the analysis and data warehouse module parses the recipient received messages based on the set of predetermined message characteristics to obtain message characteristics of the imported messages, and the analysis and data warehouse module stores the obtained message characteristics associated with one or more of the recipient or sender in the database. In some embodiments, the methods further comprise: one of the import module or the messaging client plugin module directly imports the received messages received by the recipient over a predetermined time interval; the analysis and data warehouse module groups the imported/new message into a first group based on the messages sender name and/or sender email address or other sender identifier, and the email addresses of the recipients or their identifiers on the message and a second group based on message sender name, and/or sender email address or other sender identifier; the analysis and data warehouse module accrues a certain minimum number of messages in each group; the classification module performs training using one or more algorithms on the message data of the messages in each group; the analysis and data warehouse module stores the result of the training; the analysis and data warehouse module parses the new received message and group it in the first or the second group; the classification module checks each trained algorithm to determine whether the new message is written in a similar style as the other messages belonging to that group; the analysis and data warehouse module uses the outcome to influence the likelihood that the new message is the phishing message; the classification module updates the training of each algorithm in the classification engine for the specified groups with the contents of the new message; and the analysis and data warehouse module stores the updated results of the training. In some embodiments, the methods further comprise: one of the import module or the messaging client plugin module directly imports messages received by the recipient over a predetermined time interval; the analysis and data warehouse module groups the imported/new message into patterns that are based on characteristics values present in a specific message that are likely to be present in other messages and pre-assigned characteristic data that place each characteristic into one or more of the following patterns: a sender and recipient group pattern representing the message characteristics of the sender and the recipient, a sender and recipient organization group pattern representing the message characteristics associated with the sender and an organization of the recipient, a sender organization and recipient group pattern representing the message characteristics associated with an organization of the sender and the recipient, a sender organization and recipient organization group pattern representing the message characteristics associated with the organization of the sender and the organization of the recipient, a sender organization group pattern representing the message characteristics associated with the organization of the sender organization and a sender group pattern representing the message characteristics associated with the sender; the analysis and data warehouse stores the patterns in the database along with information regarding the count of messages with characteristics that place it in a specific group as well as the dates on which messages belonging to a group were received; the analysis and data warehouse module formulates a confidence score for each pattern based upon the number of messages received conforming to a pattern; the analysis and data warehouse module formulates a newness score for each pattern indicating the duration of time for which the pattern has been active; the analysis and data warehouse module determines if a new received message belongs to a pre-existing pattern or requires the creation of a new pattern; the analysis and data warehouse module scores the new received message based upon the pattern its characteristics match if any, and the patterns confidence and newness scores; the analysis and data warehouse module uses the outcome to influence the likelihood that the new message is the phishing message; and the analysis and data warehouse module updates the database with data reflecting the pattern, characteristics and appearance of the new received message. In some embodiments, the methods further comprise: the analysis and data warehouse module obtains a stored characteristic associated with one or more of the recipient or the sender along with their statistical distribution; and the analysis and data warehouse module compares one or more of the message characteristics of the new received message with the obtained message characteristics associated with one or more of the recipient or the sender that are similar to the new received message characteristic and have a high statistical distribution. In some embodiments, the methods further comprise: one of the messaging client plugin module or the outbound messaging relay module parses outbound messages sent by the recipient based on a set of predetermined message characteristics to determine if the outbound message is a response or forward of a previously received email by the recipient; the analysis and data warehouse module updates the database based on the above determination to indicate that the characteristics of the previously received message are more likely to represent a legitimate sender; the analysis and data warehouse module compares ongoing emails received from the sender with stored message characteristics; and the analysis and data warehouse module declares any of the ongoing messages received from the sender as the phishing message based on the outcome of the comparison.

In one example embodiment, systems for analyzing electronic messages for phishing message detection comprise a system similar to that illustrated in FIG. 1 configured to execute the methods of electronic message analysis utilizing pattern matching techniques described herein. In one example embodiment consistent with the methods shown in FIG. 19, the system comprises receiving a message from one or more sender by one or more recipients via the messaging handler module, obtaining a first message characteristic of the indicated sender and at least one second message characteristic by parsing the received message by the analysis and data warehouse module, identifying at least one actual sender message characteristic pattern using the first message characteristic of the indicated sender by the analysis and data warehouse module, probabilistically comparing the at least one second message characteristic to the at least one actual sender message characteristic pattern by the classification module, determining a degree of similarity of the at least one second message characteristic to the at least one actual sender message characteristic pattern by the classification module, influencing a probability that the indicated sender is the actual sender based upon the degree of similarity by the analysis and data warehouse module. In some embodiments, the social network module is configured to obtain recipient background information associated with the recipient such as contacts and information posted by or about these contacts from an online social network, wherein the analysis and data warehouse module stores the background information in the database, wherein the classification module is trained to create or update at least one actual sender message characteristic pattern comprising at least one positive actual sender message characteristic label associated with the actual sender using the posts from the indicated sender in the recipient background information, wherein a positive comparison the at least one second message characteristic to the at least one positive actual sender message characteristic label by the classification module, results in an increase in probability the indicated sender is the actual sender by the analysis and data warehouse module. In some embodiments, the analysis and data warehouse module further compares the first message characteristic to a recipient messaging identity information to determine a sender quality information whereby the analysis and data warehouse module further influence the likelihood of the message being a phishing message. In some embodiments, the analysis and data warehouse module further influences the probability of the message being a phishing message by determining that the indicated sender's first message characteristics are similar and not identical or a misspelling of other senders in recipients messaging identity information. In some embodiments either the import module or the messaging client plugin module import a plurality of received messages received over a predetermined time period, the analysis and data warehouse module groups the imported received messages by at least one sender identity message characteristic, the classification module then creates or updates at least one actual sender message characteristic pattern with at least one positive sender message characteristic label. In some embodiments, the analysis and data warehouse module determines a quality for the received message and associates new actual sender message characteristic patterns with said quality, wherein only messages with a quality similar to the quality of a actual sender message characteristic pattern are probabilistically compared by the classification module. In some embodiments, the classification module uses and evaluation criteria to ensure that the actual sender message characteristic pattern in ready to be used.

In one example embodiment, systems for analyzing electronic messages for phishing message detection comprise a system similar to that illustrated in FIG. 1 configured to execute the methods of electronic message analysis utilizing methods described herein. In one example embodiment consistent with the methods shown in FIG. 17, the system comprises receiving a message from one or more sender by one or more recipients via the messaging handler module, storing a metadata for the new received message by the analysis and data warehouse module, relaying the new received message to the at least one recipient organization by the outbound message relay module, comparing the metadata for the new received message to a threat intelligence data to determine if the new received message is a potentially dangerous message by the analysis and data warehouse module, and alerting the at least one recipient organization regarding a danger of the new received message by the configuration and management module. In some embodiments the analysis and data warehouse module regularly updates the threat intelligence data from different sources, the analysis and data warehouse module compares the message metadata against the updated threat intelligence data to determine if it us a dangerous message. In some embodiments, the message handler module either removes the dangerous message from the users mailbox or moves the dangerous message to a different folder or alters a visible attribute of the dangerous message. In some embodiments the analysis and data warehouse module. In some embodiments, the analysis and data warehouse module further determines the message to be a questionable message, the analysis and data warehouse module changes the Reply-To address message characteristic to a custom address and stores the original Reply-To address, whereby the outbound message relay module relays the message with the changed Reply-To address to intended recipient. In some embodiments the message handler module further receives a response message at the changed Reply-To address, the analysis and data warehouse module determines either the original message or the response message to be a phishing message, whereby the configuration and management module withholds the message from delivery.

In one example embodiment, systems for analyzing electronic messages for phishing message detection comprise a system similar to that illustrated in FIG. 1 configured to execute the methods of electronic message analysis utilizing methods described herein. In one example embodiment consistent with the methods of FIG. 18, the system comprises receiving a copy of a new received message from an indicated sender for a recipient at at least one recipient organization by the messaging handler module, storing a metadata for the new received message by the analysis and data warehouse module, relaying the new received message to the at least one recipient organization by the outbound message relay module, comparing the metadata for the new received message to a threat intelligence data to determine if the new received message is a potentially dangerous message by the analysis and data warehouse module, and alerting the at least one recipient organization regarding a danger of the new received message by the configuration and management module. In some embodiments the analysis and data ware house module determines other previously received messages with similar message characteristics as the copy of the received message, and alerting the at least one recipient organization regarding a danger of other previously received messages by the configuration and management module.

In one example embodiment, systems for analyzing electronic messages for phishing message detection comprise a system similar to that illustrated in FIG. 1 configured to execute the methods of electronic message analysis utilizing methods described herein. In one example embodiment consistent with the methods of FIG. 16, the system comprises receiving a new received message from an indicated sender by the message handler module, determining the at least one first message characteristic of the indicated sender and at least one second message characteristic for the new received message by the analysis and data warehouse module, comparing the at least one first message characteristic of the indicated sender to a recipient messaging identity information to determine an indicated sender quality information by the analysis and data warehouse module, and influencing a probability that the indicated sender is an actual sender based upon the indicated sender quality information by the analysis and data warehouse module. In some embodiments, the outbound message relay module adds an indicator to the new received message to indicate the sender quality.

In one example embodiment, systems for analyzing electronic messages for phishing message detection comprise a system similar to that illustrated in FIG. 1 configured to execute the methods of electronic message analysis methods described herein. In one embodiment, the system comprises receiving a new received message from an indicated sender by the message handler module, determining the indicated sender to be from a well-known brand by the analysis and data warehouse module, extracting one or more URL from the new received message by the analysis and data warehouse module, breaking up each URL into a display URL component and a target URL component by the analysis and data warehouse module, comparing the display URL component to at least one of a list of domains and brands associated with the well-known brand by the analysis and data warehouse module, de-shortening the target URL component if necessary by the analysis and data warehouse module, determining a quality of the target URL component with respect to at least one of the list of domains and brands associated with the well-known brand by the analysis and data warehouse module, and influencing a probability that the new received message is a phishing message based upon the quality by the analysis and data warehouse module. In some other embodiments, the analysis and data warehouse module compares the target URL component to at least one similar misspelling of the domain associated with the well-known brand.

Although this invention has been described in the above embodiments with a certain degree of particularity, it is understood that the foregoing is considered as illustrative only of the principles and example embodiments of the invention. Further, since numerous modifications and changes will readily occur to those skilled in the art, it is not desired to limit the invention to the exact methods and operation shown and described, and accordingly, all suitable modifications and equivalents may be resorted to, falling within the scope of the invention which is defined in the claims and their equivalents.

I claim:

1. A computer implemented method for analyzing electronic messages, the method comprising:
   receiving a new received message from an indicated sender;
   the new received message having at least one first message characteristic of the indicated sender and at least one second message characteristic;
   identifying, with a processor, at least one actual sender message characteristic pattern of an actual sender using the at least one first message characteristic;
   wherein the at least one actual sender message characteristic pattern comprises at least one message characteristic label;
   wherein the at least one message characteristic label comprises a negative actual sender message characteristic label whereby the negative actual sender message characteristic label represents a message characteristic pattern of another sender not the actual sender;
   wherein the at least one message characteristic label further comprises a positive actual sender message characteristic label whereby a positive comparison of the at least one second message characteristic to the positive actual sender message characteristic label increases the probability that the indicated sender is the actual sender;
   probabilistically comparing, with the processor, the at least one second message characteristic to the at least one message characteristic label;
   determining, with the processor, a degree of similarity of the at least one second message characteristic to the at least one actual sender message characteristic pattern; and
   influencing, with the processor, a probability that the indicated sender is the actual sender based upon the degree of similarity.

2. The computer implemented method of claim 1 wherein:
   the step of probabilistically comparing, with the processor, the at least one second message characteristic to the at least one message characteristic label comprises comparing the at least one second message characteristic to at least the negative actual sender message characteristic label; and
   the step of determining a degree of similarity of the at least one second message characteristic to the at least one message characteristic label comprises determining a degree of similarity of the at least one second message characteristic to at least the negative actual message characteristic label.

3. The computer implemented method of claim 1 wherein the step of identifying at least one actual sender message characteristic pattern of an actual sender using the at least one first message characteristic comprises;
   determining a probability of similarity of the at least one first message characteristic to an actual sender message characteristic;
   the probability of similarity is a probability value between but not including 0% and 100%; and
   identifying the at least one actual sender message characteristic pattern of the actual sender using the probability of similarity of the at least one first message characteristic to the actual sender message characteristic.

4. The computer implemented method of claim 1 wherein the degree of similarity of the at least one second message characteristic to the at least one message characteristic label comprises a value between but not including 0% and 100%.

5. The computer implemented method of claim 1 further comprising:
   comparing the probability that the indicated sender is the actual sender to a threshold; and
   withholding the new received message from being relayed to a recipient if the probability does not meet the threshold.

6. The computer implemented method of claim 1 further comprising:
   selecting, before receipt of the new received message, the at least one first message characteristic or the at least one second message characteristic from a plurality of message characteristics.

7. The computer implemented method of claim 1 further comprising:
   training a classification engine on a minimum number of historical messages from the actual sender to create at least one new actual sender message characteristic pattern; and
   the at least one new actual sender message characteristic pattern comprises at least one positive actual sender message characteristic label whereby a positive comparison of the at least one second message characteristic to the at least one positive actual sender message characteristic label increases the probability that the indicated sender is the actual sender.

8. The computer implemented method of claim 1 further comprising:
training a classification engine on at least one message characteristic of a minimum number of historical messages from the actual sender to a recipient at a recipient organization to create at least one new actual sender message characteristic pattern; and
the at least one new actual sender message characteristic pattern comprises at least one positive actual sender recipient organization message characteristic label whereby a positive comparison of the at least one second message characteristic to the at least one positive actual sender recipient organization message characteristic label increases the probability that the indicated sender is the actual sender.

9. The computer implemented method of claim 1 further comprising:
training a classification engine on at least one message characteristic of a minimum number of historical messages from one or more other senders who are not the actual sender to create at least one new actual sender message characteristic pattern; and
the at least one new actual sender message characteristic pattern comprises at least one negative actual sender message characteristic label whereby a positive comparison of the at least one second message characteristic to the at least one negative actual sender message characteristic label decreases the probability that the indicated sender is the actual sender.

10. The computer implemented method of claim 1 further comprising:
training a classification engine with an at least one additional received message from one or more other senders who are not the actual sender to update the at least one actual sender message characteristic pattern; and
the at least one actual sender message characteristic pattern comprises at least one updated negative actual sender message characteristic label whereby a positive comparison of the at least one second message characteristic to the at least one updated negative actual sender message characteristic label decreases the probability that the indicated sender is the actual sender.

11. The computer implemented method of claim 1 further comprising:
receiving at least one additional received message from the actual sender;
training a classification engine with the at least one additional received message from the actual sender to update the at least one actual sender message characteristic pattern; and
the at least one actual sender message characteristic pattern comprises at least one updated positive actual sender message characteristic label whereby a positive comparison of the at least one second message characteristic to the at least one updated positive actual sender message characteristic label increases the probability that the indicated sender is the actual sender.

12. The computer implemented method of claim 1 further comprising:
determining a quality measure of the new received message;
receiving at least one additional received message from the actual sender;
determining an additional quality measure for the at least one additional received message from the actual sender;
training a classification engine with the at least one additional received message from the actual sender with a similar quality measure similar to the quality measure of the new received message to update the at least one actual sender message characteristic pattern; and
the at least one actual sender message characteristic pattern comprises at least one updated positive actual sender message characteristic label with a quality measure similar to the quality measure of the at least one actual sender message characteristic pattern whereby a positive comparison of the at least one second message characteristic to the at least one updated positive actual sender message characteristic label increases the probability that the indicated sender is the actual sender.

13. The computer implemented method of claim 1 wherein the at least one second message characteristic comprises:
a value computed or derived or obtained via a third party from either a message content or a portion of the message content.

14. The computer implemented method of claim 1 further comprising:
importing a plurality of received messages as imported received messages over a predetermined time interval;
grouping the imported received messages by at least one sender identity message characteristic;
training a classification engine on a group by group basis on at least one second imported message characteristic of each imported received message to create at least one new actual sender message characteristic pattern; and
the at least one new actual sender message characteristic pattern comprises at least one positive unique sender message characteristic label associated with the actual sender whereby a positive comparison of the at least one second message characteristic to the at least one positive unique sender message characteristic label for the actual sender increases the probability that the indicated sender is the actual sender.

15. The computer implemented method of claim 1 wherein:
the step of receiving a new received message from an indicated sender further comprises determining a quality measure of the new received message; and
the step of identifying at least one actual sender message characteristic pattern using the at least one first message characteristic comprises identifying at least one actual sender message characteristic pattern using the at least one first message characteristic and the quality measure of the new received message.

16. The computer implemented method of claim 1 wherein:
the step of identifying at least one actual sender message characteristic pattern using the at least one first message characteristic comprises identifying at least one actual sender message characteristic pattern using the at least one first message characteristic and an evaluation threshold for the at least one actual sender message characteristic pattern.

17. The computer implemented method of claim 1 wherein:
the new received message from the indicated sender is received at an anti-phishing server with a memory;

after receiving the new received message, storing the new received message in the memory of the anti-phishing server;

scanning the new received message for the at least one first message characteristic of the indicated sender and the at least one second message characteristic;

retrieving a data file from the memory of the anti-phishing server comprising the at least one actual sender message characteristic pattern of the actual sender using the at least one first message characteristic of the indicated sender as a lookup key;

before determining the degree of similarity of the at least one second message characteristic to the negative label, creating the data file in the memory of the anti-phishing server comprising the at least one actual sender message characteristic pattern;

comparing the probability that the indicated sender is the actual sender to a threshold; and withholding the new received message from being relayed to a recipient from the memory of the anti-phishing server if the probability does not meet the threshold.

18. A computer implemented method for analyzing, electronic messages, the method comprising:

receiving a new received message from an indicated sender;

the new received message having at least one first message characteristic of the indicated sender and at least one second message characteristic;

identifying, with a processor, at least one actual sender message characteristic pattern of an actual sender using the at least one first message characteristic;

probabilistically comparing, with the processor, the at least one second message characteristic to the at least one actual sender message characteristic pattern;

determining, with the processor, a degree of similarity of the at least one second message characteristic to the at least one actual sender message characteristic pattern;

influencing, with the processor, a probability that the indicated sender is the actual sender based upon the degree of similarity;

comparing, with the processor, the at least one first message characteristic of the indicated sender to a recipient messaging identity information to determine an indicated sender quality information; and further influencing, with the processor, the probability that the indicated sender is the actual sender based upon the indicated sender quality information.

19. The computer implemented method of claim 18 wherein the recipient messaging identity information comprises at least one selected from the group of:

an internet domain name used to send and receive an electronic message by at least one recipient organization affiliated with at least one recipient;

an email addresses of at least one recipient at at least one recipient organization;

a first name and a last name of at least one recipient at at least one recipient organization;

a from name of at least one recipient at at least one recipient organization used for an electronic message;

a username of at least one recipient at at least one recipient organization used for an electronic message;

a phone number of at least one recipient at at least one recipient organization;

a grouping of the at least one first message characteristics present in a recipient background information associated with at least one recipient in at least one recipient organization; and a grouping of the at least one first message characteristic for each indicated sender who has sent an electronic message to at least one recipient at at least one recipient organization.

20. The computer implemented method of claim 18 wherein the indicated sender quality information identifies the indicated sender as one selected from the group of:

a first time sender of the new received message to a recipient;

a first time sender of the new received message to a recipient organization; and a first time sender of the new received message to a recipient at a recipient organization.

21. The computer implemented method of claim 18 wherein the indicated sender quality information identifies the indicated sender as one selected from the group of:

a sender of the new received message to a recipient with a value of the at least one first message characteristic being different than a previous value of the at least one first message characteristic in a previous message;

a sender of the new received message to a recipient organization with a value of the at least one first message characteristic being different than a previous value of the at least one first message characteristic in a previous message; and a sender of the new received message to a recipient at a recipient organization with a value of the at least one first message characteristic being different than a previous value of the at least one first message characteristic in a previous message.

22. The computer implemented method of claim 18 wherein the indicated sender quality information identifies the indicated sender as one selected from the group of:

a sender of the new received message with the at least one first message characteristic being similar but not identical to the recipient messaging identity information; and a sender of the new received message with the at least one first message characteristic containing a similar misspelling of the recipient messaging identity information to a previous misspelling of the recipient messaging identity information in a previous message.

23. The computer implemented method of claim 18 wherein the indicated sender quality information identifies the indicated sender as one selected from the group of:

a sender of the new received message having the at least one first message characteristic being similar to or containing a similar misspelling of one of an at least one internet domain name used to send and receive electronic messages by a recipient organization affiliated with a recipient;

a sender of the new received message having the at least one first message characteristic being similar to or containing a similar misspelling of at least one of a first or last name associated with a recipient at at least one recipient organization;

a sender of the new received message having the at least one first message characteristic being similar to or containing a similar misspelling of a username associated with a recipient at at least one recipient organization;

a sender of the new received message having the at least one first message characteristic being similar to or containing a similar misspelling of a from name associated with a recipient at at least one recipient organization;

a sender of the new received message having the at least one first message characteristic being similar to or containing a similar misspelling of one of an email address associated with a recipient at at least one recipient organization; and a sender of the new received message having the at least one first message characteristic being similar to or containing a similar misspelling of one of a phone number associated with a recipient at at least one recipient organization.

24. A computer implemented method for analyzing electronic messages, the method comprising:
receiving a new received message from an indicated sender;
the new received message having at least one first message characteristic of the indicated sender and at least one second message characteristic;
identifying, with a processor, at least one actual sender message characteristic pattern of an actual sender using the at least one first message characteristic;
probabilistically comparing, with the processor, the at least one second message characteristic to the at least one actual sender message characteristic pattern;
determining, with the processor, a degree of similarity of the at least one second message characteristic to the at least one actual sender message characteristic pattern;
influencing, with the processor, a probability that the indicated sender is the actual sender based upon the degree of similarity;
wherein the at least one actual sender message characteristic pattern comprises a first message characteristic label and at least one second message characteristic label;
wherein the step of probabilistically comparing the at least one second message characteristic to the at least one actual sender message characteristic pattern comprises probabilistically comparing the at least one second message characteristic to the first message characteristic label and comparing the at least one second message characteristic to the at least one second message characteristic label; and
wherein the degree of similarity of the at least one second message characteristic to the at least one actual sender message characteristic pattern comprises a selection of at least one of a degree of similarity of the at least one second message characteristic to the first message characteristic label and a degree of similarity of the at least one second message characteristic to the at least one second message characteristic label.

25. A computer implemented method for analyzing electronic messages, the method comprising:
receiving a new received message from an indicated sender;
the new received message having at least one first message characteristic of the indicated sender and at least one second message characteristic;
identifying, with a processor, at least one actual sender message characteristic pattern of an actual sender using the at least one first message characteristic;
probabilistically comparing, with the processor, the at least one second message characteristic to the at least one actual sender message characteristic pattern;
determining, with the processor, degree of similarity of the at least one second message characteristic to the at least one actual sender message characteristic pattern;
influencing, with the processor, a probability that the indicated sender is the actual sender based upon the degree of similarity;
obtaining, with the processor, a recipient background information associated with a recipient; the recipient background information comprising messages, posts or other writings from the indicated sender on an online social network application;
retrieving, with the processor, at least one message characteristic associated with the indicated sender from the recipient background information;
training, with the processor, a classification engine on the at least one message characteristic associated with the indicated sender from the recipient background information to create at least one new actual sender message characteristic pattern; and
the at least one new actual sender message characteristic pattern comprises at least one positive actual sender message characteristic label associated with the actual sender whereby a positive comparison of the at least one second message characteristic of the new received message with the at least one positive actual sender message characteristic label increases the probability that the indicated sender is the actual sender.

26. A computer implemented method for analyzing electronic messages, the method comprising:
receiving a new received message from an indicated sender;
the new received message having at least one first message characteristic of the indicated sender and at least one second message characteristic;
identifying, with a processor, at least one actual sender message characteristic pattern of an actual sender using the at least one first message characteristic;
probabilistically comparing, with the processor, the at least one second message characteristic to the at least one actual sender message characteristic pattern;
determining, with the processor, a degree of similarity of the at least one second message characteristic to the at least one actual sender message characteristic pattern;
influencing, with the processor, a probability that the indicated sender is the actual sender based upon the degree of similarity;
obtaining, with the processor, a recipient background information associated with a recipient; the recipient background information comprising one selected from the group of a message, a post or another writing, all from the indicated sender on an online social network application;
retrieving, with the processor, at least one message characteristic associated with the indicated sender from the recipient background information;
training, with the processor, a classification engine on the at least one message characteristic associated with the indicated sender from the recipient background information to create the at least one actual sender message characteristic pattern.

* * * * *

UNITED STATES PATENT AND TRADEMARK OFFICE
CERTIFICATE OF CORRECTION

Page 1 of 1

PATENT NO. : 9,501,746 B2
APPLICATION NO. : 14/864656
DATED : November 22, 2016
INVENTOR(S) : Gagan Prakash It is certified that error appears in the above-identified patent and that said Letters Patent is hereby corrected as shown below:

On the Title Page

The "Related U.S. Application Data", item "(63)", first line, text reading "application No. 14/176,133" should read "application No. 14/176,113".

The "Related U.S. Application Data", item "(63)", second line, text reading "now Pat. No. 9,319,314" should read "now abandoned".

Signed and Sealed this
Thirteenth Day of March, 2018

Andrei Iancu
*Director of the United States Patent and Trademark Office*